United States Patent
Frisardi et al.

(10) Patent No.: US 11,985,368 B2
(45) Date of Patent: *May 14, 2024

(54) SYNTHETIC TOTAL AUDIENCE RATINGS

(71) Applicant: The Nielsen Company (US), LLC, New York, NY (US)

(72) Inventors: Chiara Frisardi, Arizzano (IT); Claudio Meraviglia, Ticino (CH); Stefano Pedretti, Bioggio (CH); Fabio Filatrella, Tessin (CH); Davide Rindori, Paradiso (CH); Stefano Ghiotto, Milan (IT); Valerio Maretti, Cernobbio (IT); Gianmarco Ria, Lugano (IT); Marco Abrate, London (GB); Fabio Scantamburlo, Castigllione Olona (IT); Gianluca Costante, Lugano (IT); Michela Papandrea, Bioggio (CH); Tiziano Leidi, Dino (CH); Andrea Quattrini, Savosa (CH); Davide Nasi, Chiasso (CH)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,996

(22) Filed: Jun. 30, 2022

(65) Prior Publication Data

US 2023/0010587 A1    Jan. 12, 2023

Related U.S. Application Data

(63) Continuation of application No. 17/824,373, filed on May 25, 2022.

(Continued)

(51) Int. Cl.
*H04N 21/25* (2011.01)
*H04N 21/442* (2011.01)
*H04N 21/81* (2011.01)

(52) U.S. Cl.
CPC ..... *H04N 21/252* (2013.01); *H04N 21/44204* (2013.01); *H04N 21/812* (2013.01)

(58) Field of Classification Search
CPC .......... H04N 21/252; H04N 21/44204; H04N 21/812
See application file for complete search history.

(56) References Cited

U.S. PATENT DOCUMENTS 8,874,652 B1 * 10/2014 Pecjak .................. G06Q 30/02
                                                    709/224
9,224,094 B2 * 12/2015 Oliver ...................... G06N 5/02
(Continued)

OTHER PUBLICATIONS

United States Patent and Trademark Office, "Non-Final Rejection," issued May 4, 2023 in connection with U.S. Appl. No. 17/824,373, 5 pages.

(Continued)

*Primary Examiner* — Timothy R Newlin

(57) ABSTRACT

Example methods, apparatus, systems and articles of manufacture to determine synthetic total audience ratings are disclosed. Disclosed example apparatus are to access census data including census viewing statements associated with media content presented by census devices, access panel data including panelist viewing statements associated with media content presented by panel devices, the panel data including weights to represent numbers of individuals to be represented by corresponding panelists, divide the weights for respective ones of the panelists into respective sets of split weights, and assign the census viewing statements to at least subsets of the sets of split weights to determine the audience ratings for the population, the assignment of the (Continued)

census viewing statements to the at least subsets of the sets of split weights based on a reach constraint.

20 Claims, 24 Drawing Sheets

Related U.S. Application Data

(60) Provisional application No. 63/192,946, filed on May 25, 2021, provisional application No. 63/192,950, filed on May 25, 2021.

(56) References Cited

U.S. PATENT DOCUMENTS

| | | | |
|---|---|---|---|
| 9,936,249 B1* | 4/2018 | Nelson | G06K 19/06037 |
| 10,382,818 B2 | 8/2019 | Sheppard et al. | |
| 10,681,414 B2 | 6/2020 | Sheppard et al. | |
| 10,687,105 B1* | 6/2020 | Liao | H04L 67/53 |
| 11,140,449 B2 | 10/2021 | Sullivan et al. | |
| 2002/0133490 A1* | 9/2002 | Conkwright | G06Q 30/0277 |
| | | | 707/999.009 |
| 2009/0125464 A1* | 5/2009 | Shi | H04N 21/4661 |
| | | | 706/14 |
| 2010/0161492 A1 | 6/2010 | Harvey et al. | |
| 2011/0004682 A1* | 1/2011 | Honnold | G06Q 30/02 |
| | | | 709/224 |
| 2012/0042339 A1* | 2/2012 | Kitts | H04N 21/25866 |
| | | | 725/35 |
| 2012/0047013 A1* | 2/2012 | Bigby | G06Q 30/0251 |
| | | | 705/14.52 |
| 2012/0089697 A1* | 4/2012 | Bhatia | G06Q 30/0203 |
| | | | 709/217 |
| 2012/0110027 A1* | 5/2012 | Falcon | H04N 21/25866 |
| | | | 707/802 |
| 2012/0254911 A1* | 10/2012 | Doe | H04N 21/4524 |
| | | | 725/14 |
| 2013/0064109 A1* | 3/2013 | Combet | H04L 63/0407 |
| | | | 370/252 |
| 2014/0280996 A1 | 9/2014 | Harrang et al. | |
| 2014/0325057 A1* | 10/2014 | Borawski | H04N 21/4667 |
| | | | 709/224 |
| 2014/0325551 A1* | 10/2014 | McMillan | H04N 21/25883 |
| | | | 725/20 |
| 2015/0006547 A1* | 1/2015 | Grant | G06Q 30/02 |
| | | | 707/748 |
| 2015/0089522 A1* | 3/2015 | Volovich | H04N 21/6582 |
| | | | 725/14 |
| 2015/0143396 A1* | 5/2015 | Meraviglia | H04N 21/4516 |
| | | | 725/14 |
| 2015/0201031 A1* | 7/2015 | James | H04L 67/535 |
| | | | 709/224 |
| 2015/0319490 A1* | 11/2015 | Besehanic | H04N 21/258 |
| | | | 725/19 |
| 2017/0034593 A1* | 2/2017 | Ray | H04N 21/812 |
| 2017/0064411 A1 | 3/2017 | Goli et al. | |
| 2017/0345052 A1* | 11/2017 | Barford | H04L 43/028 |
| 2018/0098122 A1* | 4/2018 | Cho | H04N 21/44204 |
| 2018/0176622 A1* | 6/2018 | Sheppard | H04N 21/252 |
| 2018/0249208 A1* | 8/2018 | Sheppard | H04N 21/4667 |
| 2020/0117979 A1* | 4/2020 | Sullivan | H04N 21/251 |
| 2020/0202372 A1* | 6/2020 | Deshong | G06Q 30/0205 |
| 2021/0084370 A1* | 3/2021 | Doe | H04N 21/47202 |
| 2023/0010225 A1 | 1/2023 | Frisardi et al. | |
| 2023/0016021 A1 | 1/2023 | Frisardi et al. | |
| 2023/0016776 A1 | 1/2023 | Frisardi et al. | |

OTHER PUBLICATIONS

United States Patent and Trademark Office, "Non-Final Rejection," issued Jul. 7, 2023 in connection with U.S. Appl. No. 17/854,984, 5 pages.

* cited by examiner

1700 ⤵

| EXAMPLE | | MIN X | MIN X+1 | MIN X+2 | MIN X+3 | MIN X+4 | MIN X+5 – END CONTENT |
|---|---|---|---|---|---|---|---|
| AH | 8 | | | | | 8 | |
| ~~AG~~ | 4 | | | | | | |
| AF | 4 | | | | | | 4 |
| AE | 2 | | | | 2 | | |
| AD | 2 | | | 2 | | | |
| AC | 2 | | 2 | | | | |
| AB | 1 | 1 | 1 | 1 | | | 1 |
| AA | 1 | 1 | 1 | | 1 | | 1 |
| | | | | | | | |
| TARGET RCH | | 2 | 4 | 3 | 3 | 7 | 6 |
| TARGET CUM RCH | | 2 | 5 | 7 | 8 | 10 | 20 |
| TOTAL RCH | | 2 | 4 | 3 | 3 | 8 | 6 |
| TOTAL CUM RCH | | 2 | 4 | 6 | 8 | 16 | 20 |

| EXAMPLE | | MIN X | MIN X+1 | MIN X+2 | MIN X+3 | MIN X+4 | MIN X+5 – END CONTENT |
|---|---|---|---|---|---|---|---|
| AH | 8 | | | | | 8 | |
| ~~AG~~ | 4 | | | | | | |
| AF | 4 | | | | | | 4 |
| AE | 2 | | | | 2 | | |
| AD | 2 | | | 2 | | | |
| AC | 2 | | 2 | | | | 2 |
| AB | 1 | 1 | 1 | 1 | | | |
| AA | 1 | 1 | 1 | 1 | 1 | | |
| | | | | | | | |
| TARGET RCH | | 2 | 4 | 3 | 3 | 7 | 6 |
| TARGET CUM RCH | | 2 | 5 | 7 | 8 | 10 | 20 |
| TOTAL RCH | | 2 | 4 | 4 | 3 | 8 | 6 |
| TOTAL CUM RCH | | 2 | 6 | 6 | 8 | 16 | 20 |

FIG. 17B

SYNTHETIC TOTAL AUDIENCE RATINGS

RELATED APPLICATION(S)

This patent arises from a continuation of U.S. patent application Ser. No. 17/824,373, which is titled "SYNTHETIC TOTAL AUDIENCE RATINGS" and which was filed on May 25, 2022, which claims the benefit of U.S. Provisional Application No. 63/192,946, which is titled "SYNTHETIC TOTAL AUDIENCE RATINGS" and which was filed on May 25, 2021, and the benefit of U.S. Provisional Application No. 63/192,950, which is titled "SYNTHETIC TOTAL AUDIENCE RATINGS," and which was filed on May 25, 2021. Priority to U.S. patent application Ser. No. 17/824,373, U.S. Provisional Application No. 63/192,950 and U.S. Provisional Application No. 63/192,946 is claimed. U.S. patent application Ser. No. 17/824,373 and U.S. Provisional Application No. 63/192,946 are hereby incorporated by reference in their respective entireties.

FIELD OF THE DISCLOSURE

This disclosure relates generally to audience measurement and, more particularly, to determining synthetic total audience ratings.

BACKGROUND

Historically, television broadcasting has been offered to viewers in a linear way, meaning that each television program is scheduled and delivered on a particular channel at a given date and time. Under such a television broadcasting scheme, during breaks, all the viewers watching the same program are exposed to the same ads from advertisers who have bought time expecting to reach their target audience. In the past, audience measurement has relied on a selected panel of viewers, who are given a streaming meter tracking their viewing activity. Each panelist is then assigned a weight, so that the panel can represent an entire population of viewers.

BRIEF DESCRIPTION OF THE DRAWINGS

FIG. 17A-B include tables representative of example outputs of the example streams attribution process of FIG. 11.

In general, the same reference numbers will be used throughout the drawing(s) and accompanying written description to refer to the same or like parts. The figures are not to scale.

Figure 1:
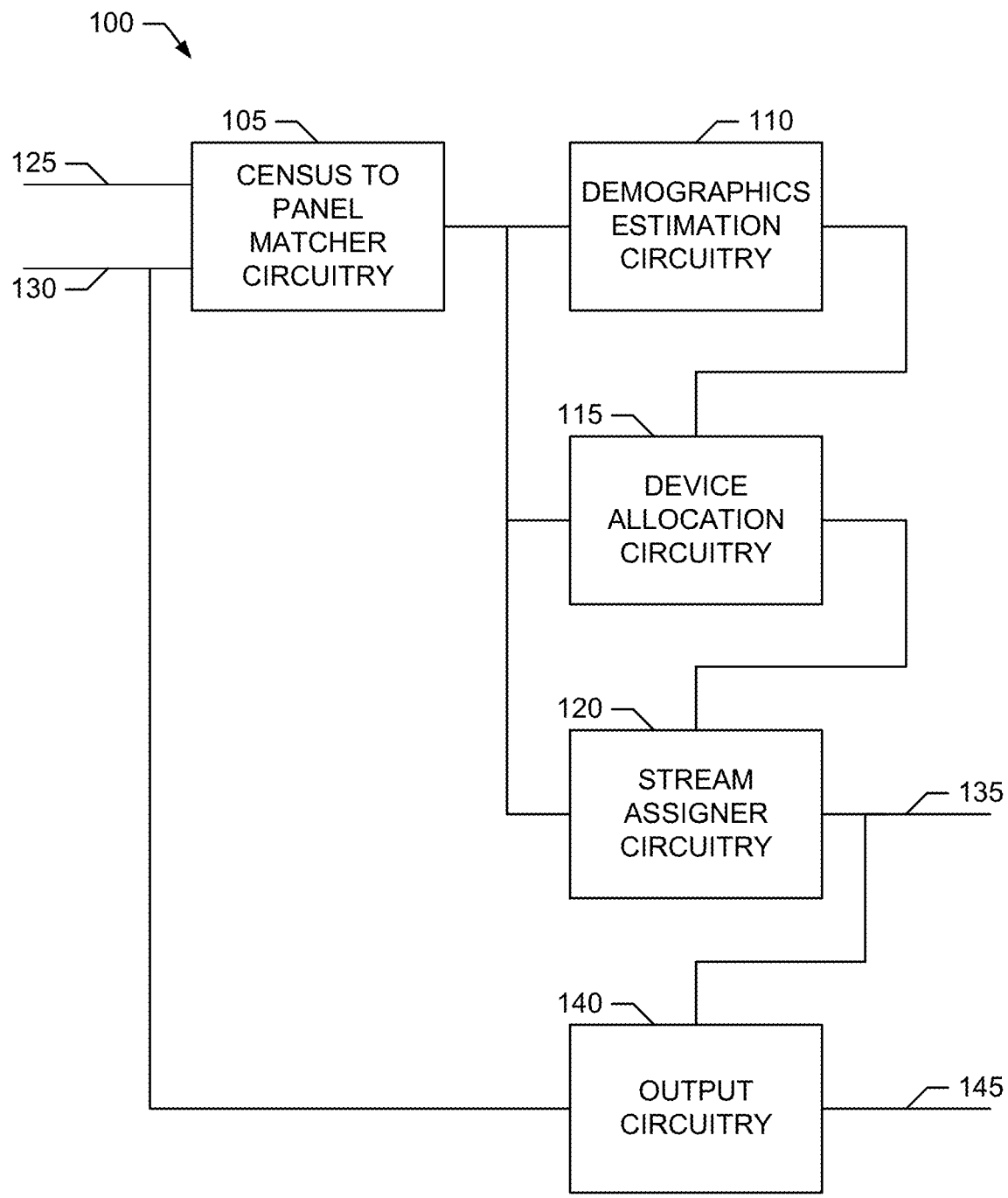
FIG. 1 is a block diagram of an example system to implement synthetic total audience ratings (STAR) in accordance with the teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Example methods, apparatus, systems and articles of manufacture (e.g., physical storage media) to determine synthetic total audience ratings are disclosed herein. Audience measurement entities (AMEs) seek to understand the composition and size of audiences of media, such as television programming. Such information allows audience measurement entity researchers to, for example, report advertising delivery and/or targeting statistics to advertisers that target their media (e.g., advertisements) to particular audiences. Additionally or alternatively, such information helps to establish advertising prices commensurate with audience exposure and demographic makeup (referred to herein collectively as audience configuration).

As mentioned above, historically, television broadcasting has been offered to viewers in a linear way, meaning that each television program is scheduled and delivered on a particular channel at a given date and time. Under such a television broadcasting scheme, during breaks, all the viewers watching the same program are exposed to the same ads from advertisers who have bought time expecting to reach their target audience. In the past, audience measurement has relied on a selected panel of viewers, who are given a streaming meter tracking their viewing activity. Each panelist is then assigned a weight, so that the panel can represent an entire population of viewers.

With the proliferation of new devices and platforms, in the last decade the television industry has undergone a massive transformation. For example, there has been an increasing trend of non-linear viewing activity, especially among some demographic groups, with broadcasters working more and more closely with over the top (OTT) services to get the attention of audiences, as well as advertisers moving their budgets to include a wider mix of digital media. Audience measurement had to evolve accordingly by adding digital panels and streaming meters designed to provide reliable measurement for digital viewing activity.

Attempts were made in the past to join together linear television audience measurements with non-linear, digital audience measurement to measure a total audience across media technologies, but despite progress being made, prior solutions may not yield an accurate or complete measurement of the total audience. Furthermore, this paradigm shift towards non-linear viewing activity has reached a pace so fast that, without an evolution of audience measurement, broadcasters will be challenged to monetize all of their audiences and capitalize on advertiser investments. For example, the audience has become so fragmented among the plethora of devices and platforms that new trends in terms of non-linear viewing can no longer be underestimated. In this context, a goal of Synthetic Total Audience Ratings (STAR), as disclosed herein, is to provide clients with a complete measurement of audiences across an increasingly vast media landscape.

STAR is an innovative solution aimed at measuring content across all formats and devices in order to provide clients with a more comprehensive currency. With consistent and comparable metrics, clients can have a better understanding of who their audiences are and how their viewing activity is made. This enables them to optimize their media mix and improve their planning of program schedule and advertising campaigns to reach their audiences.

In order to measure the total audience, the STAR methodology utilizes both panel and census data. As for the former, the panel data is measured with media device meters and/or streaming meters, which are installed in panelist households as extensively as possible. As for the latter, the census data is measured with a software development kit (SDK) capable of identifying devices through a unique device identifier, referred to herein as the first party identifier (ID). Furthermore, the STAR methodology harmonizes the media metadata such that it is consistent across broadcasters.

Turning to the figures, FIG. 1 is a block diagram of an example STAR system 100 to implement synthetic total audience ratings in accordance with the teachings of this disclosure. The example STAR system 100 of FIG. 1 may be instantiated (e.g., creating an instance of, bring into being for any length of time, materialize, implement, etc.) by processor circuitry such as a central processing unit executing instructions. Additionally or alternatively, the example STAR system 100 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

The example system 100 of FIG. 1 includes example census to panel matcher circuitry 105, example demographics estimation circuitry 110, example device allocation circuitry 115, example stream assigner circuitry 120 and example output circuitry 140. The census to panel matcher circuitry 105 of the illustrated example matches input census data 125 with input panel data 130 to identify panelists represented in the census data. In some examples, the census to panel matcher circuitry 105 is instantiated by processor circuitry executing census to panel matcher instructions and/or configured to perform operations such as those represented by the flowchart of FIG. 19.

The demographics estimator circuitry 110 of the illustrated example uses the output of the panel matcher circuitry 105 to estimate demographics associated with the census tuning data (e.g., viewing events) in the census data 125. In some examples, the demographics estimator circuitry 110 performs such estimation by associating the census tuning data with demographic details of the panelists through information related to the content (e.g., what is viewed), census device (e.g., who did the viewing) and behavior (e.g., how the viewing occurred). For example, the output of the demographics estimator circuitry 110 may be probabilities that a given viewing event (or tuning event) represented in the census data 125 is associated with corresponding possible demographic categories. In some examples, the demographics estimator circuitry 110 is instantiated by processor circuitry executing demographics estimator instructions and/or configured to perform operations such as those represented by the flowchart of FIG. 19.

The device allocator circuitry 115 of the illustrated example allocates the census devices represented in the census data 125 to panel devices associated with the panel data 130 using the output of the demographics estimator circuitry 110 and historical behavioral information. In some examples, the device allocator circuitry 115 implements an algebraic solution to perform such device allocation based on a matrix of demographic probabilities output from the demographics estimator circuitry 110. In some examples, the device allocator circuitry 115 is instantiated by processor circuitry executing device allocator instructions and/or configured to perform operations such as those represented by the flowchart of FIG. 19.

The stream assigner circuitry 120 of the illustrated example uses the output of the device allocator circuitry 115 to attribute the census data 125 to the panelists. In the illustrated example, the stream assigner circuitry 120 splits respective panelists into a number of splits of different split weights such that the sum of the split weights of the splits matches the panelist's overall weight. In the illustrated example, the stream assigner circuitry 120 assigns tuning/viewing events in the census data 125 to combinations of such panelist splits to attribute the census data 125 to the panelists. For example, the stream assigner circuitry 120 may assign minute-by-minute viewing statements in the census data to combinations of panelist splits. In the illustrated example, the stream assigner circuitry 120 outputs example synthetic total audience ratings data 135 based on the assignment of the census tuning/viewing events to the panelist splits. In some examples, the stream assigner circuitry 120 is instantiated by processor circuitry executing stream assigner instructions and/or configured to perform operations such as those represented by the flowchart of FIG. 19.

The output circuitry 140 of the illustrated example merges the synthetic total audience ratings data 135 output from the stream assigner circuitry 120 with one or more portions of the panelist data 130 corresponding to other tuning/viewing events to output example final total audience ratings data 145. In some examples, the output circuitry 140 is instantiated by processor circuitry executing output processing instructions and/or configured to perform operations such as those represented by the flowchart of FIG. 19.

Figure 2:
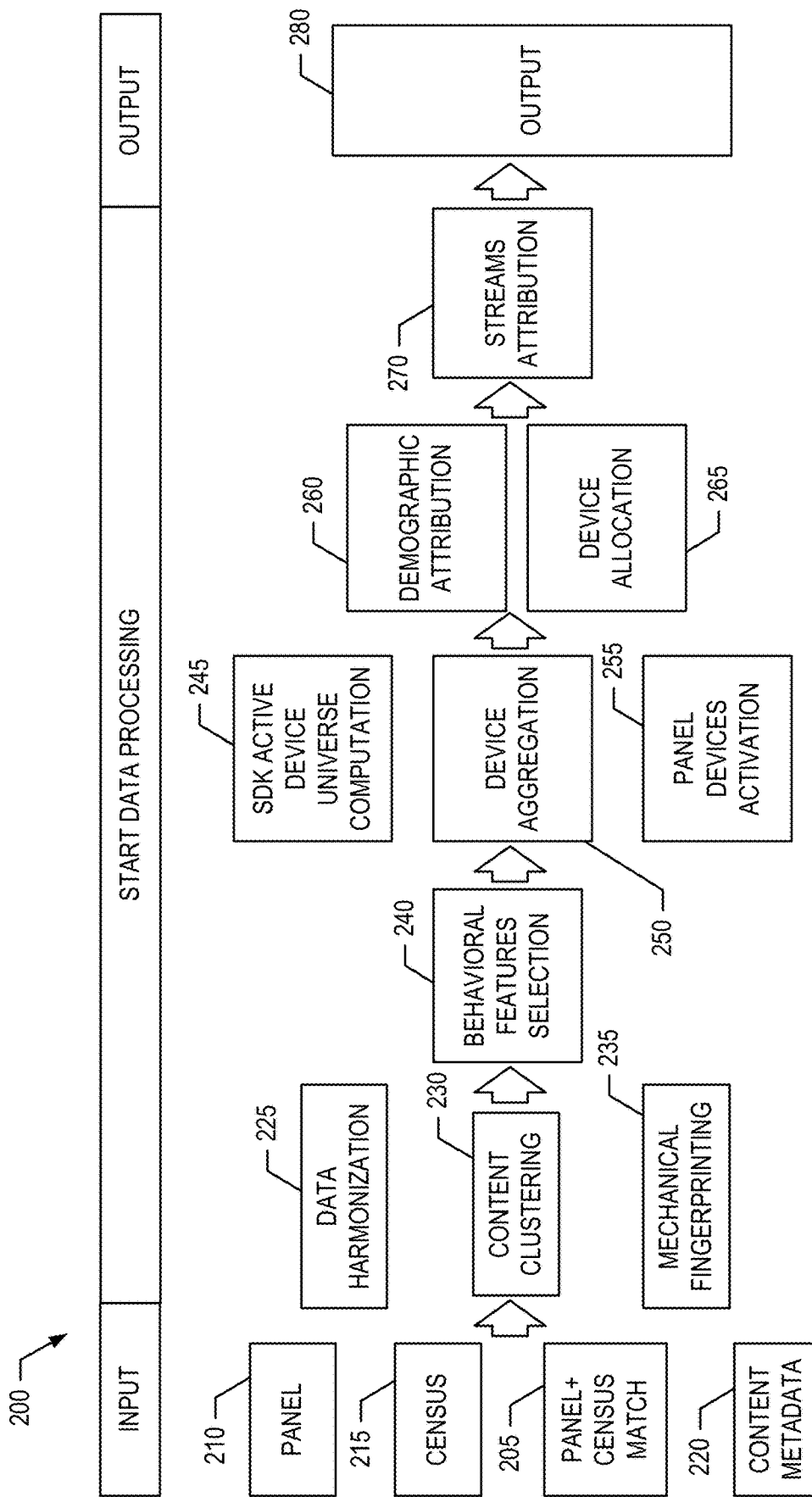
FIG. 2 is a block diagram of an example STAR process flow implemented by the example system of FIG. 1.

A block diagram of an example STAR process flow 200 implemented by the example STAR system 100 of FIG. 1 is illustrated in FIG. 2. In the example STAR process flow 200, the census to panel matcher circuitry 105 of the system 100 implements an example panel and census match process 205 to process example input panel data 210 and example input census data 215, as disclosed in further detail below. In the illustrated example, the census to panel matcher circuitry 105 also collects example input media content metadata 220 for use in the STAR process flow 200.

In the example STAR process flow 200, the demographics estimation circuitry 110 of the system 100 implements an example data harmonization process 225, an example content clustering process 230, an example mechanical fingerprinting process 235 and an example behavioral features selection process 240, as disclosed in further detail below. In the example STAR process flow 200, the device allocation circuitry 115 of the system 100 implements an example SDK active device universe computation process 245, an example device aggregation process 250, an example panel devices activation process 255, an example demographic attribution process 260 and an example device allocation process 265, as disclosed in further detail below. In the example STAR process flow 200, the stream assigner circuitry 120 implements an example streams attribution process 270 that produces example synthetic total audience ratings output data 280, as disclosed in further detail below.

In some examples, the panel data 210 is obtained from a panel that includes some number of statistically selected households (e.g., 1650 households or some other number). In some examples, each panel household is equipped with a media device meter that measures television viewing activity associated with a monitored television, as well as a streaming meter that measures digital viewing activity in the panel household, if the panel household is broadband capable. In some such examples, the panel data 210 measured with the media device meter includes television (TV) panel data representing TV viewing events, with each TV viewing event containing information about the panelist ID, the media content, the viewing platform, the start time and the end time, which is also combined with demographic related to the viewer. In some such examples, the panel data 210 measured with the streaming meter includes digital panel data that represents digital viewing events, with each digital viewing event containing information about the panelist ID (primary device user), the media content, the platform (smartphone, tablet, desktop), the start time and the end time.

In some examples, the census data 215 is measured with an SDK that tags digital media content and enables representation of census viewing events. In some examples, each such census viewing event contains information about the device (not the viewer), the media content, the platform, the start time and the end time. In some examples, the census dataset contains a number of census viewing sessions that much larger than the panel viewing sessions contained in the panel data 210, such as on the order of millions of census viewing sessions.

For the panel and census match process 205, the digital content can either be SDK tagged or untagged, such that a streaming meter can measure both types of content, whereas the SDK can measure the SDK tagged content but not the untagged content. The digital panel data can then be split into two complementary sets containing tagged data and untagged data respectively. The tagged data is a subset of the census data, therefore an exact match can be established by the panel and census match process 205 between the digital panel devices viewing tagged contents and the census devices viewing the same contents. This match allows us the STAR process flow 200 to attribute the panel demographics information to the matched census devices. In some examples, untagged contents are integrated into the output data 280.

In some examples, the content metadata 220 is input data that inform the STAR process flow 200 regarding the typology of streamed contents and it provides information relevant for the estimation processes disclosed in further detail.

In the STAR process flow 200, the data harmonization process 225, the content clustering process 230, and the mechanical fingerprinting process 235 collectively implement data pre-preprocessing. For example, the data harmonization process 225 ingests the panel data 210, the census data 215 and/or the content metadata 220, harmonizes the data based on one or more validation rules, and creates data structures referred to herein a "critical cells," which represent the granularity of the STAR process flow 200. In some examples, the content clustering process 230 operates on the census data 215 to analyze the content types watched (e.g., displayed or otherwise presented) by each device. If two or more different content types are often watched by a single device, they can be clustered together by the content clustering process 230. Thus, clusters of content types are identified in the census data 215 based on the viewer behavior. As disclosed in further detail below, the output of the content clustering process 230 is used in the demographic attribution process 260.

In some examples, the mechanical fingerprinting process 235 addresses the technical problem that the number of devices appearing in the census data may be overestimated. The device identification is based on first party ID, permanent and consistent within a specific application but not across applications or web browsers or broadcasters. Thus, the STAR process flow 200 performs aggregation to reach a target number of devices, as described in further detail below. Mechanical fingerprinting as performed by the mechanical fingerprinting process 235 is a step in this direction as it allows devices to be aggregated based on metadata features. As the result may still be an overestimate, the number of devices may be further reduced by the device aggregation process 250 based on the viewers' behavioral features, as disclosed in further detail below.

In the example STAR process flow 200, the behavioral features selection process 240 produces an output consisting of a list of behavioral variables that are found to be relevant for the STAR process flow 200. As disclosed in further detail below, such features are applied before a geometric score distance computation and contribute to defining score features.

In the example STAR process flow 200, the SDK active device universe computation process 245, the device aggregation process 250, and the panel devices activation process 255 perform active devices estimation and aggregation. In some examples, panelists are assigned a (sample) weight regardless of them performing viewing activity or not, whereas in the census only actual viewing activity data is present. From the panel, the universe of active users is estimated and panelists are assigned an active weight, measuring their ability to represent the SDK active population for the day. At the census level, this information is used as a target for the device aggregation process 250. The panelist's active weight identified by the panel devices activation process 255 provides the number of census devices to be attributed to each panelist, with the actual attribution to be carried out by the device allocation process 265.

In the example STAR process flow 200, an aim of the demographic attribution process 260 is to establish how reasonable it is to attribute each census device to a particular digital panel device, with the actual attribution to be done by the device allocation process 265. In some examples, the demographic attribution process 260 implements three different approaches to be compared with each other, with one approach based on a recurrent neural network, another approach based on Siamese networks, and yet another approach based on geometric distance. The three different approaches take into account the viewers' behavior in different ways, and their output is a score matrix of all the possible couples of census devices and digital panel devices each with its corresponding score. In the illustrated examples, the process 260 is referred to as the example demographic attribution process 260. However, in some examples, the process 260 is referred to as an example device similarity attribution process 260.

In the example STAR process flow 200, the device allocation process 265 transforms a score matrix, via a dedicated optimization approach, into a matrix of zeros and ones representing the actual device allocation, attributing each census device to a digital panel device, as described in further detail below. In some examples, the number of census devices attributed to each digital panel device is provided by the active devices estimation and aggregation process mentioned above, and fulfills given constraints. As an outcome of the device allocation process 265, each census device inherits the granularity of information of the digital panel.

In the example STAR process flow 200, the streams attribution process 270 utilizes the established link between census devices and digital panel devices to attribute the census contents to the digital panelists. In some examples, the streams attribution process 270 involves a splitting of each panelist into a certain number of splits of different weights such that the sum of the weights of the splits matches the panelist's weight. Then, each census content is assigned to a set of splits of a given panelist while fulfilling constraints on the second-by-second reach, the cumulative reach and the impression counts. This is done for each individual panelist and per single content, with the advantage of the total metrics for multiple panelists being simply the sum of those metrics of each panelist.

In the example STAR process flow 200, output data 280 of includes record-level data where every content has the granularity of information of the digital panel, namely the household, the individual, the weight, the device, whether live or Video On Demand (VOD), the start time and the end time, etc. As there is a unique panel for both digital and TV data, this output can be further integrated with the untagged digital panel data and the TV panel data.

Let us now make a simplified example to get an idea of how the STAR process flow 200 operate in practice. Suppose the panel data 210 is based on a panel corresponding to 10 panelists and the census data 215 is based on a census corresponding to 10,000 devices. The devices appearing both in the digital panel and the census are matched by the panel and census match process 205, establishing a link between panel and census. The 10,000 census devices are an overestimation of the actual number of active devices (as determined by the SDK active device universe computation process 245 and the panel devices activation process 255), therefore the device aggregation process 250 is put in place based on mechanical and behavioral features (as determined by the mechanical fingerprinting process 235 and the content clustering process 230), boiling down the number to 8,000 census devices, with 8,000 being the estimated active population. Suppose now the census contains the information that 3,000 different devices viewed the same content broadcasted by a certain channel each on their device at possibly different times. These 3,000 census devices are attributed to 3 panelists based on the similarity of the demographic profile and the similarity of the viewings of that day and previous days (as determined by the demographic attribution process 260 and the device allocation process 265). Imagine that the first of the three panelists is assigned 800 of the 3,000 census devices for that content, the second panelist is assigned 1,000 devices and the third panelist 1,200 devices. The first panelist is split into a given number of splits, and the 800 census devices are attributed to such splits so that the second-by-second reach, the cumulative reach and the impression counts are consistent with the census data (as performed by the streams attribution process 270). Since this is done separately for each panelist, the metrics can be directly summed among the panelists. Eventually, the output data 280 is produced, which includes record-level data for each census device that has the granularity of information of the digital panel. In some examples, the output data 280 also includes the TV panel data integrated with the produced record-level data for each census device.

In the illustrated example of FIG. 2, the STAR process flow 200 utilizes both panel data 210 and census data 215, as well as some methodological characteristics. In some examples, the panel data 210 is based on panel that is a sample of users selected based on suitable criteria to be representative of a whole population. The elements of the panel are the households (HHs). In some examples, the panel is as large as 1650 households or some other number of households, each equipped with a media device meter measuring TV viewing activity, and a streaming meter measuring digital viewing activity, if the HH is broadband capable. The composition of the households is known in detail, including all the demographics information of the members. When doing viewing activity, the users enter the information on who is watching the content into the meters.

In some examples, an important data concerning the panel is the panel sample minimum broadband, that is the minimum number of households required to have access to broadband internet. Broadband availability may not be an actual concern in some audience measurement regions (e.g., countries), but it should not be taken for granted in general. In some examples of the STAR process flow 200, the minimum broadband sample is required to include 1,000 households, or some other minimum number.

In some examples, the streaming meter should be installed at all the potential households as extensively as possible. In some examples, a tolerance of 5% (or some other tolerance) of the total required 1,000 households (or some other number of households) is accepted for each reason for non-installation. As an example, the number of households without a streaming meter installed because they do not possess a TV can be 50 at most.

In some examples, the digital devices of the members of a household are also registered in that household, and for each of them it is declared who the primary and the possible secondary users are. In some such examples, the digital devices of a household are mapped to the streaming meter, with exceptions such as work phones. In some examples, the maximum acceptable amount of unmapped digital devices is 20% (or some other percentage) of the total digital devices.

In some examples, the digital census data 215, or simply the census data 215, contains data on all the viewing activity done by digital devices for contents tagged with by an SDK provided by the audience measurement entity (AME) operating the STAR process flow 200. In some examples, the census data 215 is measured with an AME SDK capable of identifying devices through an identifier referred to herein as the first party ID. In some examples, STAR process flow 200 provides for the possibility of detecting and excluding non-working SDKs. In some examples, there is no maximum or minimum number of SDK tagged contents required for the STAR process flow 200.

In some examples, the metadata of the SDK-tagged media content includes the typologies of available contents and should be consistent across broadcasters. In some examples, devices are identified across sessions, at least for some fields such as broadcaster and usage type.

In some examples, the digital census data 215 includes information to identify the digital panel viewing sessions within the census, so that they can be matched. This information establishes a link between the digital panel and the census, which is utilized by the STAR process flow 200.

In some examples, the media content metadata 220 informs the STAR process flow 200 regarding the typology of streamed contents and it provides information relevant for the estimation processes. In some examples, the media content metadata 220 is fetched from a content metadata source, such as the Gracenote® smart-matching library. When Gracenote information does not reach enough coverage, a booster can be applied by leveraging the daily logs provided by the client to inform the STAR process flow 200.

In some examples, for the STAR process flow 200 to operate correctly, content metadata is required to cover at least 75% (or some other percentage) of the media contents, and the content metadata 220 is expected to attach the contents with fields such as the typology, the name content and the length per single content ID, etc. In some examples, the logs of previous days are also expected to be provided by the client by specified time for each production date.

As mentioned above, there can be missing measurements within a household due to the streaming meter not being installed, or devices being unmapped, etc. In order to make up for this lack, a fusion is used to link registered but unmeasured devices to the registered and mapped devices. Additionally or alternatively, in some examples, a weighting procedure is used, in which the devices registered in the panel are assigned a weight, regardless of them being active or not. In some examples, to make the weighting as accurate as possible, on the census side, the devices existing in the population are taken into account regardless of them being SDK-active or not.

Figure 3:
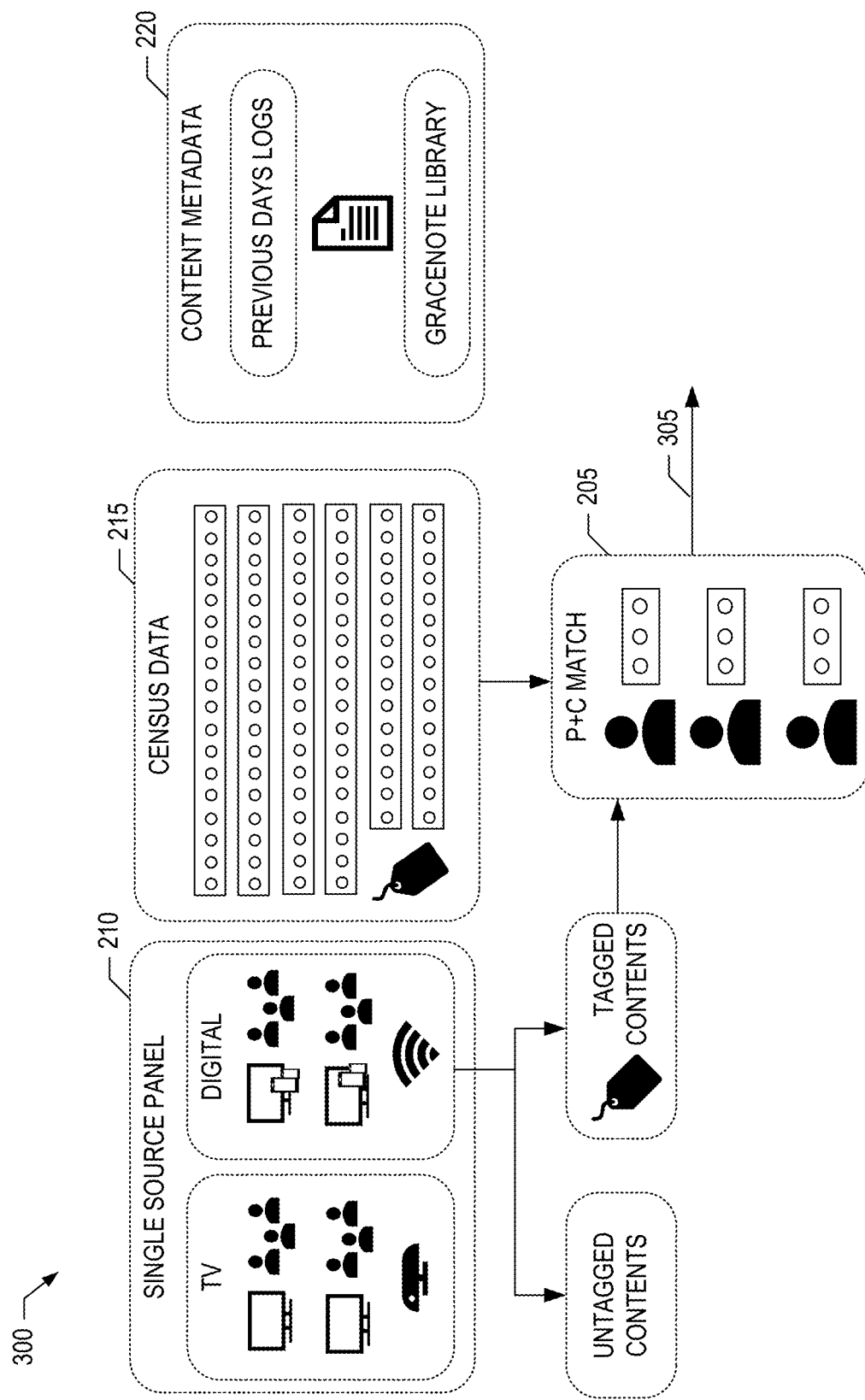
FIG. 3 illustrates example features of the input data processed by the example STAR process flow of FIG. 2.

FIG. 3 illustrates example features 300 of the input data processed by the example STAR process flow 200 of FIG. 2. As described above, the input data processed by the STAR process flow 200 includes the panel data 210, the census data 215 and the content metadata 22. Viewing activities done by panelists on SDK tagged contents are present both in the panel and the census data, which are used by panel and census match process 205 to establish a link between the two datasets, which also serves as an input for STAR.

With respect to the panel data 210, a single source panel, or simply the panel, is a sample of individuals and households purposely designed in order to be representative of the whole population. Very granular information is known about the panelists' demographics, and their viewing activity is measured by a streaming meter and a media device meter. In the following, the process from panel selection to final panel data production is described.

A first step towards the building of the panel is the determination of a set of characteristics relevant for the viewing activity. These include, for example, age, gender, household size, region, etc. The panelists are then selected so that the panel is balanced on these characteristics in the same way the population is. Their viewing activity is measured by two meters installed in the households, the media device meter and the streaming meter.

In some examples, the media device meter is an AME device installed on the TVs in the panelist households to measure the viewing activity done by panelists on TVs and Smart TVs. The media device meter registers the switch on and off, the content that is being watched second by second, whether on satellite antenna or IPTV and so on, and by whom the content is being watched. In some examples, each individual in the household is associated with a different button on the remote controller of the media device meter, so that by pressing the corresponding button the users are attributing their demographics to that content being watched.

The streaming meter is a different device installed in a panelists household and connected to the household WiFi network to measure the viewing activity done by panelists on digital devices. In order for the streaming meter to measure viewing activity, a broadband connection is utilized in the household. In contrast with the media device meter, digital device users do not press a button to state who is watching a given content. Instead, in some examples, each digital device is associated with the household member who is most likely to use that device, referred to as the primary user, to whom viewing activity done with that device is imputed. In some examples, since the device could be used with less probability by other users, referred to as secondary users, a correction referred to as viewing assignment is put in place post hoc.

An important point concerns the devices inside a household. When a streaming meter is installed, the devices in that household get registered with their technical information, such as the device type, the brand, the operating systems, etc., as well as the demographics of the primary user of that device. Such devices are referred to as mapped devices. There are, however, unmapped devices as well, namely devices in the household which are not registered and not associated with any individual of that household.

There are many different reasons why a device might be unmapped, for example new devices bought after the household has been recruited into the panel, or devices belonging to guests, or company devices whose owners might choose explicitly not to map, or still school devices given to students, etc. Both mapped and unmapped devices are measured by the streaming meter when doing viewing activity through the household WiFi, but the demographics attributed to the unmapped devices may be unknown.

In some examples, the mapping is limited to around 70-80% (or some other percentage) of the panel devices. Moreover, in some examples, the households with broadband connection are around 90% (or some other percentage) of all households. In some examples, as a solution to the missing mappings and broadband connections, a fusion is put in place to donate both the viewing activity of the mapped devices to the unmapped ones, as well as the viewing activity of the broadband households to the non-broadband ones. The result, which goes as an input for the STAR process flow 200, is a complete dataset with all devices being mapped and all the households being broadband.

In some examples, the panel includes 1,750 households (or some other number of households), but not all of them are in fact included in the daily production. For instance, some of them might experience any kind of technical issue, and should therefore be excluded. On a daily basis, selection rules and quality checks are run in order to determine the households to be included in the panel data 210, which are referred to as intab households, and are those households actually entering the daily production flow. In some examples, an intab rate of around 90% (or some other percentage) is expected, which corresponds to 1,570 households in a panel of 1,750 households.

In some examples, to be representative of the population, the intab portion of the panel undergoes a weighting procedure. The weighting procedure is made of two steps: random iterative method (RIM) weighting and soft calibration. In some examples, the weighting procedure performs soft calibration without RIM weighting.

In some examples, the constraints of the RIM weighting, which are the same as the hard constraints of the soft calibration, include one or more of the following: traditional vs non traditional household, household size, life cycle, dwelling type, city size, province, age by gender, education level, working status, TV size (e.g., 1 TV or 2+ TVs), Smart TV (e.g., yes or no), provider, etc. In some examples, the additional soft constraints implemented in the soft calibration are volumetrics, such as the total number of PCs, smartphones, tablets, etc.

In some examples, the weighting procedure generates weights both for the individuals and the households, although in some examples, the most used ones are those of individuals. However, in some examples, a situation where the household weights are used is the following. Traditionally, guests are assigned a weight depending on their age and gender only. However, for STAR process flow 200 may be configured to prefer the household's information over the individual's by assigning the guests the weight of the household they are doing viewing activity in. In some such examples, age and gender of guests are asked anyway, but they do not determine their weights.

The result is panel data 210 that represents viewing behavior of a panel, for both digital and TV, with weights assigned.

In some examples, the census data 215 consists of two datasets, one referring to sessions and the other referring to events, which are described below. The census data 215 is gathered from the AME SDK, which, in some examples, is a piece of software developed or otherwise provided by the AME and embedded by the client in either web pages or apps or both, and capable of measuring the viewing activities done on the web pages and/or apps it is integrated in. The SDK can be integrated on web pages only, on apps only or both of them, and this integration depends on the device as well. In some examples of the STAR process flow 200, the devices in scope are web and mobile devices, for example smartphones and tablets, but in principle other devices, such as over the top (OTT) devices could be included. Media contents with SDK integrated are referred to herein as tagged, and those media contents without SDK integrated are referred to herein as untagged. When a user starts viewing a tagged content, a ping is sent every 5 minutes (or some other interval) by the SDK to AME servers, which process the pings to produce the sessions and events datasets.

To help clarify what sessions and events are, consider the following example. Consider a user viewing a tagged content via either browser or app. The moment the viewing activity begins, an ID called the session id (sess_id) is generated randomly by the SDK, and a session is said to begin. Suppose at some point the viewing is paused for some reason, and resumed after some time. At the end, the user closes the browser or the app, and the session is over. This viewing activity constitutes a single session, but this session is made of two events: the first one starting at the very beginning together with the session and ending with the pause, and the second one starting with the resume and ending together with the session at the closure of the browser or the app. Thus, in the session dataset there will be a single data entry (e.g., row) represented by the above session id, whereas in the events dataset there will be two data entries (e.g., rows) associated with the same session id, one for each event.

In general, a session is a viewing statement associated with a single content, starting at the moment when the content is started being watched and ending either when the content is over or when switching to a different content or when the browser or app in which the content is being watched is closed, regardless of any pause, resume, rewind and fast forward activity in between. In some examples, each session is assigned a session id, a unique random code generated by the SDK. On the other hand, an event is a segment of a session delimited by a play or resume activity and a stop or pause activity.

Sessions and events are measured by the SDK and eventually reported in their respective datasets. In some examples, these datasets are designed to be global, meaning applicable across audience measurement regions (e.g., countries), and as such they contain a large number of different variables (also referred to herein as information elements), each corresponding to a different column, to be filtered for different applications. In the following, the variables relevant to the STAR process flow 200 are described.

In some examples, the sessions dataset has a first part contains variables with information about the content, such as:

resourcetype: The resource type variable identifies the format of the content. In some examples, the STAR process flow 200 assumes the value is "video".

session_starttime: The session start time variable identifies the date and time of the session start in coordinated universal time (UTC) format, e.g., 2020-09-20 00:00:00.

session_endtime: The session end time variable identifies the date and time of the session end in UTC format, e.g., 2020-09-20 00:38:32.

session_starttime_local: The session local start time variable identifies the date and time of the session start in local UTC format, e.g., 2020-09-20 01:00:00.

session_endtime_local: The session local end time variable identifies the date and time of the session end in local UTC format, e.g., 2020-09-20 01:38:32.

session_starttime_local_dst: The session local daylight savings time (DST) start time variable identifies the date and time of the session start in local UTC format with daylight saving time, e.g., 2020-09-20 01:00:00.

session_endtime_local_dst: The session local DST end time variable identifies the date and time of the session end in local UTC format with daylight saving time, e.g., 2020-09-20 01:38:32.

record_duration: The record duration variable identifies the effective duration of the session.

viewed_duration: The viewed duration variable identifies the effective duration of the viewed content, which in some examples is the sum of the duration of all the events associated with a session.

ad_or_content: The ad or content variable identifies whether the viewed media is an ad or content. In some examples of the STAR process flow 200, only viewed media that are contents are in scope.

vod_or_ls: The video on demand (VOD) or live stream (LS) variable identifies whether the viewed media is VOD or LS. In some example, VOD or LS classification does not depend on the date and time the content is viewed, but only on the nature of the content. For example, contents viewed via on-demand platforms are classified as VOD, while contents broadcasted by linear TV channels are classified as LS, even if they can be watched at later times via app or browser.

Length: The length variable identifies the total length of the content, regardless of how much of it has been watched.

client_id: The client ID variable identifies the broadcaster.

channel: The channel variable identifies the channel within the broadcaster.

In some examples, a second part of the sessions dataset contains variables with information about the device, for example:

sess_id: the session ID variable includes the session ID, which in some examples is a unique code generated randomly by the SDK to represent the session.

content_id: The content ID variable identifies the content within the broadcaster. In some examples, the same content broadcasted by two different broadcasters should have two different client_ids. If any two content_ids happen to be equal, this is regarded as a collision, since they may as well be two different contents on two different broadcasters.

category_1: The category 1 variable identifies the program, such as with its name. In some examples, the value of this variable is based in information provided by the broadcaster, which may be inaccurate.

tag_media_title: The tag media title variable identifies the program at a sublevel with respect to category_1, if possible, otherwise it can coincide with category_1. For example, if the content is a series, category_1 can be the series name and tag_media_title can be the episode name, whereas if the content is a movie, both category_1 and tag_media_title can be the movie title. some examples, the value of this variable is based in information provided by the broadcaster, which may be inaccurate.

uaid: The user association Id variable contains a user association ID, which is a code generated randomly by the SDK when the content is opened on the browser or app. The uaid does not change until the browser or app is closed, even if the content being watched changes. As described in further detail below, the uaid variable is used by the panel and census match process 205.

usage_type: The usage type variable, which is also referred as the access method variable (access method) takes on the values "app" or "web", representing whether the content has been viewed via app or via browser, respectively.

platform: The platform variable identifies the device. In some examples, the scope of the STAR process flow 200 is limited to smartphones, tablets, and desktops, but in other examples, other devices can be considered, such as OTT devices.

os_group: The operating system (OS) group variable describes the operating system of the device (e.g., iOS, Android, etc.). In some examples, the os_group does not identify the version of the OS.

In some examples, a third part of the sessions dataset contains variables with information about the SDK, for example:

sdk_ver: The SDK version variable identifies the version of the SDK embedded by the client.

In some examples, a fourth part of the sessions dataset contains variables with geographic information, for example:

region: The region variable includes information (e.g., a number) identifying the region of the country in which the session was made.

city: The city variable identifies the city of the country in which the session was made.

In some examples, a fifth part of the sessions dataset contains variables with information about the connection speed, for example:

connectionspeed: The connection speed variable describes the speed of the Internet connection the device doing the session relied on, e.g. broadband.

In some examples, a sixth part of the sessions dataset contains variables with information utilized by the panel and census match process 205, for example:

fpid: The first party ID variable contains the first party ID utilized by the STAR process flow 200. In some examples, the first party ID is a code generated randomly by the SDK when the content is opened on the browser or app. In some examples, the first party ID is similar to a cookie ID in the sense that the first party ID is unique within the broadcaster, operating system and usage type. In some examples, once generated, the first party ID is retained and stable for 6 months, even if the browser or app is open and closed many times.

panel_hh_id: The panel household identifier is initialized to a default value (e.g., not a number or NaN) and filled with the household ID of the corresponding panelist if the panel and census match process 205 identifies a match.

panel_site_id: The panel site identifier is initialized to a default value (e.g., NaN) filled with a meter ID of the corresponding panelist if the panel and census match process 205 identifies a match.

panel_viewing_location: The panel viewing location identifier takes on the values "inhome" and "outofhome". Inhome refers to in-home viewing that is attributed to the matched sessions measured both by the SDK and the streaming meter, and thus done via the WiFi connection of the household. Outofhome refers to out-of-home viewing and is attributed to the sessions measured by the SDK and matched in the panel but not measured by the streaming meter, and thus not done via the WiFi connection of the household, but by using some other network connections, such as the device's data network.

In some examples, the sessions dataset concludes a series of other variables, for example:

production_date: The production date variable identifies the date of production of the session dataset. In some examples, the session dataset is produced daily (e.g., each morning). In some examples, the day of production does not go from 00:00:00 to 23:59:59 of that day, but rather from 02:00:00 of that day to 01:59:59 of the following day. This is done to include in the production of a given day those contents starting close to the end of that day and ending shortly after the beginning of the following day.

The events dataset provides finer granularity of information to the STAR process flow 200 because multiple events can correspond to the same session ID in general. The events dataset contains many of the same variables as the sessions dataset, with some additions. Examples of additional variables included in the events dataset are:

ev_start: The event start variable identifies the start of an event. In some examples, an event can start with either a play action, a resume action or buffering activity.

ev_end: The event end variable identifies the end of an event. In some examples, an event can end with a stop action, a pause action or buffering activity.

ev_starttime: The event start time variable identifies the starting time of the event in UTC format. Similar to the sessions dataset, variables for the event starting time in local format with and without daylight saving time may also be present.

ev_endtime: The event end time variable identifies the ending time of the event in UTC format. Similar to the sessions dataset, variables for the event ending time in local format with and without daylight saving time may also be present.

reference_time: The reference time variable identities the time a live content was broadcasted, regardless of the time it was watched.

reference_shift_s: The reference shift variable identifies any time shift between the time a live content was broadcasted and the time it was watched. In some examples, this variable is used in the STAR process flow 200 to bring contents back from the time they have been watched to the time they have been broadcasted. In some examples, the time a content has been watched is in fact not relevant to the purpose of calculating its reach.

time_in_content: The time in content variable describes the second a VOD content starts being watched relative to its beginning. For instance, if the viewing of a VOD content starts at the 5th minute of that content, then time_in_content=300.

sess_id: The session ID variable includes the session ID of the session in which the event is included. The session IDF variable can be used to identify which events are associated with the same session.

In some examples, checks are performed on the sessions dataset and/or the events dataset included in the census data 215. For example, the events dataset may be checked to ensure it contains the proper same session ID(s). As another example, the viewing time may be checked. For example, a single session can potentially last a long time, if the player is paused without closing the browser or app, but the viewed_duration variable should coincide with the sum of the durations of the events associated with that session.

As described above, the sessions dataset and the events dataset of the census data 215 include the following three different IDs: the session id, the uaid and the fpid. Each of these IDS is generated randomly by the SDK when a content starts being watched on an app or browser, but they have different stabilities. For example, the session id persists for as long as the content being watched is not changed or as long as the app or browser is open. If either a new content starts being watched or the app or browser is closed, the session id ends.

In some examples, the uaid persists for as long as the app or browser is open. If the content being watched changes but the app or browser used does not get closed, the uaid does not change. The uaid ends when the app or browser is closed.

In some examples, the fpid persists for a relatively long timeout period, such as 6 months or some other duration. In some such examples, once the fpid is generated, the fpid does not change until the timeout period ends, even if the content being watched changes or the app or browser gets closed.

Feature of the panel and census match process 205 in the illustrated example of FIG. 3 are now described. As described above, panel viewing activity on tagged contents is measured not only by the streaming meter, but also by the SDK. The panel and census match process 205 operates to identify the viewings done by panelists in the census data and mark them by filling in the corresponding variables/fields in the census datasets described above. As such, the panel and census match process 205 attempts to figure out what census viewing activities are due to panelists. In the illustrated example, the input of panel and census match process 205 is both the panel data 210 and the census data 215, and the output is example updated census data 305.

In some examples, the streaming meter measuring the panel's viewing activity provides information with fine granularity concerning the panelists. For example, the panelist data 210 can include information such as age, gender, education, working status, province, city size, household size, number of TVs in the household, whether there are smart TVs in the household, etc. However, in some examples, the granularity of information provided by the streaming meter concerning the viewing activities is coarser. For example, the panelist data 210 may include details on the broadcaster of the content, the start time and end time, etc., but not on the usage type, the program, the episode, etc. For the census data 215 measured by the SDK, the situation can be the opposite in some examples. For example, the census data 215 can include fine granularity information on the viewing activities but none on the viewers.

The panel and census match process 205 establishes a link between the panelist dataset 210 and the census dataset 215 by identifying in the census data those viewing statements correspond to the panelists. This provides an understanding of which and how many census viewing activities are due to the same person, but limited to persons who are panelists. The matched viewing activities benefit from granularity of information on both the demographic side, given by the panel, and the viewing statements, given by the census.

In some examples, the variable used by the panel and census match process 205 to perform the matching is the aforementioned uaid. Recall that the uaid is an ID that is randomly generated by the SDK when an app or browser is used to view an SDK tagged content. The uaid persists until the app or browser gets closed, even if the watched content changes. In some examples, the uaid is measured both by the SDK and the streaming meter. Therefore, the sessions done by panelists appear both in the panel data and the census data with the same uaid.

The viewing statements with the same uaid in the census data and the panel data are then matched by the panel and census match process 205. In some examples, the census data, the columns dedicated to the match with the panel and defaulted as NaN, are updated by the panel and census match process 205 with information on the matched households, the device IDs, etc., wherever a match occurs. This attributes to each matched census viewing statement the demographics of the primary user of the corresponding panel device, even if that device can be used by other members of the household. In some examples, the unmatched census viewing activities are referred to as zero ratings. In some examples, the average daily sessions in the panel data are of order 0.1%-1% of those in the census data. Therefore, in such examples, only quite a small fraction of the census data is actually matched with the panel.

In some examples, for the streaming meter to measure the viewing associated with a certain uaid, that viewing must be done by using the household broadband (e.g., WiFi) connection, namely it must be "in home." In such examples, viewing activities corresponding to "out of home," which are those that do not rely on the household broadband connection and, instead, use another network connection (e.g., the device's data network connection) are not measured by the streaming meter and, therefore, do not appear in the panel data 210. This, however, does not completely prevent them from being matched in the census data. For example, the panel and census match process 205 can match such "out of home" viewing activities using the first party id, as follows.

Consider a panelist doing a viewing activity out of home on a tagged content. This is measured by the SDK but not by the streaming meter, so it appears in the census data 215 but not in the panel data 210. Suppose some days earlier the same panelist has done some viewing activity in home, therefore connected to the household broadband connection. When that viewing activity is measured by the streaming meter, the streaming meter also saves the first party id associated with that viewing, which can then be associated with that household in the panel data 210. Thus, when that same panelist does a viewing activity out of home, the first party id is measured by the SDK and the panel and census match process 205 can compare the first party ids in the census data 215 with those identified in the panel data 210 as belonging to the panelists having done some viewing activity in home in the past.

For the panel and census match process 205 to perform matching based on a first party id associated with a panelist, that panelist must have done at least one viewing activity in home in the past, and within the timeout period of the first party id such that the first party id has not changed in the meantime. If a panelist never uses the household broadband connection, the first party id associated with that panelist's viewing activity will not be measured by the streaming meter and, thus, the panel and census match process 205 will be unable to perform matching based on a first party id for that panelist.

In some examples, the updated census data 305 output from the panel and census match process 205 is limited to data elements (rows) of the session and event datasets for which the panel and census match process 205 identified matches between the panel and the census.

The content metadata 220 is used by the STAR process flow 200 to identify what content is actually being viewed. For example, the census data 215 may contains lots of information on the viewing activity, but not on what the viewed content actually is. However, for aspects of the STAR process flow 200 where the viewers' behavior comes is a factor, it may be beneficial to have information on the nature of the content, such as the genre, whether it is a film or an episode of a TV series, etc. For example, and as disclosed in further detail below, the STAR process flow 200 may utilize a Recurrent Neural Network to determine/estimate the demographic of the viewers based on their viewing behavior. Additionally or alternatively, in some examples, the STAR process flow 200 may utilize Geometric Score Distance in which a matching between the panelists' and the census devices' behaviors is performed. The content metadata 220 can be useful for such operations, such as when the matching depends not only on when a given content is watched, but also on what that content is.

In some examples, the STAR process flow 200 obtains the content metadata 220 from two sources: content metadata logs, and content metadata from the Gracenote library. In some examples, the content metadata logs are provided by a client (e.g., associated with content for which ratings are to be determined by the STAR process flow 200) contain some or all of the following feature field/data elements, which may be quite granular:

Target: The target feature field identifies who is the broadcast is intended for.

Contents: The content feature field identifies what is the content/topic of the broadcast.

Form: The form feature field identifies the form of the broadcast (e.g., talk show, music program etc.).

Frequency: The frequency feature field identifies whether the content is a single broadcast or an episode of a series.

Origin: The origin field identifies whether the content's origin is an in-house production, a co-production, a contract production, a foreign production, a license production, etc.

Broadcasting Status: The broadcasting status feature field identifies whether the content corresponds to a first time or repeated broadcast.

Production Division: The production division feature field identifies the production division of the content.

Subject Country: The subject country feature field identifies in which country does the broadcast takes place or what country is the focus of the broadcasted content.

Country of Origin: The country of origin feature field identifies the home country of the producer.

Purpose: The purpose feature field identifies whether the broadcast is studio-produced or transmitted, and whether it is live or time-shifted.

Place and Time of the Production: This feature field identifies the place and time of the production.

Year of Production: This feature field identifies the year of production.

Suggested Placing: This feature field identifies a suggested placing of the content.

Common Code: This feature field identifies the genre of the media content, similar to the content feature field.

In some examples, the logs of the contents scheduled for the current day are provided by the client and used in the daily run of the STAR process flow 200. Also, in some examples, the logs become part of a logs library updated on a daily basis, which can be particularly useful to retrieve metadata logs of past contents in case of need. The problem with the content metadata logs is that they are generated by the client, not by the AME, and therefore may not cover all the census contents. Accordingly, the Gracenote content metadata can be used to attribute metadata logs to those contents which are not represented in the client logs.

In some examples, the Gracenote content metadata contains some or all of the following feature field/data elements, which may be quite granular:

Gracenote ID: This feature field provides an identifier of the content in the Gracenote library.

Production Date: This feature field identifies the production date of the content.

Client ID: This feature field identifies the broadcaster of the content in the census.

Content ID: This feature field identifies the content in the census.

Gracenote Confidence: This feature field provides a percentage indicating the accuracy of the metadata, as described below.

Gracenote Match Type: This feature field identifies the type of content, such as "text," "audio," "visual," etc.

Default Name: This feature field includes the name of the content, which may be similar to the tag media title or the category 1 field of the census data, as described above.

Video Work Type: The feature field identifies whether the content is a preview-show, a music video, a miniseries, Ta V movie, a sport, a series, etc.

Genre. This feature field identifies a genre of the content (e.g., drama, documentary, mystery etc.)

In some examples, any census content is uniquely identified by the combination of the Client ID feature and the Content ID feature. In some examples, because it covers more census content, the STAR process flow 200 uses Gracenote content metadata only, and not client logs. However, client logs can provide information that is not available in the Gracenote metadata, such as information on the nature of the content through the Video Work Type and the Genre features. Thus, in some examples, the STAR process flow 200 relies primarily on the client logs for the content metadata, and limits use of the Gracenote metadata as a means to attribute logs metadata to those census contents not represented in the client logs.

In some examples, to perform this metadata attribution, a table is built with rows containing the Client ID and Content ID of those census contents without metadata logs, and columns containing the Client ID and Content ID of those census contents with metadata logs. Each entry of the table is a number representing the similarity between the content without metadata logs of the corresponding row and the content with metadata logs of the corresponding column. Each content without metadata logs is attributed the metadata logs of the content with the highest similarity. In some examples, this similarity is worked out based on a Glove Model, which takes the Video Work Type and the Genre of the Gracenote metadata as inputs.

For example, the Glove Model may translate words into vectors of a vector space, called the latent space, where vectors can be compared with each other in terms of a cosine similarity, which takes into account the reciprocal position of the vectors. In some examples, the translation of words into vectors, and consequently the comparison, occurs at a semantic level, namely based on the meaning of words. In some examples, the Glove Model is pre-trained on roughly 6 billion English words, so it is reasonable to assume that most English words can be taken as an input for the model.

Figure 4:
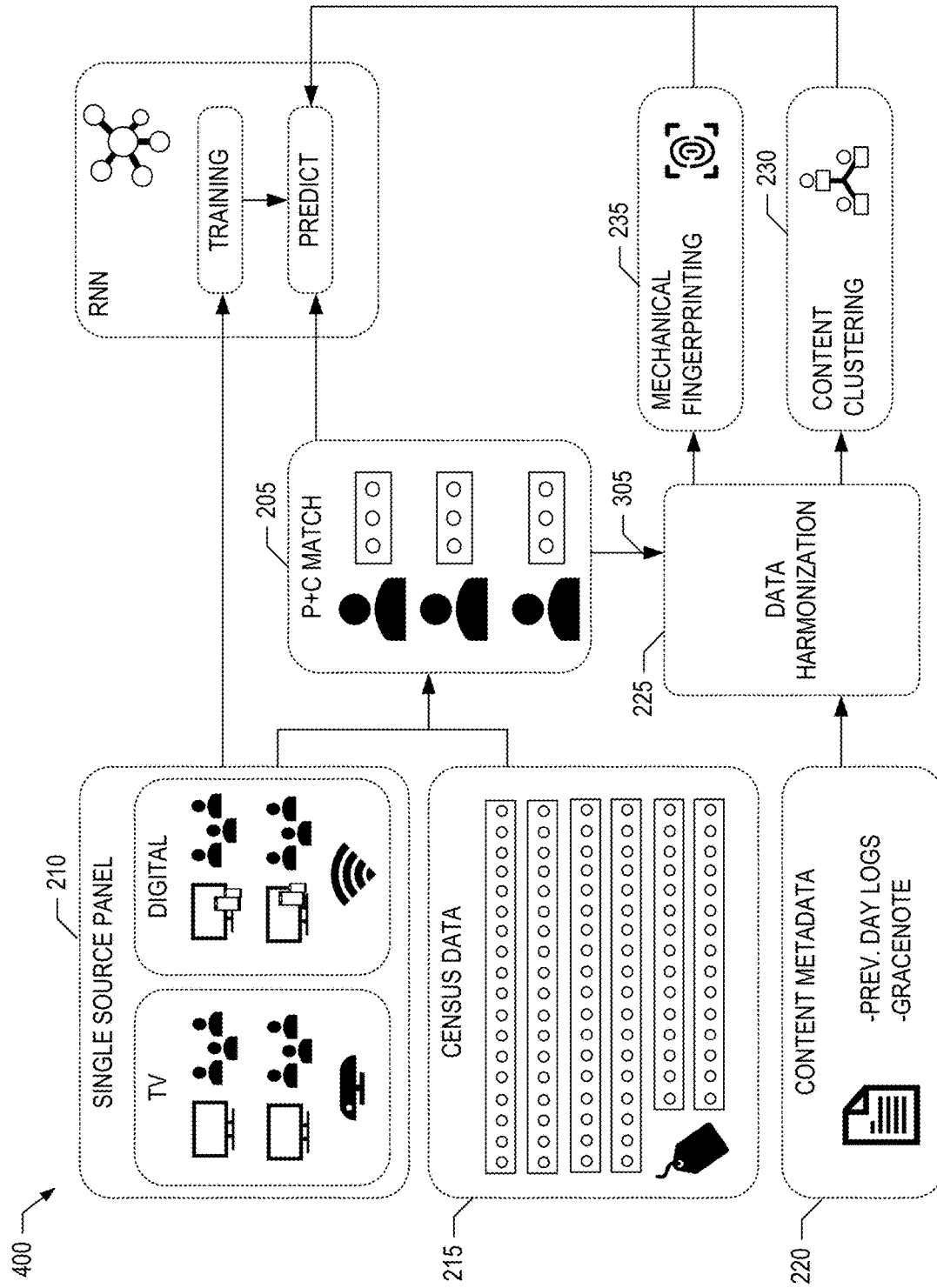
FIG. 4 illustrates an example input data pre-processing flow implemented by the example STAR process flow of FIG. 2.

FIG. 4 illustrates an example input data pre-processing flow 400 implemented by the data harmonization process 225, the content clustering process 230 and the mechanical fingerprinting process 235 in the example STAR process flow 200 of FIG. 2. In the example input data pre-processing flow 400, the data harmonization process 225 performs a harmonization of the panel data 210, the updated census data 305 and the contents metadata 220 to yield the harmonized input data to be processed by the STAR process flow 200. In some examples, the data harmonization process 225 cleans the panel data 210, the updated census data 305 and/or the contents metadata 220 by, for example, filtering out robotic traffic, etc. In some examples, the data harmonization process 225 performs a harmonization of the panel data 210, the updated census data 305 and/or the contents metadata 220 to make the data coherent by, for example, putting the time of viewing activities to the correct local time, etc.

In the illustrated example, the data harmonization process 225 also defines critical cells to be processed by the STAR process flow 200. A critical cell specifies the level of detail at which the STAR process flow 200 is performed, and identifies non-overlapping cases. In some examples, the different processing flows included in the STAR process flow 200 run at least at the critical cell level in a parallel mode. Using the critical cell concept disclosed herein in the STAR process flow 200 helps ensure consistency between input and output.

For example, for digital devices, the data harmonization process 225 of the illustrated examples defines the critical cells to be processed by the STAR process flow 200 as the following combinations:

critical_cell=device_type*os_group*usage_type

In some examples, the foregoing critical cell definition leads to the set of possible critical cells shown in Table 1. In Table 1, DSK refers to desktop computer, PHN refers to smartphone, TAB refers to table, WEB refers to content being accessed via a web browser, and APP refers content being accessed via an application.

TABLE 1

Critical cells for digital devices.

| Device Type | OS Group | Usage Type |
|---|---|---|
| DSK | Mac OS X | WEB |
| DSK | Windows | WEB |
| PHN | Android | WEB |
| PHN | Android | APP |
| PHN | iOS | WEB |
| PAN | iOS | APP |
| TAB | Android | WEB |
| TAB | Android | APP |
| TAB | iOS | WEB |
| TAB | iOS | APP |

In the illustrated example, the content clustering process 230 operates to clusterize the measured media contents based on features belonging to a selected feature group. In this way the enormity of the content in the catalog can be greatly reduced, because in subsequent processing of the STAR process flow 200, different contents belonging to a same cluster will be treated as a single content representative of that cluster. In some example, the features used by the content clustering process 230 to cluster content "genre," "type," "length," and "year." In some examples, the content clustering process 230 obtains those features through a join of the census data 215 and/or 305 and the content metadata 220, using Client ID and Content ID as keys. Thus, in some examples, only the unique values of the features combination ["genre," "type," "length," "year"] are used by the content clustering process 230 for content clustering.

In some examples, the content clustering process 230 utilizes the Leiden algorithm, which is a graph-based algorithm typically used to do community detection, to perform its content clustering. In some such examples, each content represents a node of the graph, and each link the similarity (or, inversely, the distance) between two contents. The goal is to join different nodes in communities (or clusters as used herein). In some example, the content clustering process 230 utilizes different metrics to calculate this distance between two contents based on which of the four features ["genre," "type," "length," "year"] is used to calculate the distance. For example, Cityblock (a.k.a. Manhattan) is the distance used for "year" and "length" features, Hamming is the distance used for "type" feature, where "type" one hot encoded, and Jaccard is the similarity used for "genre" feature, with the distance being calculated as 1−similarity. In this example, "genre" is assumed to be multilabel binarized. In some such examples, each of these distances returns a value between 0 (corresponding to two contents being treated as identical) and 1 (corresponding to two contents being treated as completely different). In some examples, the content clustering process 230 calculates a weighted average of the individual distances for the respective features to obtain a single final distance value (which will represent the value associated with the graph link). In some examples, the weights associated with each feature are as follows: ["genre": 0.5, "year": 0.25, "length": 0.125, "type": 0.125]. After this weighted average the final distance will still be in range (0, 1).

In some examples, the content clustering process 230 applies the Leiden algorithm on a daily basis to the census data 215 and/or 305. However, in some examples, the Leiden algorithm cannot be parallelized. Consequently, the content clustering process 230 loads the graph into memory in its totality. In some examples, if the dimensionality of the census data leads to an out of memory condition, the content clustering process 230 bins some features to reduce the number of unique combinations and therefore the number of nodes in the graph. In some examples, the only binnable features are the numerical features: "year" and "length". Additionally or alternatively, in some examples, if the dimensionality of the census data leads to an out of memory condition, the content clustering process 230 cuts out the weights below a given threshold, setting those weights to zero, thereby reducing the number of links in the graph to be loaded in memory. In some example, Leiden algorithm implemented by the content clustering process 230 has a tunable resolution parameter, which when increased has the effect of incrementing the number of communities (e.g. clusters) generated.

Figure 5:
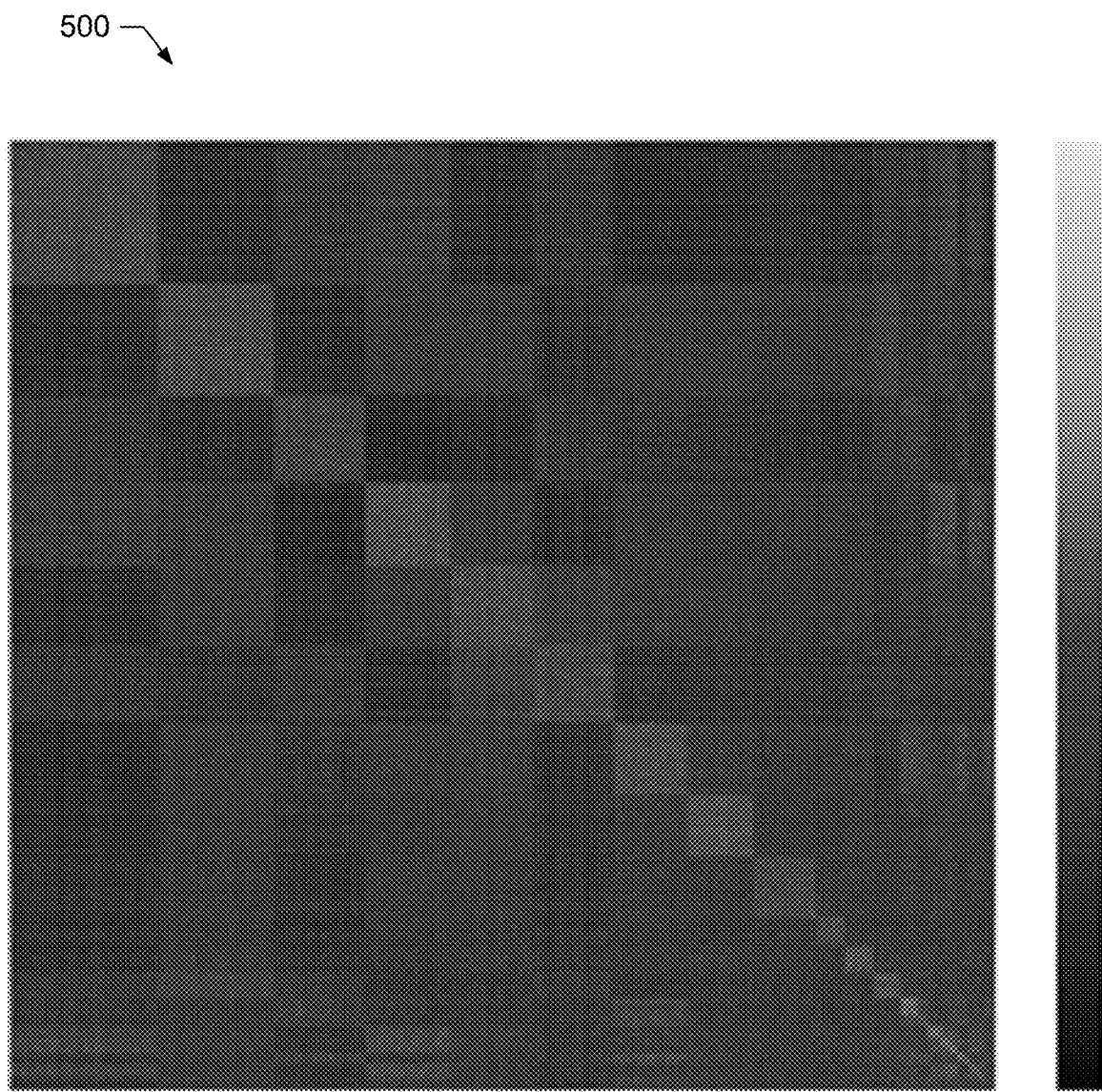
FIG. 5 illustrates an example similarity matrix utilized by the input data pre-processing flow of FIG. 4.

In some example, to check the validity of the generated clusters, the content clustering process 230 outputs (e.g., plots) an example reordered similarity matrix 500, which is illustrated in FIG. 5. The indices for both the rows and the columns of the reordered similarity matrix 500 correspond to the unique values of the combination of features ["genre", "year", "length", "type"]. The values in the reordered similarity matrix 500 represent the similarity between the content samples in the clusters represented by the intersecting indices. In the illustrated example, the values in the reordered similarity matrix 500 range from 0 to 1, with 1 representing maximum similarity and 0 representing minimum similarity. Thus, the diagonal of the matrix 500 will be 1. Reordering the samples so as to have side by side all the samples belonging to a specific cluster, it is possible to observe the square patterns representing the clusters themselves. The brighter the pattern and the greater the separation in brightness from adjacent cells, the better the clustering.

The output of the content clustering process 230 is a membership value, which can be a cluster membership index. In some examples, because the content clustering process 230 is carried out daily, there may be a problem of inconsistency of the membership values between different runs of the process. To address this problem, in some examples, on the first day, the content clustering process 230 is initialized starting with the condition that each single node consists of a singleton partition. The Leiden algorithm is run to merge the different partitions into clusters. From the next day forward, the Leiden algorithm graph is constructed as follows. First, the historical graph from the previous day (or days) is loaded. Second, using the current day's census data, the unique values of the combination ["genre", "year", "length", "type"] are extracted, which will form the nodes of the current day's graph. Nodes already present in the history (previous day or days) are not added to the graph, whereas new nodes are added to the graph as respective singleton partitions. Third, the Leiden algorithm is run is executed to determine the content clusters for the current day. Fourth, the historical graph is updated with the current day's clusters.

In this way, an ever-growing graph is constructed, which could lead over time to out of memory problems if not addressed. To avoid this, an aging procedure is implemented by the content clustering process 230. In some examples of the aging procedure, when a node is inserted into the graph, it is associated with a counter, which represents the number of days after which the node is to be deleted from the graph. In some example, the initial value of the counter is represented by an aging parameter. Day by day, the counter of each node is decremented. However, if the node is present in the current day's census data, the counter linked to the node is reset to the original value.

In the illustrated example, the mechanical fingerprinting process 235 has a goal to give each viewing statement an ID referred to herein as DEV, which represents the physical device which did the viewing. In some examples, DEV is created using DEVID (Android's Advertising-ID) when available (e.g., for android devices), otherwise the FPID is used. In some examples, the mechanical fingerprinting process 235 uses DEVID to create the DEV ID when DEVID is available, and defaults to using FPID when DEVID is not available, because DEVID is maintained across applications and doesn't change unless the user manually resets it. However, because the FPID (or even the DEVID) for a device may change, the mechanical fingerprinting process 235 may overestimate the number of devices. Even so, for any given viewing statements with the same DEV there is the certainty that they are made by the same device.

In some examples, the mechanical fingerprinting process 235 also generates a fingerprint of the device hardware and software configuration, which is referred to as VDG, which can be used to aggregate devices and fix the overestimation of the mechanical fingerprinting process 235.

Tables 2-4 illustrate example critical cell values determined by the example input data pre-processing flow 400 across a 7 day period.

TABLE 2

| Critical Cell | Sum of viewed duration |
|---|---|
| DSK.Mac OS X.WEB | 1904805749 |
| DSK.Windows.WEB | 3172785860 |
| PHN.Android.APP | 1328955397 |
| PHN.Android.WEB | 128026643 |
| PHN.iOS.APP | 2845212833 |
| PHN.iOS.WEB | 120205155 |
| TAB.Android.APP | 705785380 |
| TAB.Android.WEB | 35590109 |
| TAB.iOS.APP | 4785133171 |
| TAB.iOS.WEB | 258377351 |

TABLE 3

| Critical Cell | VOD or Live | Sum of Viewed Duration |
|---|---|---|
| DSK.Mac OS X.WEB | live | 362209287 |
| | vod | 1542596462 |
| DSK.Windows.WEB | live | 1182081791 |
| | vod | 1990704069 |
| PHN.Android.APP | live | 474281951 |
| | vod | 854673446 |

TABLE 3-continued

| Critical Cell | VOD or Live | Sum of Viewed Duration |
|---|---|---|
| PHN.Android.WEB | live | 24088508 |
| | vod | 103938135 |
| PHN.iOS.APP | live | 907362380 |
| | vod | 1937850453 |
| PHN.iOS.WEB | live | 5942046 |
| | vod | 114263109 |
| TAB.Android.APP | live | 262142060 |
| | vod | 443643320 |
| TAB.Android.WEB | live | 6747449 |
| | vod | 28842660 |
| TAB.iOS.APP | live | 1777279430 |
| | vod | 3007853741 |
| TAB.iOS.WEB | live | 31664391 |
| | vod | 226712960 |

TABLE 4

| Critical Cell | Number of devices with at least one live and one VOD viewing activities |
|---|---|
| DSK.Mac OS X.WEB | 27431 |
| DSK.Windows.WEB | 43919 |
| PHN.Android.APP | 68957 |
| PHN.Android.WEB | 2080 |
| PHN.iOS.APP | 125669 |
| PHN.iOS.WEB | 1920 |
| TAB.Android.APP | 15252 |
| TAB.Android.WEB | 548 |
| TAB.iOS.APP | 103414 |
| TAB.iOS.WEB | 4547 |

Returning to the example STAR process flow 200 illustrated in FIG. 2, the example behavioral features selection process 240 operates to select behavioral features to be used to identify the behavior of a person by analyzing a sequence of two consecutive viewing events made by that person. In some examples, the behavioral features selection process 240 determines features by grouping together multiple views made by the same panelist ID (pid) and device ID (dev) (e.g., pid/dev) across a given period. In some examples, the pid for a given panelist in a given household is formed by concatenating the household ID of that household with the household member ID of that panelist. In some examples, the computed behavioral features provided by the behavioral features selection process 240 are used in the STAR process flow 200 for score computation, device aggregation, and demographic attribution (which may be in addition or an alternative to an approach utilizing a recurrent neural network). In some examples, to obtain a wider set of features, the behavioral features selection process 240 determines additional aggregated features for each pid/device. Such features are determined as described below and grouped according to the different information to which they refer.

For example, a first group of behavioral features determined by the behavioral features selection process 240 takes into account the amount of time elapsed between two different sessions belonging to the same panelist/device. Examples of behavioral features in this first group include the following:

avg_time_elapsed_minutes: The average time in elapsed minutes behavioral feature corresponds to the number of minutes elapsed on average between two consecutive sessions for the same panelist/device. It assumes the value of a non-integer number.

std_time_elapsed_minutes: The standard deviation of time in elapsed minutes behavioral feature corresponds to the standard deviation of the distribution of time elapsed, measured in minutes, between two different sessions for the same panelist/device. It assumes the value of a non-integer number.

min_time_elapsed_minutes: The minimum time in elapsed minutes behavioral feature corresponds to the minimum interval of time, in minutes, separating two different consecutive sessions for the same panelist/device. It assumes the value of a non-integer number.

max_time_elapsed_minutes: The maximum time in elapsed minutes behavioral feature corresponds to the maximum interval of time, in minutes, separating two different consecutive sessions of the same panelist/device. It assumes the value of a non-integer number.

In some examples, the behavioral features selection process 240 determines the four preceding features above based on the session_starttime_local values included in the census data, as described above.

In some examples a second group of behavioral features determined by the behavioral features selection process 240 characterized consecutive events in the census data. For example, the behavioral features selection process 240 utilizes fields of the content metadata logs described above to create behavioral features that contain information for the most frequent content metadata values for each pid/device. In some examples, from among the 14 different feature fields included in the content metadata logs described above, the behavioral features selection process 240 uses the four feature fields of Target, Contents, Form and Frequency to build the second set of behavioral features characterizing consecutive events. Examples of behavioral features in this first group include the following behavioral features generated based on the Target feature field of the content metadata logs:

most_frequent_md_target_1: This behavioral feature corresponds to the most frequent value of the first level of the target metadata, e.g., the mode of the attribute md_target_1, for each panelist/device. The format is the same as in md_target_1.

most_frequent_md_target_1_count: This behavioral feature corresponds to the number of sessions in which the attribute md_target_1 assumes its most frequent value at the first level. It is an integer number.

most_frequent_causal_effect_md_target_1: This behavioral feature corresponds to the most frequent sequence of two elements given by the mode of the distribution of all the pairs of two consecutive sessions for each pid/device. It is a categorical feature, which has been one-hot encoded.

most_frequent_causal_effect_md_target_1_count: This behavioral feature corresponds to the number of times in which the pair containing two consecutive sessions for the same pid/device assumes its most frequent value. It is an integer number.

In some examples, the behavioral features selection process 240 determines similar features based on the Contents, Form and Frequency feature fields of the content metadata logs. In some examples, the behavioral features selection process 240 determines the preceding features above based on the session_starttime_local values included in the census data, as described above.

In some examples, the behavioral features selection process 240 generates its behavioral features only for devices that are active on the day the features are calculated. In some examples, it is possible to define the length of the period over which the behavioral features are calculated through an input parameter. In some examples, the categorical features are one-hot encoded. In some examples, it is also possible to specify the name of the parameter (e.g., column) the behavioral features selection process 240 is to use for aggregation (e.g. pid or dev).

In some examples, the results of the behavioral features selection process 240, are two different tables: one containing all the pids and other one containing all the devices. In some examples, the behavioral features selection process 240 includes the features listed above in both tables, along with the following two additional attributes:

n_sessions: The number of sessions attribute contains the number of total sessions corresponding to each pid/device. Such a number depends on the choice made when selecting the period on which to extract the feature. It is an integer number.

production_date: The production date attribute contains the date when the features were produced by the behavioral features selection process 240.

The behavioral features output by the behavioral features selection process 240 are used in various aspects of the STAR process flow 200. For example, the produced behavioral features are used in the principal component analysis (PCA) performed before the geometric score distance computation disclosed in further detail below, and produced behavioral features contribute to defining score features, as disclosed in further detail below.

Figure 6:
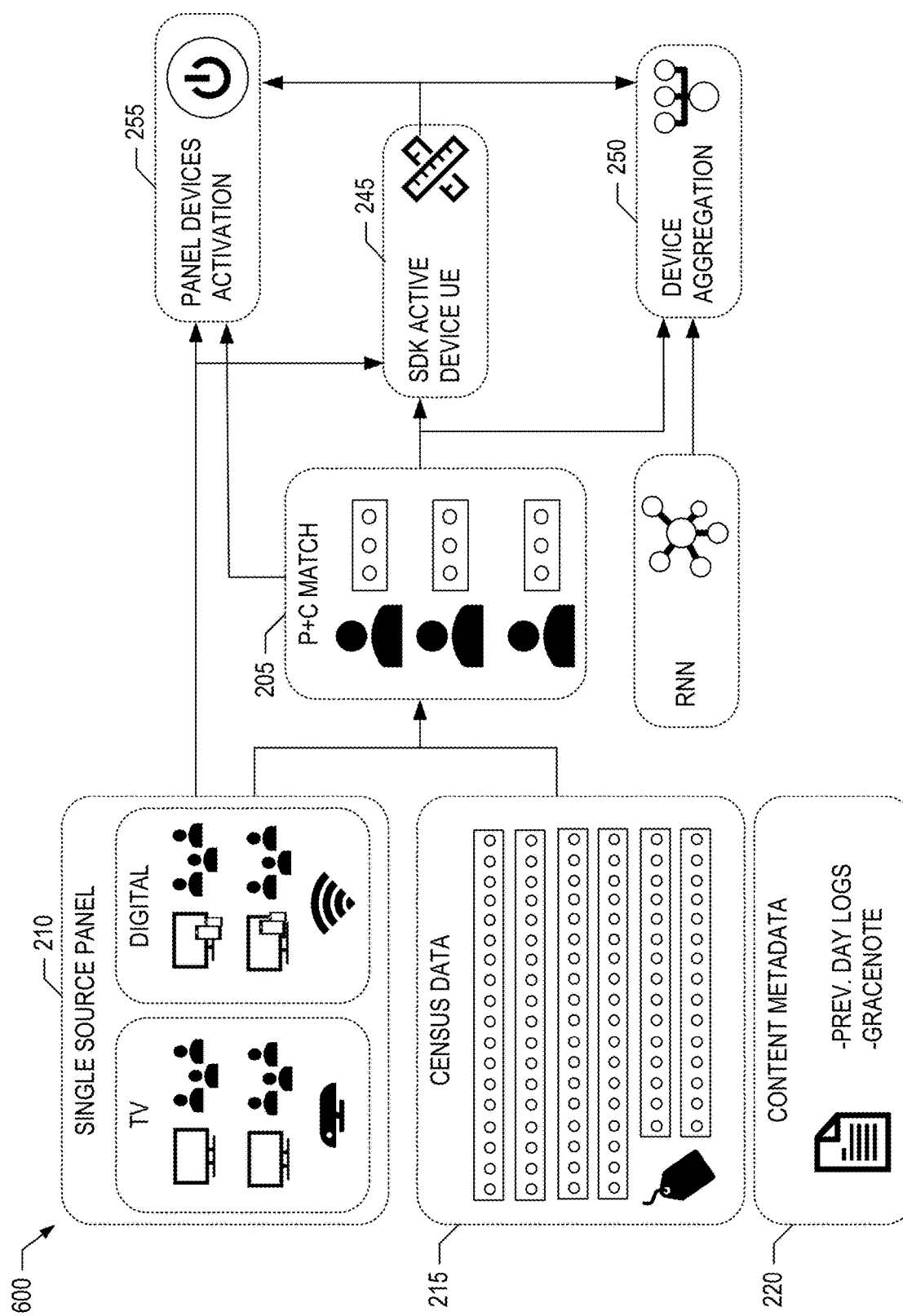
FIG. 6 illustrates an example active devices estimation and aggregation process flow implemented by the example STAR process flow of FIG. 2.

FIG. 6 illustrates an example active devices estimation and aggregation process flow 600 implemented by the SDK active device universe computation process 245, the device aggregation process 250 and the panel devices activation process 255 in the example STAR process flow 200 of FIG. 2. In some examples, a panelist's weight represents the number of individuals in the population with analogous demographic characteristics. Likewise, the weight of a panel device represents the number of census devices with analogous characteristics. However, if a panel device engages in viewing activity on a given day, assuming that a number of census devices equal to the panelist's weight also engaged in viewing activity at the census level may be incorrect. A goal of the active devices estimation and aggregation process flow 600 to estimate the number of census devices expected to be viewing SDK tagged content, and then to accordingly each panel device a respective active weight, with the active weight for a given panel device representing a fraction of the panelist's calibrated weight coherent with that number of census devices.

In the illustrated example of FIG. 6, the SDK active device universe computation process 245 determines a quantity indicated as U*, which represents an estimate of the active device universe. In some examples, U* provides the STAR process flow 200 with a first estimation of the daily number of devices in the census data per broadcaster and per critical cell. For example, and as described in further detail below, the device aggregation process 250 and the device allocation process 265 use U* as a target in their respective processes.

In some examples, the SDK active device universe computation process 245 considers a device to be an active device on a given day if it has done at least one viewing activity of a tagged content on that day. In some such examples, U* is an estimation of the number of all and only the devices measured by the SDK on a given day, and panel devices doing viewing activity on untagged contents are not included. In some examples, the SDK active device universe computation process 245 calculates U* anew on a daily basis, and not over multiple consecutive days. In some examples, the SDK active device universe computation process 245 calculates a value of U* per critical cell and per broadcaster (client_id).

In some examples, an input to the SDK active device universe computation process 245 for the calculation of active device universe is the output of the mechanical fingerprinting process 235, and the output of the SDK active device universe computation process 245 is a vector whose elements are the U* for each broadcaster and critical cell. For example, the SDK active device universe computation process 245 calculates U* based on the hashed devid determined by the mechanical fingerprinting process 235. Recall that the different IDs generated by the SDK, as described above, include the first party id (fpid) and the device id (devid). The first party id is stable within a critical cell, persists for 6 months (or some other timeout period) and covers the census data. The device id has a smaller coverage than the first party id, but it has greater stability and persistence, making it more reliable for the identification of unique devices. In some examples, the mechanical fingerprinting process 235 creates a new ID, referred to as DEV above, which coincides with the device id when available, and with the first party id otherwise. In some examples, the mechanical fingerprinting process 235 hashes the DEV values to yield a hashed devid. In some such examples, in order to determine U*, the SDK active device universe computation process 245 performs a count of distinct hashed devids within each combination of critical cell and broadcaster.

However, in some examples, a correction factor is applied by the SDK active device universe computation process 245 to this count. Analyses on the panel data have revealed rare cases where a single panel device is associated with multiple first party ids on a single day in the regime where the first party id should be stable. The reason for this anomaly may be unclear, but it also appears that, among the multiple first party ids associated with a single panel device, there is a more modal one covering the vast majority of the daily viewing activity. Of course, if the hashed devid of such a panel device coincides with its first party id, the above count of distinct hashed devids is slightly overestimated. Thus, by taking into account the number of such panel devices with respect to the total number of panel devices, as well as the number of additional first party ids for such panel devices, a correction factor for the above count is worked out. Thus, in some examples, the SDK active device universe computation process 245 obtains U* by multiplying the count of distinct hashed devids by the above correction factor. This procedure is repeated by the SDK active device universe computation process 245 for each combination of critical cell and broadcaster, which then stores the output numbers in a vector. In some examples, the SDK active device universe computation process 245 repeats the U* estimation process anew each day (or based on some other repetition period).

In the illustrated example of FIG. 6, the device aggregation process 250 aggregates devices identified in the census data to ensure the total device counts are in accordance with the active device universe U*. For example, for some critical cells the mechanical fingerprinting process 235 described above might overestimate the number of devices higher than the estimated U*. An example of such an overestimation is shown in Table 5.

TABLE 5

| Critical Cell | Device count from mechanical fingerprinting process | U* |
|---|---|---|
| TAB.Android.APP | 4602 | 4371 |
| PHN.Android.APP | 23888 | 21499 |
| TAB.iOS.APP | 65601 | 61008 |
| . . . | . . . | . . . |

If such an overestimation occurs, device aggregation process 250 aggregates at least some of the existing devices identified by the mechanical fingerprinting process 235 into virtual aggregated devices to reduce the total number of devices to be in accordance with the estimated U* while also attempting to reduce the behavioral impact caused by the resulting aggregated devices. In the illustrated example, the output of the device aggregation process 250 is the list of the devices identified by the mechanical fingerprinting process 235 (e.g., "dev") with their respective assigned aggregated device (e.g., "adev"). In some examples, the device aggregation process 250 is performed for each combination of critical cells and client id in accord with the estimated U* for each such combination. In some examples, when possible, the device aggregation process 250 aggregate devices with the same VDG fingerprint generated by the mechanical fingerprinting process 235.

However, aggregation of devices into virtual aggregated devices to meet the estimated U* can give rise to a stability problem. For example, when two devices are aggregated, the information of the device id produced by the mechanical fingerprinting is lost for one of the two devices, and the possibility of that device being considered active across multiple days is also lost. This might have a negative impact on the turnover rate of the census devices and might lead to an overestimation of the reach. For example, consider a scenario in which a device "x" and a device "y" are aggregated on a first day under the device identifier of device "x," thereby cause the information for device "y" to be lost. Then, on the next day, assume device "y" is active but device "x" is not. Because the information about device "y" was lost on the preceding day, device "y" may now be considered as a new device instead of a device that was also active on the preceding day.

Figure 7:
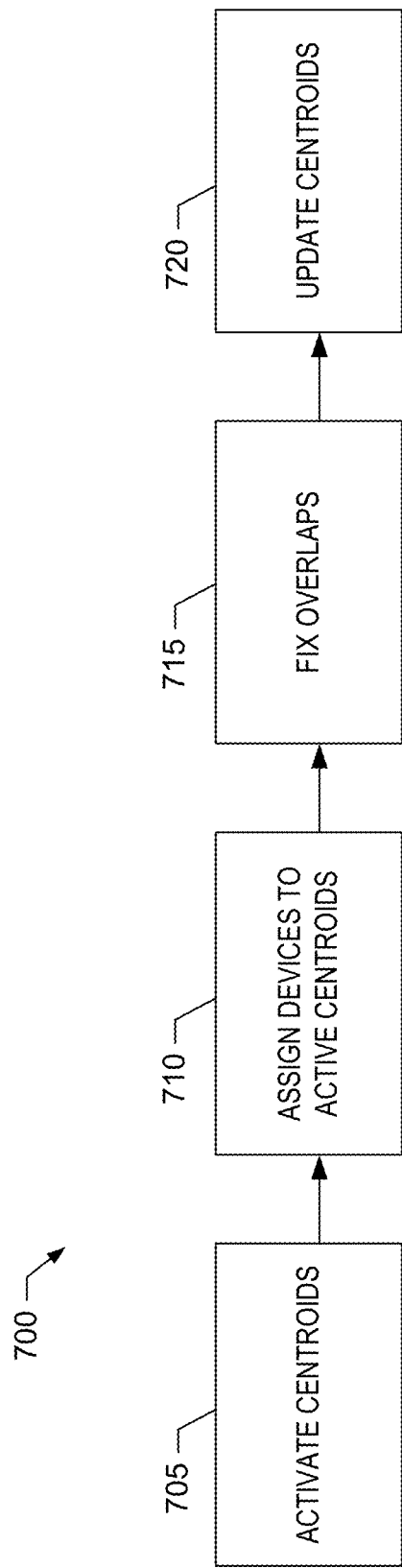
FIG. 7 illustrates an example centroid-based device aggregation process flow implemented by the example STAR process flow of FIG. 2.

To overcome the problem, the device aggregation process 250 implements an example centroid-based device aggregation process flow 700, which is illustrated in FIG. 7. As described in further detail below, the centroid-based device aggregation process flow 700 selects U* centroids which represent virtual devices. Each day, the centroid-based device aggregation process flow 700 keeps "old" centroids and activates "new" centroids according to the estimated number of devices and the turnover. Then, to each centroid, the centroid-based device aggregation process flow 700 associates 1 to N devices identified by their device identifiers (e.g., "dev"). Finally, the centroid-based device aggregation process flow 700 updates the centroids using the information for their associated devices.

Turning to FIG. 7, the centroid-based device aggregation process flow 700 includes an example activate centroids process 705, an example assign devices to active centroids process 710, an example fix overlaps process 715 and an example update centroids process 720. In the illustrated example, the activate centroids process 705 activates, or creates, centroids to be used to aggregate census devices determined to be active on a given day to meet that day's estimate U*. In some examples, to maintain the correct turnover rate on census devices, for a given day, referred to as day N, the activate centroids process 705 reuses a number X of centroids from the previous day, referred to as day N-1. In some such examples, when deciding which centroids of day N-1 to reuse, the activate centroids process 705 selects those centroids which have the highest probability of being associated with the same device they were associated with on day N-1. To facilitate such selection, the activate centroids process 705 stores with each centroid the device ID (e.g., "dev") of one of the devices that centroid is associated with. With that device ID, the activate centroids process 705 is able to perform an inner join between the centroids of day N-1 and the census of day N, as illustrated in FIGS. 8A-C.

Figure 8A:
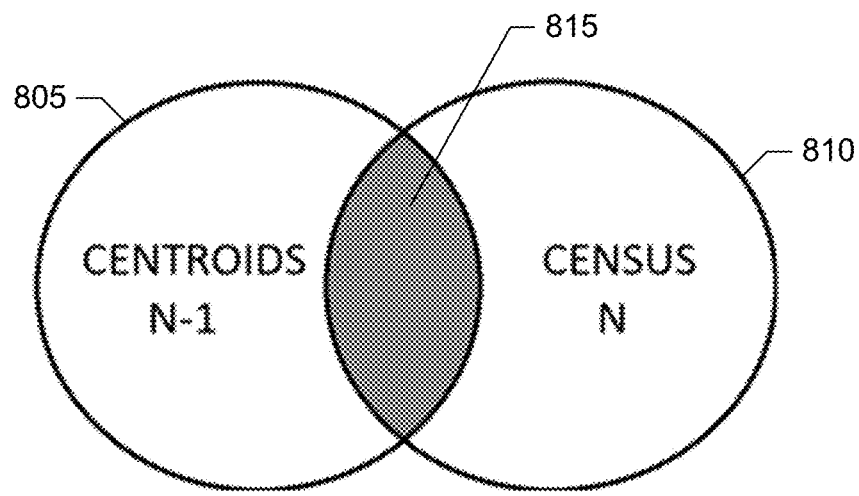
FIGS. 8A-E illustrates example operation of the centroid-based device aggregation process flow of FIG. 7.

FIG. 8A illustrates an example case, also referred to as case 1, in which the inner join of an example set of centroids 805 created on day N-1 and an example set of census devices 810 identified on day N produces an example joint set 815 that is greater than or equal to X, the number of centroids to be reused. In this example of case 1, the activate centroids process 705 limits the number of reused centroids to the correct number X.

Figure 8B:
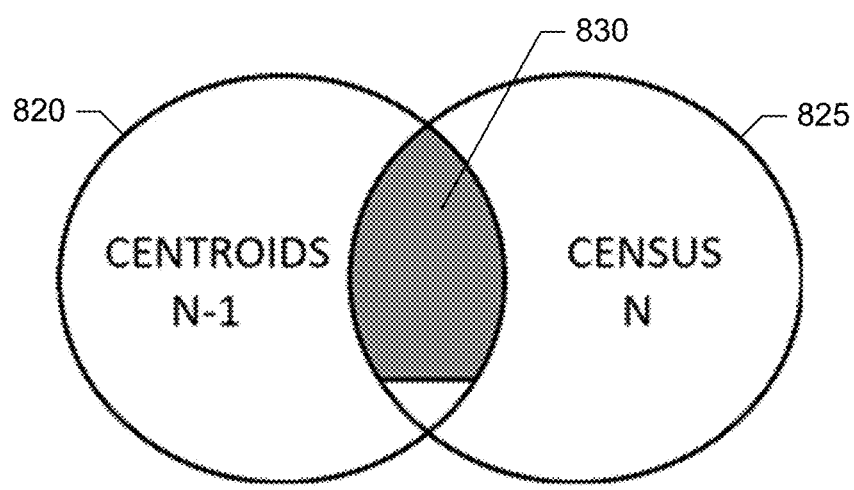
Figure 8C:
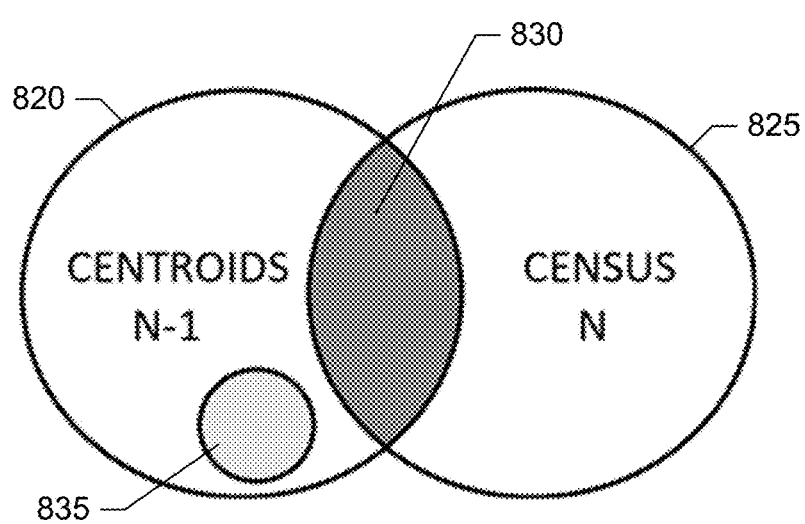

FIGS. 8B-C illustrate an example case, also referred to as case 2, in which the inner join of an example set of centroids 820 created on day N-1 and an example set of census devices 825 identified on day N produces an example joint set 830 that is less than X, the number of centroids to be reused. In this example of case 2, the activate centroids process 705 reuses the centroids included in the joint set 830 and also an example random sample 835 of centroids of day N-1 to yield the correct number X of reused.

In some examples, in either case 1 or case 2, the activate centroids process 705 also assigns the day N census devices that are part of the inner join (e.g., corresponding to the joint set 815 in FIG. 8A and corresponding to the joint set 830 in FIGS. 8B-C) to the corresponding reused centroid.

Figure 8D:
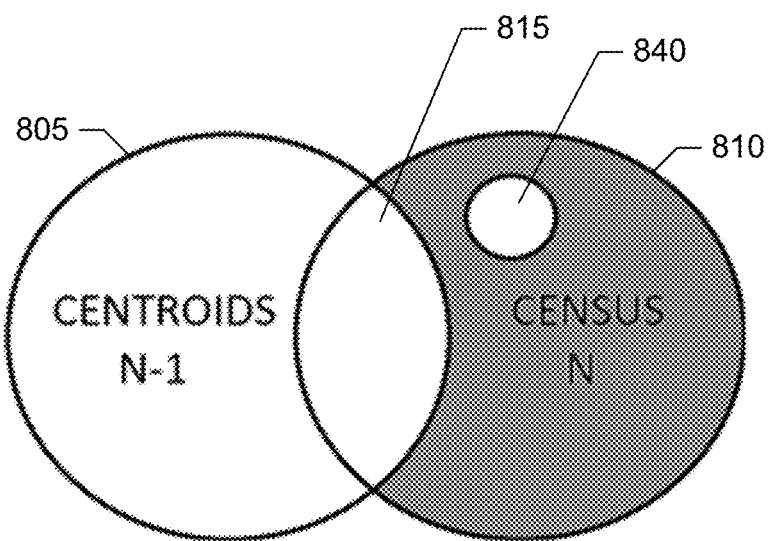
Figure 8E:
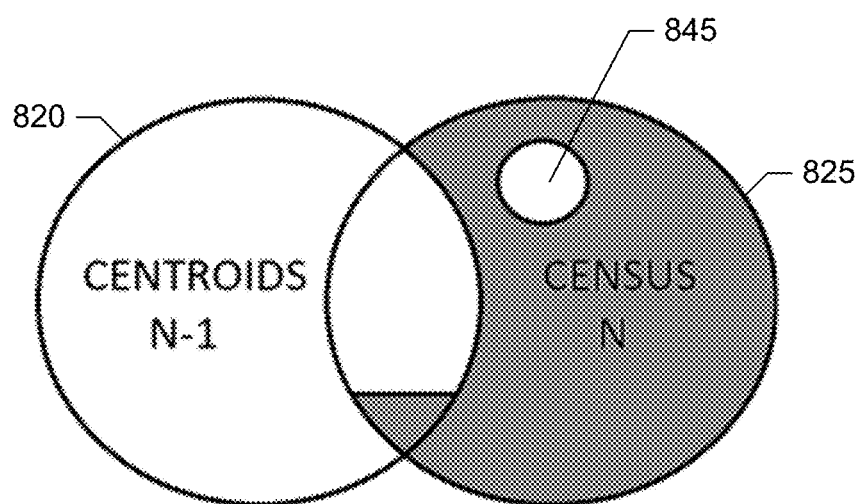

Next, the activate centroids process 705 creates the new centroids for day N by sampling from the day N census devices. In some examples, the activate centroids process 705 creates (for each combination of critical cell and client ID, as described above) U*-X new centroids for day N which, when combined with the X reused centroids from day N-1 yields the total of U* centroids for day N, which corresponds to the estimated universe for day N (for that critical cell and client ID). In some examples, the activate centroids process 705 performs a direct matching for newly created centroids by randomly selecting and assigning a census device from day N to a corresponding centroid, which solves the problem of initializing centroids with a distribution similar to the devices. However, before doing the sampling, the activate centroids process 705 removes the day N census devices that were already assigned to the reused centroids (as described above) from the sampling pool. This is done because those devices are already assigned to a centroid. For example, for the case 1 example described above, FIG. 8D illustrates an example removed set 845 of day N devices that are removed from the sampling pool. Similarly, for the case 2 example described above, FIG. 8E illustrates an example removed set 850 of day N devices that are removed from the sampling pool. Note that for case 1 example, if the number of day N census devices is the same as U*, then the entire set of census devices of day N will be directly matched to corresponding centroids, and the removed set 845 of FIG. 8D will not exist.

In the illustrated example, the assign devices to active centroids process 710 assigns the remaining sampling pool of day N census devices to the centroids created for day N. In some examples, even if most of the day N census devices are assigned to a centroid using the sampling method described above (e.g., depending on how much U* differs from the output of the mechanical fingerprinting process 235), there may be remaining day N census devices still to be assigned to the centroid. In the illustrated example, the assign devices to active centroids process 710 utilized a distance to aggregate the remaining devices. In some examples, the assign devices to active centroids process 710 initially iterates on centroids with no assigned devices (if there are any), searches among the unassigned devices, and assigns the unassigned device with the lowest distance to the current centroid to that centroid. In some examples, the assign devices to active centroids process 710 then iterates on devices with no assigned centroids, and assigns to each to the centroid with which it has the lowest distance. In some examples, any appropriate distance metric can be calculated to assign the remaining devices to the centroids.

In some examples, to improve performance, the assign devices to active centroids process 710 runs on batches of data. For example, batches can be built by splitting the dataset by content cluster (CC) and device fingerprint (VDG), thereby ensuring that devices with different hardware and/or software configurations are not aggregated together. Furthermore, in some examples, the batches are limited to a maximum size defined to keep the execution time under control for popular devices (e.g. the last iPad® using the last version of Safari®). In some examples, the batches are checked and some centroids are moved to others batches so that one or both of the following conditions are satisfied: each batch has at least one centroid, and each batch has more devices than centroids.

In some examples, another constraint of the centroid-based device aggregation process flow 700 is that the resulting aggregated devices should not have temporal overlap (e.g., where the resulting aggregation of devices would result in an aggregated device associated two or more viewing statements that happen in the same instant) and/or content overlap. The fix overlaps process 715 is included in the illustrated example to resolve, or fix, such overlaps. In some examples, the fix overlaps process 715 operates at a viewing statement level and checks each aggregated device (e.g., the aggregation of devices assigned to each centroid) for overlap (e.g., temporal and/or content). If overlap is found, the fix overlaps process 715 breaks down that aggregated device such that each individual device included in that aggregation, except the device associated with the most viewed content, is reassigned to another aggregated device. The fix overlaps process 715 then re-checks the aggregated devices to determine if new overlap was created with the new aggregation. The fix overlaps process 715 repeats the foregoing operations until a suitable aggregated device is found or until all the aggregated devices have been checked. In some examples, to speed up the search of a suitable aggregated device, the fix overlaps process 715 sorts the search space by total time spent, number of aggregated devices and local time (based on the observation that most viewing statements are made in prime hours and not early in the morning). In some examples, the fix overlaps process 715 works on batches of data to improve performances, but here the dataset is split only by content cluster (CC) and the aggregated devices (ADEVs) are kept together.

In the illustrated example, the update centroids process 720 updates the centroids with the data of the newly aggregated devices. These centroids will be used the successive day. As such, in some examples, the update centroids process 720 can be executed at the end of the STAR process flow 200, after the output data 280 is produced. In some examples, to update the centroids, the update centroids process 720 groups the behavioral features of the aggregated device, then a linear combination with the old centroids data is performed. In some examples, the device ID (DEV) and fingerprint (VDG) stored with each of the centroids is updated using one of the device IDs (DEVs) and fingerprints (VDGs) of the devices included in the aggregated device associated with that centroid.

As discussed above, the weight of a panelist represents the number of individuals in the population with analogous demographic characteristics. In some examples, this weight is inherited by all the panel devices associated with that panelist. However, in general, if a panel device does some viewing activity on a given day, it is not correct to infer that a number of census devices represented by the weight has done viewing activity on SDK on that day. The panel devices activation process 255 operates to answer the question of what fraction of the number of census devices represented by the weights of the panel devices is actually active on SDK. Among the represented census devices, the fraction of active ones on SDK is represent by a value referred to as the active weight of a panel device. The active weight of a panel device, which is less than the weight assigned by the calibration process to the panelist and then inherited by all their panel devices, is the number of census devices actually active on SDK that are to represented by that panel device.

To get a better understanding of what the active weight should constitute, consider its interplay with the panelists' weights and the SDK active device universe U*, described above. Panelists represent individuals of the population with certain demographic characteristics, regardless of them doing viewing activity or not, and, if so, regardless of the viewing activity being on SDK tagged or untagged media contents. The same concept applies to their respective devices. The SDK active device universe U*, on the other hand, is an estimate of the number of census devices viewing SDK tagged contents per critical cell and per broadcaster. Moreover, in some examples, the weights of the panelists (and hence the weights of the panel devices) and U* are determined with two independent procedures, therefore it is natural to expect them to be separate quantities. However, the panelists' weights (and hence the weights of the panel devices) and U* should not be completely unrelated, as a fraction of the census devices represented by the panel devices actually does viewing activity on SDK tagged contents. The active weight of a panel device is the fraction of its inherited weight that is also coherent with U* in the following sense. Suppose a set of panelists with devices belonging to a certain critical cell views an SDK tagged content of a certain broadcaster on a given day. The sum of the weights of the panel devices of such panelists may exceed the U* of that critical cell and broadcaster, but the sum of their active weights should match it.

In the illustrated example, the panel devices activation process 255 determines the active weights of the panel devices based on their original calibrated weights in such a way that the active weights are coherent with the SDK active device universe U*. In some examples, the panel devices activation process 255 involves the following two primary operations. First, the panel devices activation process 255 assigns each panel device a probability of being active on SDK tagged contents and uses those probabilities to obtain the active weights of the panel devices. Second, the panel devices activation process 255 rescales the active weights to make them coherent with the SDK active device universe U*.

Before going into the details of each operation, it is noted that, in some examples, the panel devices activation process 255 determines the active weights for all intab panelists, and not only for the intab panelists who are known to be active on SDK tagged contents on a given day, but also for the rest of the other intab panelists. This is done, at least partly, to mitigate the effect of the panel's finite size, and thereby reproduce more variability of the population.

In some examples, the first operation performed by the panel devices activation process 255 determines a first approximation of an active weight AW* of a panel device according to Equation 1 below:

$$AW^* = W \cdot p \qquad \text{Equation 1}$$

In Equation 1, W is the original panelist weight (and hence the weight of all their panel devices) coming from the calibration process, and $p \in [0,1]$ is the probability of the panel device being active on SDK tagged contents. Because $p \in [0,1]$, $AW^* \leq W$ as expected. Note that the approximate active weight AW* is a decimal, but the final weights will be a natural number to represent a count of census devices. Moreover, no information on U* was used so far. Therefore, the sum of the approximate active weights AW* of the panel devices (per critical cell per broadcaster) may not match U*. The latter two points are addressed by the second operation performed by the panel devices activation process 255.

Because a panelist's original weight W is known from the panel calibration process, the first operation reduces to the determination of the probability p for a given panel device being active on SDK tagged contents. In the illustrated example, the panel devices activation process 255 estimates the probability p for a given panel device with a neural network taking two primary inputs. The first primary input to the neural network is the portion of the panel data containing information on whether the panel devices are active on SDK tagged contents on a given production date or not. The second primary input to the neural network is a list of features describing the viewing behavior of the panel devices and that are relevant for the calculation of p.

As for the first input, the panel data include data entries whose value is 1 for panel devices active on SDK tagged contents on a given production date, and 0 otherwise. As for the second input, an example list of features representing the viewing habits of the panel devices and that may be relevant for the calculation of p is illustrated in Table 6.

TABLE 6

| Feature | Description |
| --- | --- |
| SDK Sessions | Number of sessions on SDK tagged contents done by the panel device. |
| Streaming Meter Sessions | Total number of sessions on both SDK tagged and untagged contents done by the panel device. |
| Recency on SDK Activity | Number of days since the most recent activity of the panel device on SDK tagged contents. |
| SDK Time Spent | Time spent by the panel device on SDK tagged contents. |
| Streaming Meter Time Spent | Total time spent by the panel device on both SDK tagged and untagged contents. |

In some examples, the features of Table 6 form a dataset to which the features in Table 7 are added.

TABLE 7

| Feature | Description |
| --- | --- |
| Ratio SDK Sessions/ Streaming Meter Sessions | Ratio between the time spent by the panel device on SDK tagged contents and the total time spent on both SDK tagged and untagged contents. |
| Age and Gender | Age and gender of the panelist associated with the panel device. |
| Is Weekend | Whether the considered production date is a weekend or not. |
| Is Holiday | Whether the considered production date is a holiday or not. |

In some examples, instead of the raw numbers, the features of Table 6, except for the Recency on SDK Activity, and the features of Table 7, except for the Ratio SDK Sessions/Streaming Meter Sessions, are reported as tertiles. In some examples, the features of Tables 6 and 7, as well as the active/inactive status in the panel data, are calculated for one or more of the following time bands: yesterday, last week, last month, etc. This is done to introduce a dependence of the active weight on the past viewing behavior of panelists.

In some examples, when predicting the probability of panelists being active on SDK tagged contents, the neural network has to meet some constraints. For example, one constraint may be that panel devices known to be active on SDK tagged contents on a given production date are assigned a high probability. Another example constraint may be that panel devices inactive on SDK on tagged contents on a given production date, but known to have been active in the past with a viewing behavior similar to panel devices active on that production date, have a non-vanishing probability of being activated.

The output of the neural network is the probability p for each intab panel device. That probability p, when multiplied by the inherited panelist weight W for that intab panel device, gives the approximate active weight AW* according to Equation 1. As noted above, the approximate active weight AW* contains no information on the SDK active device universe U*, and may be decimals instead of natural numbers, as shown by Equation 2 below:

$$AW^* \notin \mathbb{N}, \Sigma_{i \in CC} AW_i^* \neq U_{CC}^* \forall CC. \quad \text{Equation 2}$$

In other words, the first operation performed by the panel devices activation process 255 provides a shape for the distribution of the active weights among the panel devices. The second operation performed by the panel devices activation process 255 properly rescales that shape to make the final active weights AW of the panel devices coherent with U* and applies a proper rounding to make them natural numbers. Thus, the final output of the panel devices activation process 255 is the set of active weights AW of the panel devices given by Equation 3 below:

$$AW^* \in \mathbb{N}, \Sigma_{i \in CC} AW_i = U_{CC}^* \forall CC. \quad \text{Equation 3}$$

Figure 9:
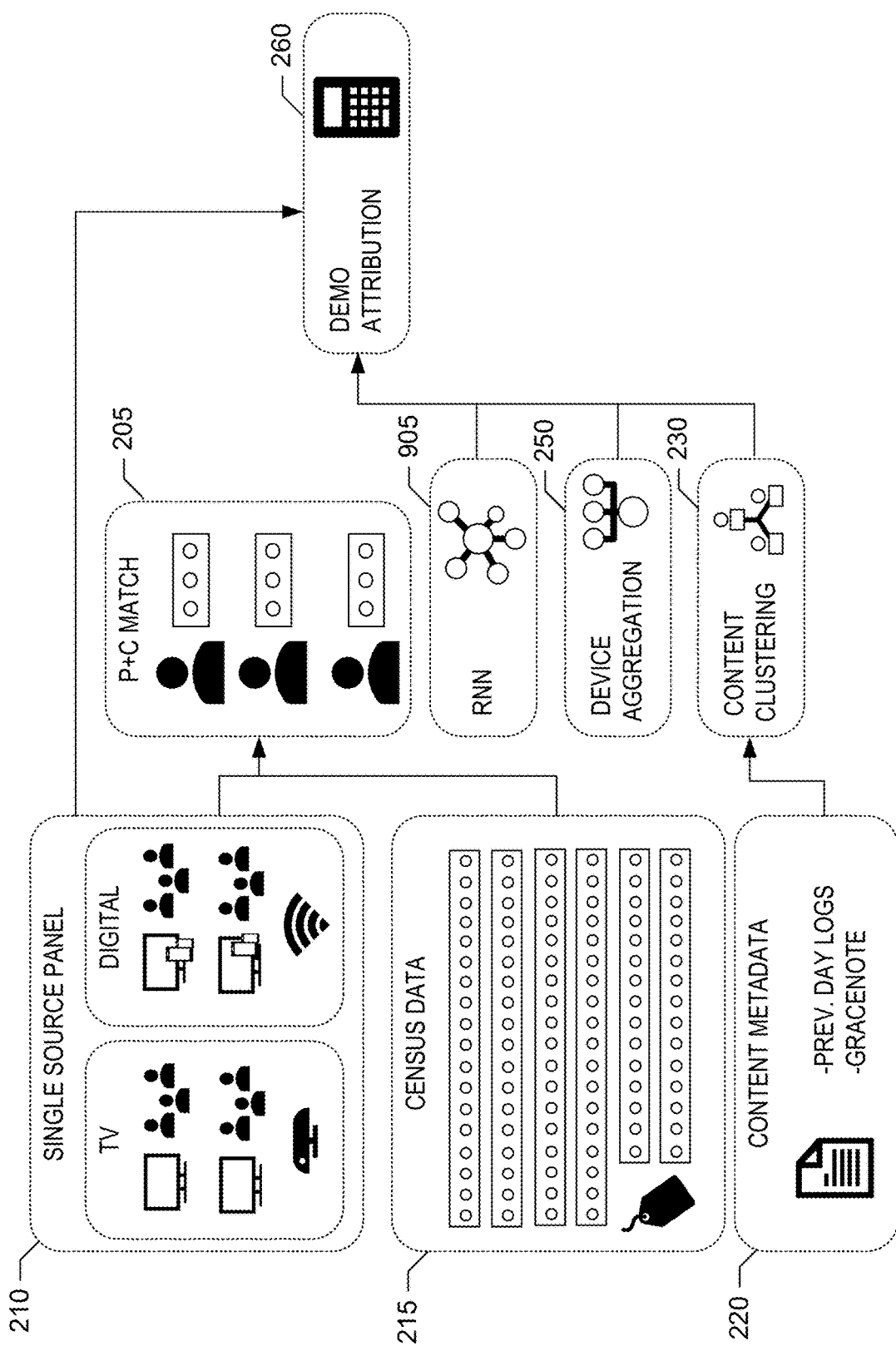
FIG. 9 illustrates operation of an example demographic attribution process in the STAR process flow of FIG. 2.

FIG. 9 illustrates operation of the example demographic attribution process 260 in the STAR process flow 200 of FIG. 2. In the illustrated example, the demographic attribution process 260 operates to establish a relation between census devices and panel devices by analyzing how similar each census device is to a panel device. In some examples, the demographic attribution process 260 utilizes one or both of an example geometric score distance algorithm and/or an example recurrent neural network 905 to ascertain similarities between census devices represented in the census data 215 and the panel data 210.

In some examples, the demographic attribution process 260 implements an example geometric score distance algorithm that takes as an input the result of the panel and census data matching performed by the panel and census match process 205, which include the updated census data 305 with the matched portion of the panel data. The geometric score distance algorithm then calculates the similarity between census devices and panel devices by use of a score computed based on a geometrical distance between devices, hence the term geometric score distance algorithm. In some examples, the geometric score distance algorithm is repeated on a daily basis.

For example, to compute a score, the geometric score distance algorithm identifies a set of features, referred to as linking variables, representative of the similarity between devices. Examples of such linking variables, with each calculated for each census device and panel device on a given day, are listed in Table 8.

TABLE 8

| Feature | Source | Description |
| --- | --- | --- |
| Number of sessions by membership | Content Clustering | Number of sessions done for each membership of the Content Clustering. |
| SUM(viewed_duration) by membership | Content Clustering | Time spent on each membership of the Content Clustering. |
| % of SUM(viewed_duration) by membership over SUM(viewed_duration) | Content Clustering | Percentage of the time spent on each membership of the Content Clustering with respect to the total time spent on all the memberships. |
| SUM(viewed_duration) | Census Data + Fingerprinting | Total time spent. |
| SUM(viewed_duration) by timeband | Census Data + Fingerprinting | Time spent for each timeband. |
| % SUM(viewed_duration) by timeband/SUM(viewed_duration) | Census Data + Fingerprinting | Percentage of the time spent on each timeband with respect to the total time spent. |
| SUM(viewed_duration VOD) | Census Data + Fingerprinting | Total time spent on VOD. |
| % SUM(viewed_duration VOD)/ SUM(viewed_duration) | Census Data + Fingerprinting | Percentage of the time spent on VOD with respect to the total time spent. |
| SUM(viewed_duration LIVE) | Census Data + Fingerprinting | Time spent on Live. |

TABLE 8-continued

| Feature | Source | Description |
|---|---|---|
| % SUM(viewed_duration LIVE)/ SUM(viewed_duration) | Census Data + Fingerprinting | Percentage of the time spent on Live with respect to the total time spent. |
| SUM(viewed_duration) by bin LENGTH | Census Data + Fingerprinting | Time spent for each bin of the content's length. |
| % SUM(viewed_duration LIVE) by bin LENGTH BIN/ SUM(viewed_duration) | Census Data + Fingerprinting | Percentage of the time spent for each bin of the content's length with respect to the total time spent. |
| % SUM(viewed_duration)/ SUM(length) | Census Events + Fingerprinting | Percentage of the total time spent with respect to the total length of the contents viewed. |
| AVG(% viewed_duration/ length) | Census Events + Fingerprinting | Average percentage of the time spent with respect to the length. |

Several of the example linking variables in Table 8 actually consist of respective groups of features. For example, the first three linking variables in Table 8, which are obtained from the content clustering process 230, are repeated for each membership of the content clustering. Thus, the above list of example features in Table 8 can correspond to a large number of features overall. Moreover, some of the example linking variables in Table 8 can be correlated with each other, for example those expressed by means of percentages. Furthermore, some of example linking variables in Table 8 can contain lots of zeroes, such as if a device tends to view contents belonging to a given membership of the content clustering, the value of some or all of the other memberships will be zero.

In some examples, to reduce the number of linking variables, the geometric score distance algorithm implemented by the demographic attribution process 260 applies principal component analysis (PCA). In some examples, the PCA takes as input the example linking variables of Table 8 and linearly combines them down to a set of fewer linking variables in such a way to preserve an established percentage of the variability of the original linking variables. In other words, this is a way to reduce the redundancy without loss of information, so that there is a net computational gain without penalization. For example, the PCA can reduce the linking variables from 120 to 32 while preserving 70% of the variability of the original features.

In some examples, the use of PCA is of great computational benefit, but since the new features are given by complicated linear combinations of the old ones, their interpretation can be unclear. Information on the relationships between the new features and the old ones can be retained in features referred to as loadings. A point to keep in mind is that the new features come with different levels of variance, in the sense that some of them can discriminate between panel and census devices more than others. This variance serves as a weight in the calculation of the distance between panel and census devices.

In some examples, the geometric score distance algorithm implemented by the demographic attribution process 260 splits the result of the panel and census match process 205 into two different datasets: one containing only the matched devices (e.g., pdev≠none) and the other containing only the unmatched devices (e.g., pdev=none). The geometric score distance algorithm then calculates a distance between each possible couple of panel device (pdev) and census device (dev) that includes a device of the former dataset and a device of the latter dataset. In some examples, the distance that is calculated is a Euclidean distance weighted on the variances of the linking variables (or the reduced set of linking variables if PCA is used), as shown in Equation 4 given below:

$$dist_{day, CC} = \sqrt{\sum_{i \in new\ features}(dev_i - pdev_i)^2 \cdot var_i} \quad \text{Equation 4}$$

In some examples, the distance of Equation 4 is calculated anew each day and per critical cell. In some examples, the lower the distance, the more alike the devices.

In some examples, the geometric score distance algorithm next checks if couples of matched and unmatched devices existed in the prior day's production. If so, half of the prior day's distance is added the distance of Equation 4, yielding the final score distance of Equation 5 given below:

$$score_{day, CC} = dist_{day, CC} + \frac{dist_{day-1, CC}}{2} \quad \text{Equation 5}$$

In some examples, if a couple was not present in the prior day's production, the score simply coincides with the score of Equation 4. However, if the couple was present, it is worth including the past information according to Equation 5 for consistency. For example, if a certain couple had a high score yesterday, it is expected in general to have a high score today as well. It can be seen that the prior day's score will also contain half of the score of the day before, and so on. Thus, Equation 5 can be seen as corresponding to a geometric series. The choice of taking half of the past information is one example. In other examples, dividing by larger numbers is also possible, and reduces the contribution of the past information.

In the illustrated example, the output of the geometric score distance algorithm implemented by the demographic attribution process 260 is an example dataset illustrated in Table 9.

TABLE 9

| Unmatched Devices | Matched Devices | Score Distance | Critical Cell |
|---|---|---|---|
| $dev_1$ | $pdev_1$ | $score_{1,1}$ | $CC_{1,1}$ |
| $dev_1$ | $pdev_2$ | $score_{1,2}$ | $CC_{1,2}$ |
| ... | ... | ... | ... |
| $dev_1$ | $pdev_m$ | $score_{1,m}$ | $CC_{1,m}$ |
| ... | ... | ... | ... |
| $dev_n$ | $pdev_m$ | $score_{n,m}$ | $CC_{n,m}$ |

In Table 9, the first column contains the census devices unmatched with the panel, let there be n of them. The second column of Table 9 contains the census devices matched with the panel, let there be m of them. The dataset contains n m rows, so that all the possible couples of matched and unmatched devices are present. The third and fourth columns of Table 9 contain the score and the critical cell of each couple of devices. This serves as an input for the device allocation process 265, which is described in further detail below.

In some examples, the demographic attribution process 260 utilizes the recurrent neural network 905 to assign to each single device found in census data (e.g., identified by DEV) a demographic class. For example, the demographic class may include age, gender, etc. In some examples, the demographic attribution process 260 employs supervised machine learning (ML) by training an ML model on panelists viewing data (for which the associated demographics are known) and subsequently applying the model on the census dataset (for which the demographics are unknown).

The recurrent neural network 905 is based on an assumption that the behavior of a person can be determined from a group of sequential viewing events, and that this behavior is correlated with the person's demographic. Further recurrent neural networks (RRNs), such as recurrent neural network 905 model, are effective in finding relations among sequential temporal features. RNN models can be generative or discriminative. In the illustrated example, recurrent neural network 905 is implemented according to a discriminative model. In some examples, the recurrent neural network 905 also includes gated recurrent unit (GRU), and is structured to analyze an input sequence of viewing statements based on one or more of the following features: platform, usage type, vod_or_ls (video on demand or live streaming), local time, total time spent, viewed ratio, content genre, content year, content type (e.g., movie, tv series, etc.), etc.

In the illustrated example, the demographic attribution process 260 performs the following operation to utilize the recurrent neural network 905 to assign demographics to devices in the census data. The demographic attribution process 260 obtains input from mechanical fingerprinting process 235, including panelists and census/virtual devices. The demographic attribution process 260 merges the output from the mechanical fingerprinting process 235 with census data and the content clusters identified by the content clustering process 230. The demographic attribution process 260 then splits the data into a panelist dataset (to be used in training) and a census/virtual device dataset (to be used in validation). The demographic attribution process 260 generates, for each panelist, a sequence of viewing statements made by that panelist. The demographic attribution process 260 then trains a GRU model of the recurrent neural network 905 using the sequences of viewing statements for the panelists, assesses the model's performance, and stores the model. The demographic attribution process 260 also loads the census/virtual device dataset and generates, for each census/virtual device, a sequence of viewing statements attributed to that census/virtual device. The demographic attribution process 260 then utilizes the trained recurrent neural network 905 to predict which demographic(s) to assign to the census/virtual devices based on the sequences of viewing statement associated with the census/virtual devices. The demographic attribution process 260 then output a table or other data structure including some or all of the following information: device identifier (e.g., DEV), demographic label (e.g., identifying the assigned demographics, such as gender, age, etc.), score, production date, etc.

Artificial neural networks, such as the recurrent neural network 905 in some examples, are approximation tools which allow to generalize a general function given a set of observations. Artificial neural networks learn to map observations inside a non-linear feature space, where the classification problem is easier. In some examples, each input of an artificial neural network can be modeled as a single node that is connected to a next layer of nodes. In some examples, each connection is a parameterizable weight, which is used to weight each input of the previous layer to feed a nonlinear function (e.g., sigmoid, tan h, relu, etc.). In some examples, the output of the activation function can be seen as the value of the hidden node.

In some examples, there are two phases involved in training an artificial neural network. For example, in a first phase, training input data is applied to the network to compute the non-linear weighted sums for each node through the network's architecture. In some examples, at the end of the input propagation, the final nodes represent the prediction categories. In some examples, the activation function related to the output nodes can be softmax, or sigmoid in the case of binary output. In some examples, a second phase of training involves backpropagation, which weighs how much each input of the precedent layer contributes to the error between the prediction and the ground truth class. The proportional error for each node is used to adjust the connection weight parameters.

In the case of data that is unstructured or highly dimensional (e.g., text, images, time series, etc.) the high number of inputs used to feed the classifier can give rise to a substantially large number of parameters, especially if each input is t be weighted with a parameter. In some examples, to reduce the number of parameters, the weights are shared and reused during the training. Such an approach can reduce number of parameters and act as a feature extraction for complex highly dimensional data. In some examples of the recurrent neural network 905, the temporal weights are reused through time, and the activation function is a weighted sum of the current input with the previous weighted state. In some examples, the backpropagation of the error happens through time.

In some scenarios, recurrent neural networks can experience a problem referred to as the vanishing gradient, where after some time, the derived error from backpropagation becomes so small that the weights are unable to adjusted anymore, effectively preventing the network from continuing to learn. To solve this problem, in some examples, the recurrent neural network 905 includes an architecture with an long short-term memory (LS™) and GRU to mitigate the problem of gradient vanishing and enable the recurrent neural network 905 to learn from long sequences.

Figure 10:
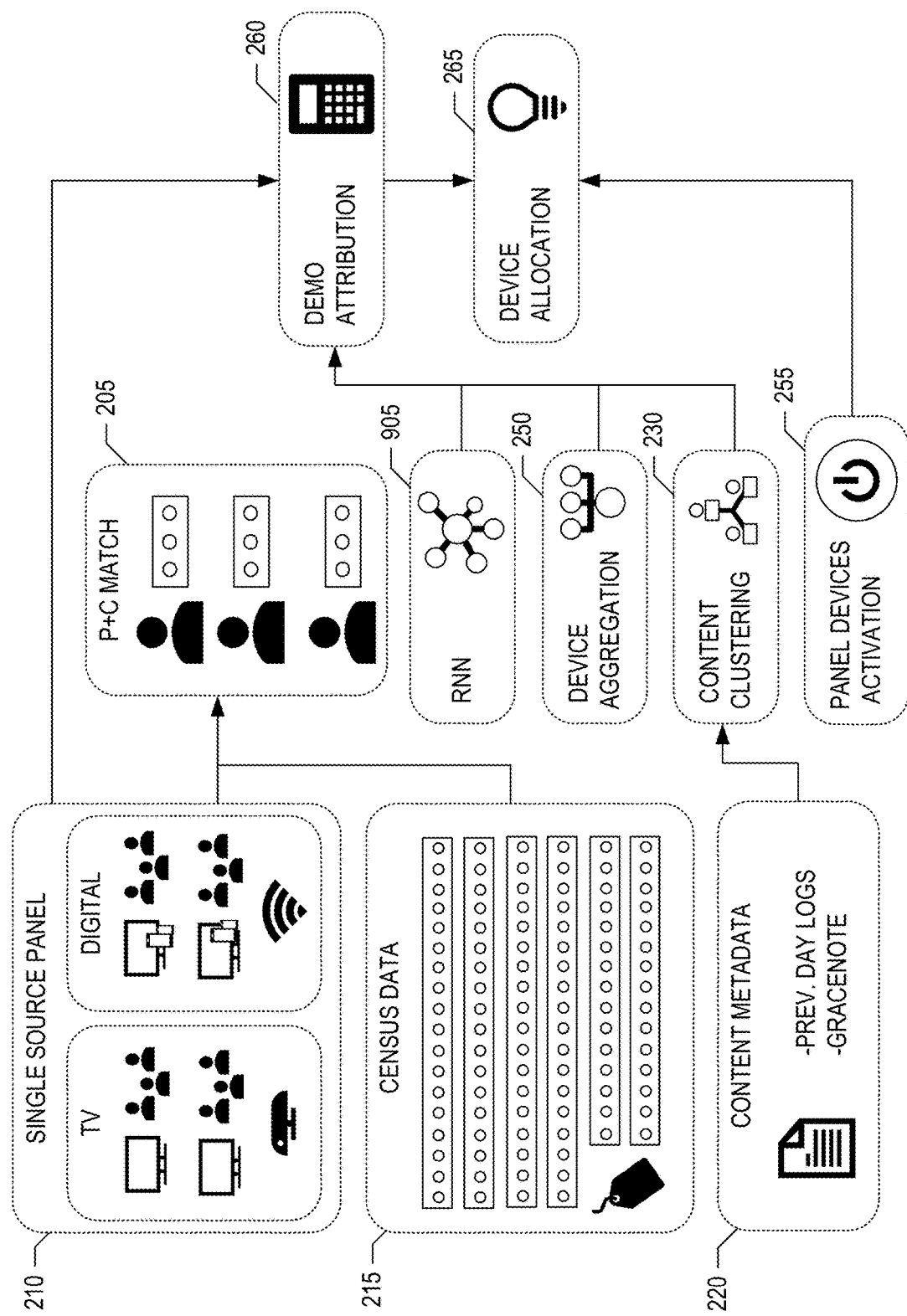
FIG. 10 illustrates operation of an example device allocation process in the STAR process flow of FIG. 2.

FIG. 10 illustrates operation of the example device allocation process 265 in the STAR process flow 200 of FIG. 2. The output of the demographic attribution process 260 is a score for each possible couple of a census device and a panel device, with the score representing how similar the devices of each couple are. A goal of the device allocation process 265 is to perform the actual device attribution of the census devices to the panel devices based on the similarities represented by the scores. By means of this attribution, census devices inherit the demographic characteristics of panel devices.

In some examples, the demographic attribution process 260 begins with a table or other data structure containing the example scores output from the demographic attribution process 260. An example of such a table or data structure is given by Table 10

TABLE 10

|  | $pdev_1$ | $pdev_2$ | ... | $pdev_m$ |
|---|---|---|---|---|
| $dev_1$ | score($pdev_1$, $dev_1$) | score($pdev_2$, $dev_1$) | ... | score($pdev_m$, $dev_1$) |
| $dev_2$ | score($pdev_1$, $dev_2$) | score($pdev_2$, $dev_2$) | ... | score($pdev_m$, $dev_2$) |
| ... | ... | ... | ... | ... |
| $dev_n$ | score($pdev_1$, $dev_n$) | score($pdev_2$, $dev_n$) | ... | score($pdev_m$, $dev_n$) |
|  | $pdev_1$ | $pdev_2$ | ... | $pdev_m$ |

In Table 10, the rows and columns represent census devices and panel devices respectively. The elements of Table 10 are the scores of the corresponding couples of census devices and panel devices owned by the respective panelists, as determined by the demographic attribution process 260. For example, if the panelist $p_i$ owns a device $pdev_i$, the score score($pdev_i$,$dev_j$) represents the score distance between the couple panel device $pdev_i$ and the census device $dev_j$. The bottom row of Table 10 contains the active weights of panelists, obtained from the panel devices activation process 255. In some examples, Table 10 contains as many rows as the number of census devices, which can be on the order of millions in some examples, and as many columns as the number of panel devices, which can be on the order of thousands in some examples.

In some examples, the scores are decimals between 0 and 1, such that the closer the score is to 1 the higher the similarity of the devices. In some examples, the scores are decimals between 0 and 1, such that the closer the score is to 0, the higher the similarity of the devices. In either example, the device allocation process 265 transforms, based on one or more constraints described in detail below, the data in Table 10 into a table or other data structure of elements $A_{ij}$ having values of zeroes and ones, with one value (e.g., 1) representing the attribution of the corresponding census device to the corresponding panel device, and the other value (e.g., 0) representing non attribution of the corresponding census device to the corresponding panel device. An example of an output device assignment table having elements A u produced by the device allocation process 265 is given by Table 11.

TABLE 11

|  | $pdev_1$ | $pdev_2$ | $pdev_3$ | ... | $pdev_m$ |
|---|---|---|---|---|---|
| $dev_1$ | 1 | 0 | 0 | ... | 0 |
| $dev_2$ | 0 | 0 | 0 | ... | 1 |
| $dev_3$ | 1 | 0 | 0 | ... | 0 |
| ... | ... | ... | ... | ... | ... |
| $dev_n$ | 0 | 1 | 0 | ... | 0 |
|  | act_wgt ($pdev_1$) | act_wgt ($pdev_2$) | act_wgt ($pdev_3$) | ... | act_wgt ($pdev_m$) |

A first example constraint utilized by the device allocation process 265 is that each panel device $pdev_i$ should be attributed a number of census devices equal to its active weight act_wgt($pdev_i$), where the active weight of the panel device was determined by the example active devices estimation and aggregation process flow 600. Therefore, the column $pdev_j$ in Table 11 contains as many ones as the value of act_wgt($pdev_j$) and all other elements are zeroes. Mathematically, this first constraint can be represented by Equation 6, which is:

$$\sum_{j=1}^{n} A_{ij} = \text{act\_wgt}(pdev_i) \quad \forall\, i = 1, \ldots, m \quad \text{Equation 6}$$

A second example constraint utilized by the device allocation process 265 is that each census device is to be attributed to one and only one panel device. Thus, each row of the output device assignment table contains a single 1, with the remaining elements of that row being 0. Mathematically, this second constraint can be represented by Equation 7, which is:

$$\sum_{i=1}^{m} A_{ij} = 1 \quad \forall\, j = 1, \ldots, n \quad \text{Equation 7}$$

A third example constraint is that the scores to be mapped to 1 in the output device assignment table should be chosen so that their sum of those score (prior to the mapping to 1) is as large as possible. That is to say that the device allocation process 265 is not performed randomly, but takes into account the similarity between panel and census devices by prioritizing the highest scores. Mathematically, this third constraint can be represented as maximizing the quantity given by Equation 8, which is:

$$\sum_{i,j} (\text{score}(pdev_i, dev_j) A_{ij}) \quad \text{Equation 8}$$

In general, there are several techniques the device allocation process 265 could implement to transform the scores of Table 10 to the device assignment of Table 11. For example, for low-dimensional instances of Table 10, a brute force technique could be used. However, in the illustrated example, the device allocation process 265 implements an example swap algorithm to transform the scores of Table 10 to the device assignment of Table 11. The swap algorithm determines an initial assignment referred to as the base solution. The swap algorithm then performs an iterative optimization procedure based on the constraints of Equations 6 to 8 that iterates until an appropriate exit condition is reached (e.g., a specified precision is met, a limit on the total number of iterations has been reached, a limit on the number of iterations performed without any assignment change is reached, etc.).

Figure 11:
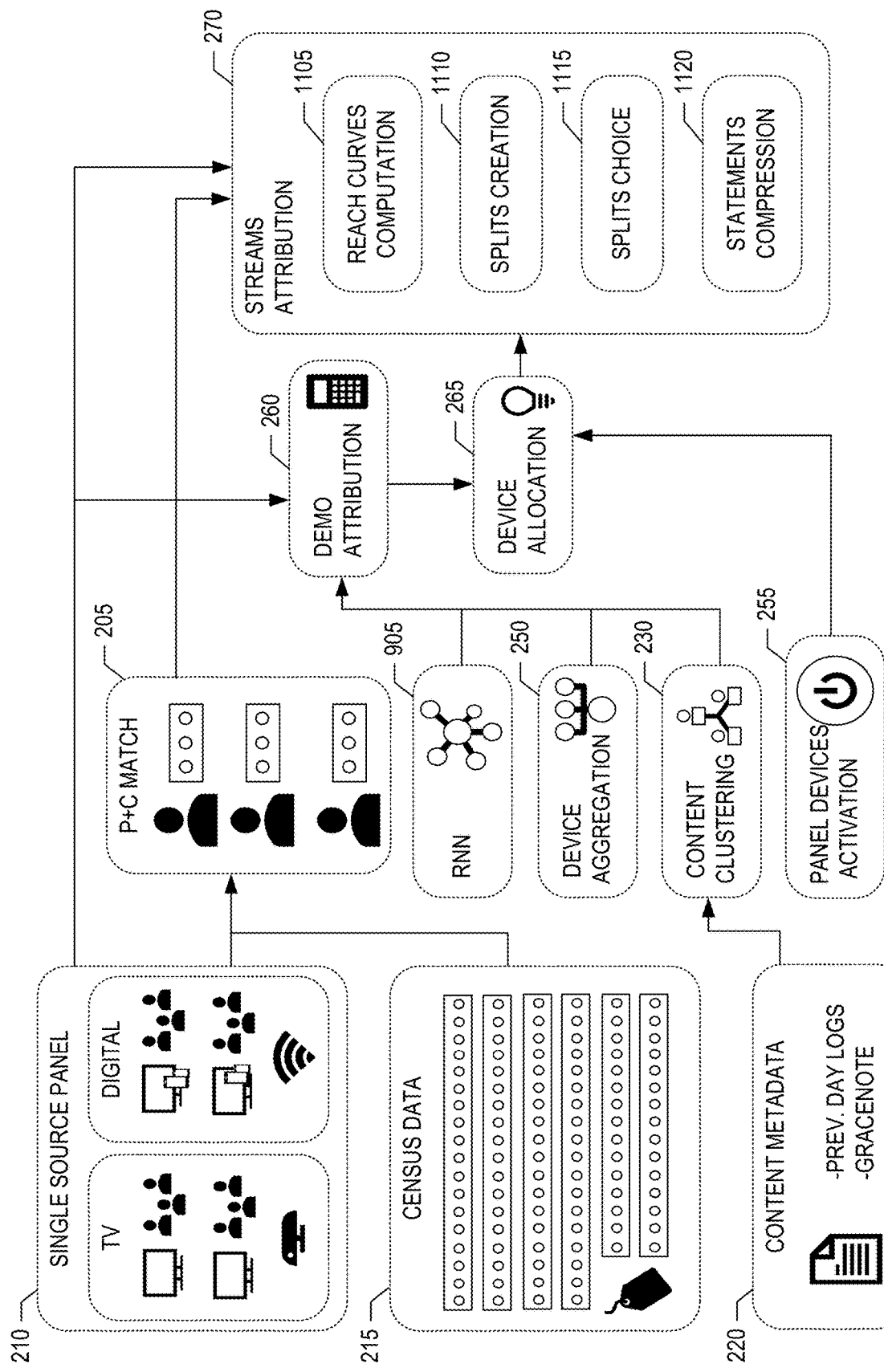
FIG. 11 illustrates operation of an example streams attribution process in the STAR process flow of FIG. 2.

FIG. 11 illustrates operation of the example streams attribution process 270 in the STAR process flow 200 of FIG. 2. As described above, for each production date, the device allocation process 265 assigns the census devices to the panel devices of the intab panelists. Next, the streams attribution process 270 determines how the census viewing statements are assigned to the intab panelists. In some examples, the streams attribution process 270 does this as follows. The census viewing statements are first attributed to the panel devices, and then inherited by the panelists associated with those devices. In some examples, a deduplication of the reach across the devices belonging to a given panelist is also performed.

In the illustrated example, the inputs to the streams attribution process 270 include data and constraints, with the data being provided both by the panel and the census. In some examples, for each intab panelist $P_i$, the input data to the streams attribution process 270 includes the following:

$P_i$'s weight $W_i$;

$V = \{V_1, V_2, \ldots\}$ which represents the census devices attributed to panelist $P_i$ by the device allocation process 265;

$S = \{S_{j1}, S_{j2}, \ldots\}$ which represents the census viewing statements of the census device $V_j$ for the production date; and C={$C_1$, $C_2$, ... } which represents the media contents corresponding to the viewing statements S.

In some examples, the constraints input to the streams attribution process 270 include, for each content C, a set of constraints including {RCH, IMP, CUM RCH}, with these quantities representing the reach, impression and cumulated reach of that content, respectively. In the illustrated example, the constraints are fulfilled second by second, or some other interval, so they specified in terms of curves that are computed by an example reach curves computation process 1105 implement by the streams attribution process 270, which is described in detail below. These are used as targets, in the sense that the panelists are to be attributed the census viewing statements in such a way to reproduce these curves as best as possible.

In the illustrated example, the streams attribution process 270 includes an example splits creation process 1110 that divides the weight of each panelist into a number of split weights, also referred to a splits, to be used to attribute census viewing statements to that panelist. For example, the splits creation process 1110 can divide the weight of a given panelist into 24 different splits. In some such examples, each split has a weight given by a power of 2, that is of the form $2^n$ with $n \in \mathbb{N}$, so that the sum of the weights of the splits of each panelist is equal to the weight of that panelist. The splits creation process 1110 is described in further detail below.

In the illustrated example, the streams attribution process 270 includes an example splits choice process 1115 that, for each panel device of each panelist, chooses a subset of splits so that the sum of their weights is equal to the active weight of that panel device. Then, for each second of each content, the example splits choice process 1115 chooses a combination of such splits so that the sum of their weights is equal to the reach of that content at that second. In some examples, there exist multiple possible combinations of splits that yield the same reach. Thus, in some examples, the splits choice process 1115 chooses the splits so that they also produce the impression and cumulated that is as close as possible to the constraints, although a perfect match may not be achieved. The splits choice process 1115 is described in further detail below.

In some examples, once the subset of splits is chosen, further details on the activation of such splits is determined, such as their order in time. Different orders in the activation of the splits can in fact generate different amounts of error in the attempt to reproduce the target curves. This point is discussed in further detail below in the context of an example minute engine process included in the splits choice process 1115.

Attributing census contents to splits, as described above and in further detail below, can cause information on the census viewing statements S to be replaced by new viewing statements referring to the splits. Although fulfilling the constraints, these new viewing statements me be quite fragmented, causing the output to have a large size. Thus, in some examples, the streams attribution process 270 includes an example statements compression process 1120 that rearranges the viewing statements of the splits and compacts them, so that the size of the output is reduced. The statements compression process 1120 is described in further detail below.

In the illustrated example, the reach curves computation process 1105 computes, from the census data, curves for the reach, impression and cumulated reach metrics applied as constraints to the streams attribution process 270. In some examples, the reach metric, also referred to as the reach or the unique audience, for a given media content is defined as the number of weighted distinct individuals watching at least one second of that content. However, in some examples, the reach metric can be challenging to compute, in comparison to other metrics, such as the time spent or the page views, is its sum rule. Metrics such as the time spent or the page views are summed linearly. For example, the total time spent of a content is the sum of the time spent of each individual viewing statement pertaining to that content. This is not so for the reach. If an individual makes multiple viewing statements for the same content, their contribution to the reach is one multiplied by their weight.

More formally, let A and B be the following:

$$A, B = \{\text{contents, intervals, time frames, days, networks, ...}\} \quad \text{Equation 9}$$

Then, the algebra of the reach is given by Equation 10:

$$RCH(A \cup B) = RCH(A) + RCH(B) - RCH(A \cap B) \quad \text{Equation 10}$$

In Equation 10, RCH(A) and RCH(B) are the reach of A and B respectively, RCH(A∪B) is the reach of A OR B (with OR understood in the logical sense as the union of sets, thus meaning either A or B or both), and RCH(A∩B) is the reach of A AND B (with AND understood in the logical sense as the intersection of sets, thus meaning both A and B). Note that, intuitively:

$$RCH(A), RCH(B) \geq RCH(A \cap B) \quad \text{Equation 11}$$

In Equation 11, the equality holds when one is entirely contained in the other, thus Equation 10 is always non-negative. Equation 10 is reminiscent of probability theory. The reason why RCH(A∩B) is subtracted one the right-hand side is because RCH(A∩B) is the number of weighted distinct individuals having watched at least one second of both A and B, which is included both in RCH(A) and RCH(B). Thus, in order for them not be counted twice in RCH(A)+RCH(B), one of their contribution is subtracted once, yielding Equation 10. The act of subtracting the reach of the intersection to not count it twice is referred to as deduplication, which is what can make reach metric challenging to compute.

Equation 10 is a particular instance of the inclusion-exclusion principle of combinatorics and, more generally, measure theory, with n=2 events. This can be generalized to the case of n=3 events A, B and C as given by Equation 14:

$$RCH(A \cup B \cup C) = RCH(A) + RCH(B) + RCH(C) - RCH(A \cap B) - RCH(A \cap C) - RCH(B \cap C) + RCH(A \cap B \cap C) \quad \text{Equation 14}$$

Figure 12:
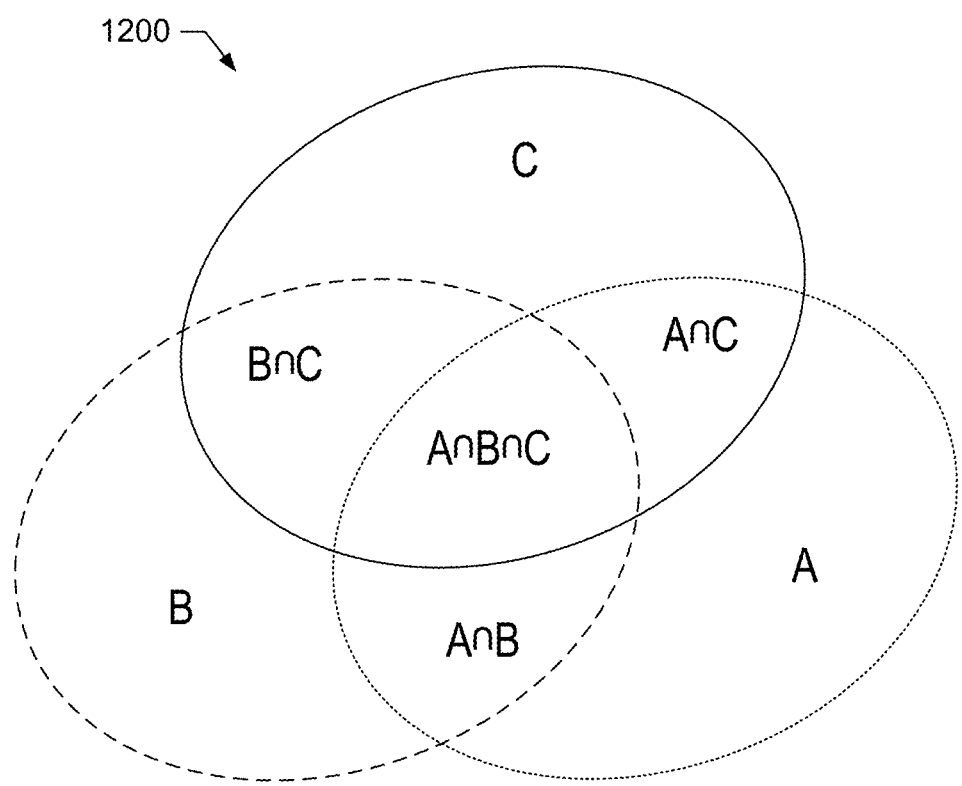
FIG. 12 illustrates an example Venn diagram that demonstrates operation of the example streams attribution process of FIG. 11.

In Equation 14, the reach of the intersection A∩B∩C is added back because it is subtracted too often in the terms of the pairwise intersections. The meaning of Equation 14 can be understood in the context of the example Venn diagram 1200 of FIG. 12. Using the Venn diagram 1200 of FIG. 12, the pattern to generalize to the union of n events can be identified. Initially, include the reach of each set. Then, exclude the reach of the pairwise intersections. Then, include the reach of the triple-wise intersections. Then, exclude the reach of the quadruple-wise intersections. The, include the reach of the quintuple-wise intersections. This process then continues until the reach of the n-tuple-wise intersection is included (if n is odd) or excluded (n even). Mathematically, the foregoing process for calculating the reach of the union of n events is given by Equation 15:

$$RCH\left(\bigcup_{i=1}^{n} A_i\right) = \sum_{i=1}^{n} RCH(A_i) - \qquad \text{Equation 15}$$

$$\sum_{1 \le i \le j \le n} RCH(A_i \cap A_j) + \sum_{1 \le i \le j \le k \le n} RCH(A_i \cap A_j \cap A_k) -$$

$$\ldots + (-1)^{n+1} RCH(A_1 \cap \ldots \cap A_n)$$

Equation 15 can be rewritten in a more compact form as Equation 16

$$RCH\left(\bigcup_{i=1}^{n} A_i\right) = \sum_{k=1}^{n} (-1)^{k+1} \left(\sum_{1 \le i_1 < \ldots < i_k \le k} RCH(A_{i_1} \cap \ldots \cap A_{i_k})\right) \quad \text{Equation 16}$$

Figure 13:
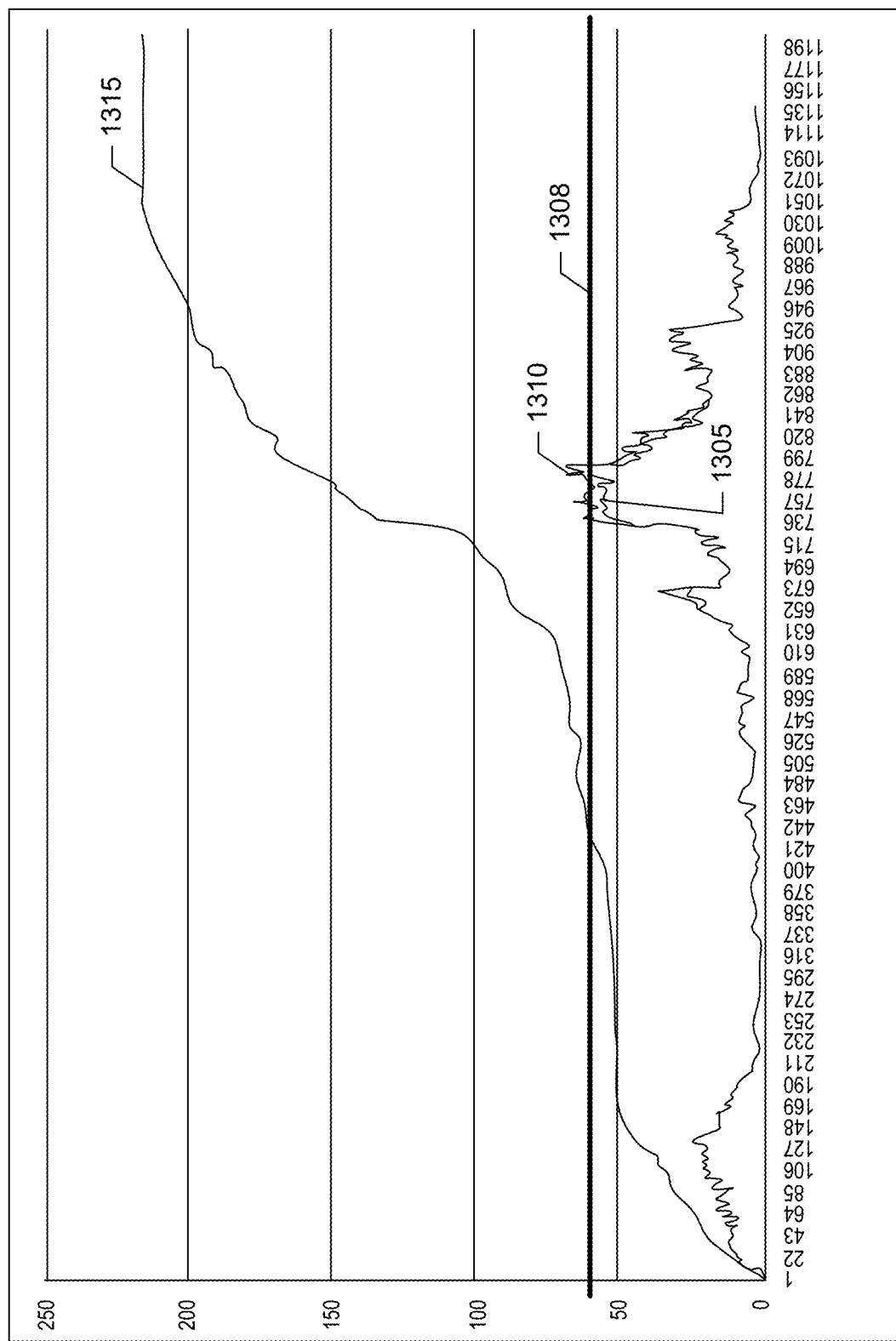
FIG. 13 illustrates example metric curves computed by the example streams attribution process of FIG. 11.

In the illustrated example, the reach curves computation process 1105 calculates the reach for each individual second, which can be represented as a reach curve, such as the example reach curve 1305 in FIG. 13. The example reach curve 1305 has an example maximum value 1308, which corresponds to the particular second during which the maximum number of weighted distinct individuals watched the content (or union of content(s)), with the other seconds having been viewed by fewer weighted distinct individuals.

In some examples, the reach curves computation process 1105 computes the impression metric, which is different from the reach but related to it in the following way. Both the reach and the impression are calculated for each second. Thus, if the same individual views the same second n times, by Equation 10 their contribution to the reach of that second is just 1, whereas their contribution to the impression is n. For each second, the impression can be envisaged as the sheer volume of weighted sessions, regardless of deduplication, with the weight of a session being the weight of the individual associated with that session. This means that the algebra of the impression is a linear one, and corresponds to sum across the different events. Mathematically, the impressions metric for a union of n events $A_i$ is the sum of the impressions for each of the events $A_i$ as given by Equation 17

$$IMP(\cup_i A_i) = \Sigma_i IMP(A_i) \qquad \text{Equation 17}$$

The impression is always greater than or equal to the reach for a given event or union of events, with the equality holding only if each individual watches a given second exactly one time. Thus, $$IMP(A_i) \ge RCH(A_i) \forall A_i \qquad \text{Equation 18}$$

An example impressions curve 1310 is illustrated in FIG. 13. As can be seen in the illustrated example, the values of the impressions curve 1310 are greater than or equal to the values of the reach curve 1305 at each second.

In some examples, the reach curves computation process 1105 computes the cumulated reach metric. For example, the cumulated reach for a given media content at a given second t is the number of weighted distinct individuals having watched at least one second of the media content of from t=0 to t, where t=0 represents the start of the content. An example cumulated reach curve 1315 corresponding to the example reach curve 1305 is illustrated in FIG. 13. As illustrated by the reach curve 1315, the cumulated reach is always non-decreasing because once an individual is counted, their contribution stays the same at any later time, as represented by Equation 19:

$$CUM\ RCH(t) \ge CUM\ RCH(t-1) \forall t \qquad \text{Equation 19}$$

The cumulated reach takes into account for new individuals starting the viewing of a given content because when a new individual starts viewing a given content, the cumulated reach grows. If in a certain time interval no new individuals start the viewing, the cumulated reach is constant, regardless of whether individuals already viewing that content quit viewing the content. Note that a situation can occur where the reach is flat in a time interval and the cumulated reach keeps growing. This happens if, at every second of that interval, there is an equal number of individuals quitting the viewing and new individuals starting it, such that the overall number of distinct individuals is constant. Furthermore, the maximum of the cumulated reach, which is always reached at the end of a content, is the total number of weighted distinct individuals watching at least one second of that content. It is indicated as TOT CUM RCH or simply as TOT RCH.

Another property of the cumulated reach is that the cumulated reach at a given instant, CUM RCH(t), cannot be greater than the cumulated reach at the previous instant, CUM RCH(t−1), plus the reach at the given instant RCH(t). Two extremum cases are: 1) the viewers at the given instant, that is RCH(t), were all already present at the previous instant, in which case the cumulated reach is unchanged, that is, CUM RCH(t)=CUM RCH(t−1), or 2) none of the viewers at the given instant were present at the previous instant, in which case CUM RCH(t)=CUM RCH(t−1)+RCH(t). Thus, Equation 20 provides this property mathematically as:

$$CUM\ RCH(t) \le CUM\ RCH(t-1) + RCH(t) \qquad \text{Equation 20}$$

Equations 19 and 20 can be combined to provide the following inequality of Equation 21, which can be used as a consistency check for the cumulated reach:

$$CUM\ RCH(t-1) \le CUM\ RCH(t) \le CUM\ RCH(t-1) + RCH(t) \qquad \text{Equation 21}$$

In summary, the output of device allocation process 265 identifies which census devices are attributed to each panel device. The census data contains the viewing statements of the census devices, so, for each of them, the reach and the impression curves can be determined second by second by the reach curves computation process 1105. The maximum reach can be obtained as the maximum of the reach curve. Also, the cumulated reach curve is found from the reach curve as explained above. FIG. 13 illustrates examples of such target curves for a single live channel across a whole day, and includes the example reach curve 1305. and the example impressions curve 1310, which are close to each other and sometimes overlapping, as well as the example maximum reach value 1308 and the example cumulated reach curve 1315.

As mentioned, the target reach, impressions and/or cumulated reach curves are initially determined with the granularity of a second (or some other granularity). In some examples, an analysis is performed to see if a coarser granularity can be utilized instead, so that a compression of the viewing statements is achieved without losing global precision on the curves. In other words, the reach curves computation process 1105 may compute step curves where the length of the steps, namely the time interval representing the granularity, is larger than a single second.

It is also to be noted that the target curves are computed from the census data according to the output of the device allocation process 265, but the panelists are yet to be attributed the viewing statements of the census devices they have been assigned by the device allocation process 265. Therefore, these curves are regarded as constraints for such attribution, in the sense that each panelist is to be assigned the census viewing statements in such a way that the reach, impression, maximum reach and/or cumulated reach curves stemming from this attribution match the target curves as best as possible. The splits creation process 1110 and the splits choice process 1115 operate to achieve this goal, as disclosed in further detail below. In some examples, the statements compression process 1120 then rearranges some viewing statements to reduce the output size without losing important information on the metrics, as disclosed in further detail below.

Once the target curves are determined, each panel device is assigned the viewing statements of the census devices attributed to it by the device allocation process 265. In the illustrated example of FIG. 11, the splits creation process 1110 begins this process by dividing each intab panelist P of weight $W_i$ into 24 splits $w_{ij}$, j=1 to 24, also referred to herein as split weights, whose values are of the form $2^{nd}$ with n∈ N such that the following two condition are met. First, the sum of the weights of the splits $w_{ij}$ equals the panelist's weight $W_i$ as given by Equation 22:

$$\sum_j w_{ij} = W_i \ \forall P_i \qquad \text{Equation 22}$$

Second, the weights of the splits $w_{ij}$ are to contain no holes, which means that all the powers 2 with n ranging from 0 to the maximum possible value allowed by W are present at least once. The preceding two conditions for creating the splits for a given panelist mean that the splits, indicated as {aa, ab, ac, . . . }, possess weights of the form {1, 2, 4, 8, 16, . . . }, where no holes are present or, in other words, at least one split has a value equal to each of the possible powers of 2. In some examples, the splits creation process 1110 creates the splits $w_{ij}$, j=1 to 24 to have a U-shaped distribution, meaning that more splits with low weights are present, fewer splits with middle weights are present, and more splits large weights presents. For example, the splits creation process 1110 could create the splits $w_{ij}$, j=1 to 24 for a given panelist with an overall weight of 926 to be {1, 1, 1, 1, 1, 1, 2, 2, 2, 2, 2, 2, 4, 4, 4, 8, 8, 16, 32, 64, 128, 128, 256, 256}, which sums to the weight of 926 and satisfies both conditions described above. In some examples, the splits creation process 1110 divides panelists into a different number of splits than the example of 24 described herein.

The reason why powers of 2 are chosen for the split weights is, if no holes are present, the split weights can be summed to obtain a possible panelist's weight within a reasonable number of terms. Of course, in other examples, other values different than powers of 3 can be utilized by the splits creation process 1110 to create the splits for the panelists. In some examples, the creation of the splits for the panelists such that they have a U-shaped distribution can improve to be stable in the face of variations of the panelists' weights. For example, if the weight of a panelist does not vary too much from one day to the other, their splits' weights may not undergo any major variation. This can be useful when calculating the reach across days.

Recall that the device allocation process 265 assigns to each panel device a number of census devices that does not exceed its weight, which coincides with the weight of its correspondent panelist. This ensures that the reach does not exceed the weight of the panel device, and hence the panelist, enabling the above splitting to be performed.

In some examples, it is not the panelists that are divided into splits, but rather the splits creation process 1110 divides respective households into splits. In some such examples, the splits creation process 1110 duplicates the household of each panelist into 24 copies. some such examples, the splits creation process 1110 also duplicates each member of a household into 24 copies, some or all of which are assigned different weights given by powers of 2 without holes so that their sum is equal to the household's weight. It may then occur that any household member has different weights among the copies, but the sum of the weights of the copies of each panelist is constrained to equal the weight of that panelist.

In some examples, a potential benefit of dividing panelists' weights into splits is that it allows the TV metrics to remain unchanged. In some examples, a reason for creating the splits based on the households instead of the panelists is preservation of the co-viewing metric, which is a metric describing multiple individuals of the same households watching the same content together on the same device. By splitting the households in such examples, the co-viewing is preserved, like the other TV metrics.

As mentioned above, the splits choice process 1115 chooses, for each panel device of each panelist, a subset of the splits of that panelist so that the sum of the weights of the subset if splits matches the active weight of that panel device. The, for each second of each media content, the splits choice process 1115 chooses a combination of splits from the previously selected subset such that the sum of the weights of the combination matches the target reach of that media content at that second (or some other interval of time), as provided by the reach curves computation process 1105. Because the splits choice process 1115 has access to split weights with several powers of 2, without holes and potentially with repetitions, the splits choice process 1115 is able to choose at least one subset of splits whose weights add up to whatever the reach of a given content is, at every second (or other interval). In some examples, there can be more than one such combination. In some examples, this freedom of choice is used by the splits choice process 1115 to pick the subset of splits reproducing not only the correct reach, but also the correct impression and cumulated reach.

In some examples, the reach is required to be reproduced exactly at each second, but there may not be enough flexibility to select the split to reproduce the impression and the cumulated reach as well. In some such examples, the reach is treated as a hard constraint, while the impression and the cumulated reach are treated as soft constraints. In some such examples, because the reach is a hard constraint, so are the maximum reach MAX RCH and the total reach TOT RCH. As described above, the reach for a given union of media contents does not have an additive algebra, but it does have an additive algebra across panelists. Because different panelists represent different individuals altogether, there is no deduplication among them, meaning that their reaches can be summed linearly. All of this, however, relies on the splits matching the TOT RCH of the corresponding panelist, hence the hard constraint.

In some examples, the TOT RCH gives information useful for the choice of splits. As an example, let A and B be any two contents of whom both the respective total reach TOT RCH(A) and TOT RCH(B) are known. If the splits for A and those for B are chosen independently of each other, the result would be a number of different splits configurations ranging between two edge cases, the first being the edge case in which the two contents A and B have in common all the splits of the content with lower total reach, and second being the edge case in which the two contents A and B have no splits in common. The first such edge case corresponds to the scenario given mathematically by Equations 23 and 24:

TOT RCH($A \cap B$)=min{TOT RCH($A$)TOT RCH($B$)}     Equation 23

TOT RCH($A \cup B$)=max{TOT RCH($A$)TOT RCH($B$)}     Equation 24

The second such edge case corresponds to the scenario given mathematically by Equations 25 and 26:

TOT RCH($A \cap B$)=$\emptyset$     Equation 25

TOT RCH($A \cup B$)=TOT RCH($A$)+TOT RCH($B$)     Equation 26

However, if TOT RCH($A \cap B$) and TOT RCH($A \cup B$) are also known, not all such configurations are allowed. In some such examples, the splits choice process 1115 chooses a first set of splits for a panelist among the total number of 24 splits so that the chosen set of split weights adds up to TOT RCH($A \cup B$). Then, among that chosen first set, a second set (or subset) of the first set of splits is selected so that chosen second set (or subset) of split weights adds up to TOT RCH($A \cap B$), and this chosen second set (or subset) is assigned by the splits choice process 1115 to both contents A and B. Then, the splits choice process 1115 assigns the content A a third set (or subset) of different splits whose weights add up to the difference TOT RCH($A$)−TOT RCH($A \cap B$). Likewise, the splits choice process 1115 assigns the content B a fourth set (or subset) of different splits whose weights add up to the difference TOT RCH($B$)−TOT RCH($A \cap B$). In this way, the second and third sets (subsets) of splits assigned to content A and the second and fourth sets (subsets) of splits assigned to content B satisfy the total reach target TOT RCH($A \cup B$).

In some examples, the device allocation process 265 attributes to each panel device a set of census devices viewing thousands (or more) of contents each day. The reach of the set of contents corresponding to the census devices assigned to the devices of each panelist on a given day is referred to as the daily reach of that panelist, which can be expressed as Equation 27:

$$TOT\ RCH = RCH\left(\bigcup_i C_i\right) \quad \text{Equation 27}$$

The daily reach of Equation 27 can be used as a target in the following sense. In some examples, the splits choice process 1115 selects, for each panelist, a set of splits among the total number of 24 splits for that panelist such that their weights add up to the daily reach. Then, the splits for that panelist to be assigned each content are chosen by the splits choice process 1115 from among the initial selected set for that panelist instead of that panelist's total number of 24 splits. The splits choice process 1115 then verifies that the daily reach constraint has been fulfilled by the splits assignment. In some examples, the splits choice process 1115 performs such a verification by checking if all the splits in the selected set have been assigned any content. If not, the splits choice process 1115 revises the splits assignment to ensure that each of the selected splits has been assigned to at least one media content. Further, the daily reach of all the panelists corresponds to the count of census devices of that day after the accounted panelist deduplication.

After the splits choice process 1115 has chosen the subset of splits to be used for each content of each panel device of each panelist, the splits choice process 1115 then decides when to activate them. Different orders of activation can produce different curves, which can be close to the target curves or far from the target curves. In some examples, a goal of the splits choice process 1115 is determining an appropriate (e.g., optimal) instant in time at which each split should be activated to best reproduce the target curves.

Figure 14:
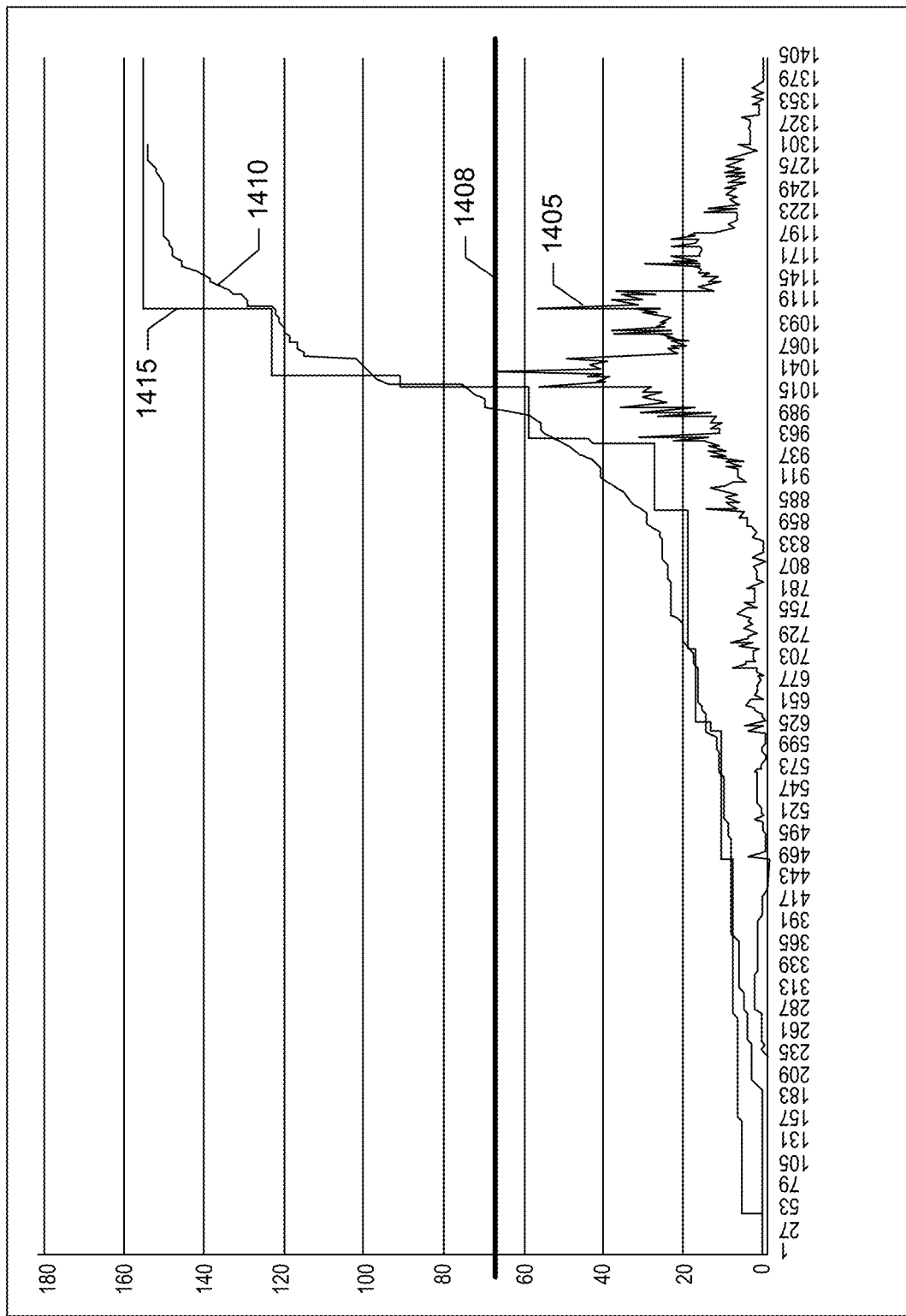
FIGS. 14-16 illustrated example curves that demonstrate operation of the example streams attribution process of FIG. 11.
Figure 15:
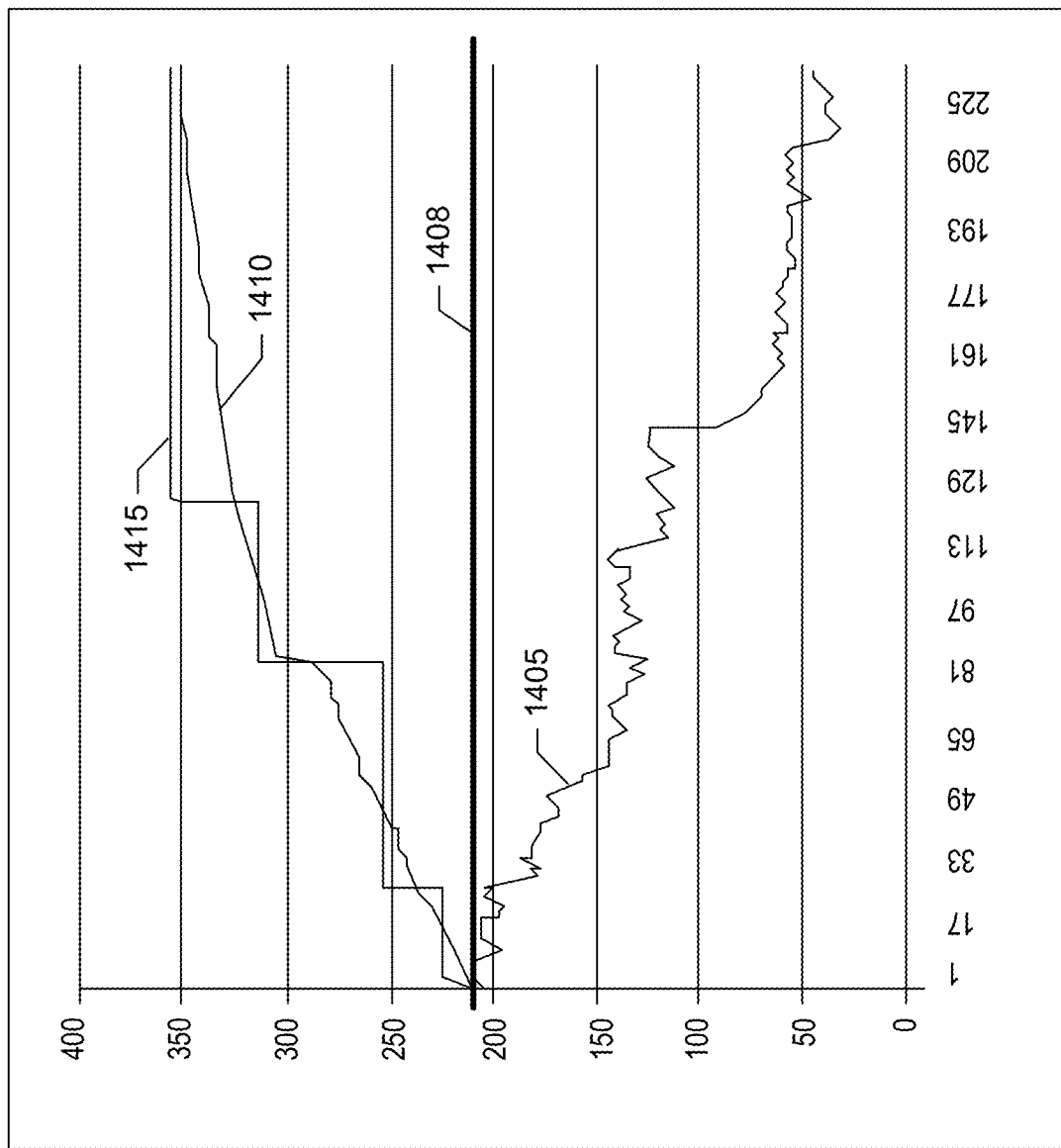

As an illustrative example, consider an example characteristic reach curve of live content (labeled 1405) illustrated in FIG. 14 and an example characteristic reach curve of VOD content (labeled 1505) illustrated in FIG. 15. The example of FIG. 14 illustrates target curves not for a single live content, but for the contents of a live channel over an entire day, In the example live content reach curve 1405, the number of viewers increases gradually at the beginning of the content, oscillates in the middle of the content, and tends to decrease gradually towards the end of the content. In contrast, in the example VOD content reach curve 1505, because the viewings of VOD content occur casually during the day and are time-shifted back to a given instant in time, the example VOD content reach curve 1505 is high at the beginning and tends to decrease towards the end. FIGS. 14 and 15 also illustrate an example maximum reach value 1408, an example live content cumulative reach curve 1410, an example maximum reach value 1508 and an example VOD content cumulative reach curve 1510 that correspond to the live content reach curve 1405 and the VOD content reach curve 1505.

In the illustrated example, the splits choice process 1115 implements an example minute engine process that determines at what instant in time each split should be placed, or activated, to result in an example imputed cumulative reach curve resulting from the activation of the splits that corresponds to the target cumulative reach. Examples of such imputed cumulative reach curve include an example live content imputed cumulative reach curve 1415 illustrated in FIG. 14 and an example VOD content imputed cumulative reach curve 1515 illustrated in FIG. 15. For example, activating all the splits at the beginning of a live content would meet the constraint of the total reach TOT RCH, but it would be a very poor approximation of the cumulated reach. Analogously, if only the splits with low weights are activated at the beginning, a big jump would be present at the end of the content due to the accumulation of the splits with large weights. In some examples, the minute engine process of the splits choice process 1115 additionally or alternatively determines at what instant in time each split should be placed, or activated, to result in an example imputed reach curve that matches the target reach curve, and/or to result in an example imputed impressions curve that matches the target impressions reach curve.

Figure 16:
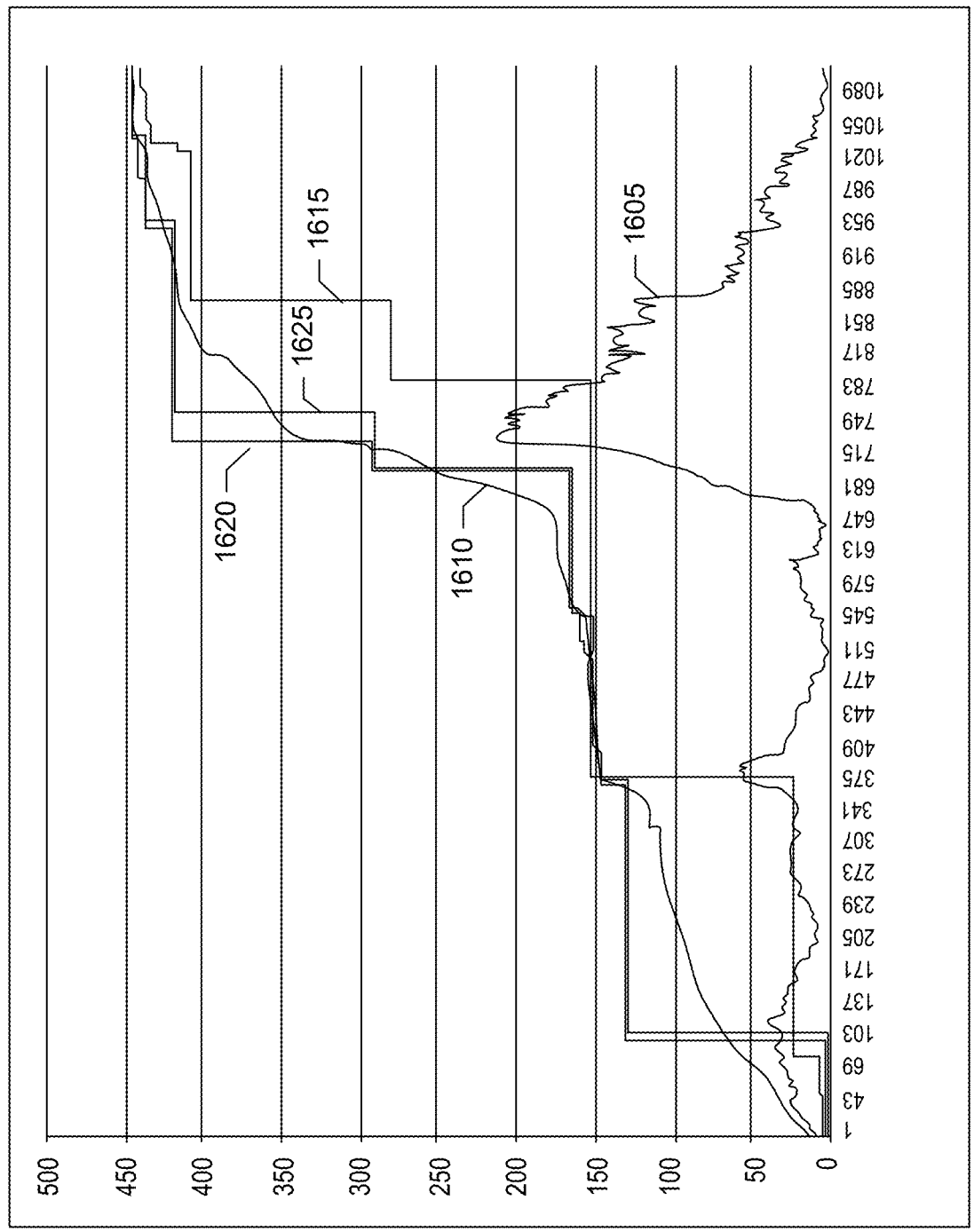

In some examples, the minute engine process implemented by the splits choice process 1115 utilizes an example genetic algorithm whose task is the determination of the latest possible instant of time a split can be activated before it causes the imputed cumulative reach curve to not meet a target accuracy relative to the cumulative reach curve. In some examples, if a split has not been activated before its last allowed second, the genetic algorithm implemented by the splits choice process 1115 forces the split to activate at that last allowed second. However, if the minute engine process implemented by the splits choice process 1115 already activated that split before its last allowed second, the activation of that split is unchanged. Thus, each iteration of the genetic algorithm provides a position in time for each split, which in turn produces a corresponding cumulated reach curve. As the iterations progress, the obtained cumulated reach better approximates the target curve. In some examples, the genetic algorithm operates iteratively to meet a target accuracy or precision between the imputed cumulative reach curve and the target cumulative reach curve. An example of this iterative process is illustrated in FIG. 16, which includes an example reach curve 1605, a corresponding example cumulated reach curve 1610, and three example iteration results 1615, 1620 and 1625 of the genetic algorithm. The example iteration result 1615 corresponds to a first iteration of the genetic algorithm, the example iteration result 1620 corresponds to a second iteration of the genetic algorithm, and the example iteration result 1625 corresponds to a third iteration of the genetic algorithm, which demonstrates how the genetic algorithm operates iteratively to meet a target accuracy between the cumulated reach curve 1610 and the example iteration result 1625.

In some examples, after the splits choice process 1115 completes the split activation process, the information on the original census devices V and corresponding viewing statements S is discarded. In some examples, the reach curves determined by the reach curves computation process 1105 described above are also discarded. However, the streams attribution process 270 retains, for each content, the curves built by the activation of the splits. At this point, the instant in time each of the selected splits for each content is activated is known. In other words, the output of the splits choice process 1115 is a set of viewing statements for each split that are a result of the creation, choice and activation of the splits, as described above. (As also noted previously, the sets of viewing statements for the split may not be the same as the census viewing statements S given as an input of the streams attribution process 270.) An example viewing statement output 1700 determined by the splits choice process 1115 for a set of splits {aa, ab, ah} with corresponding split weights {1, 1, 2, 2, 2, 4, 4, 8} for a given panelist is illustrated in FIG. 17A. In the illustrated example of FIG. 17A, the subset of splits {aa, ab, ac, ad, ae, af, ah} (but excluding ag) were chosen such that the sum of the selected split weights, which is the total reach in the table, is 20, which matches the target total reach of 20. The splits choice process 1115 then assigned the splits {aa, ab, ac, ad, ae, af, ah} (but excluding ag) to different minutes {Min x, . . . , Min x+5} to approximate the target reach curve values and target cumulative reach curve values at different minutes, as shown in the table of FIG. 17A.

Figure 18:
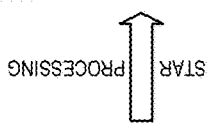
FIG. 18 is a graphic illustrating operation of the example STAR process flow of FIG. 2.

As shown in the example of FIG. 17A, the viewing statements for the splits can be fragmented, which may cause the size of the output file to become large. In the illustrated example of FIG. 11, the statements compression process 1120 operates to compact the splits' viewing statements while still meeting, or approximating, the reach constraints. In some examples, the statements compression process 1120 also utilizes a genetic algorithm to perform the compression. In some such examples, the genetic algorithm utilized by the statements compression process 1120 has a cost function that takes into account the number of statements, the target reach and a distance between two consecutive iterations to evaluate if the latest iteration is an improvement, and to determine when to stop the iterative process. An example compressed viewing statement output 1705 corresponding to the viewing statement output 1700 of FIG. 17A is illustrated in FIG. 17B. In the compressed viewing statement output 1705, the bottom row of the has been compressed Returning to the examples of FIGS. 1 and 2, the synthetic total audience ratings output data 280 of the STAR process flow 200 includes, in some examples, a daily event based record-level (RL) database representing the census streaming viewing from digital devices (SDK tagged contents) attributed to a specific device and demographic. In some examples, the example output circuitry 140 of FIG. 1 also merges synthetic total audience ratings output data 280 with the non-tagged panelist viewings (e.g., digital and/or linear TV) measured in the panel data 130 to generate an example final daily record-level deliverable 145 having seconds granularity which can then be reported to any downstream process. FIG. 18 illustrates a simplified graphical example of how the TV and digital viewing from a single source panel is processed by the example system 100 into the final total audience data 145.

In some examples, the output circuitry 140 additionally or alternatively outputs, based on the synthetic total audience ratings output data 280 and/or the final daily record-level deliverable 145, one or more control signals and/or commands to one or more device, downstream processes, etc. For example, the output circuitry 140 may issue commands to the media device meters and/or the streaming meters of the panelists to vary the panel data collected by those meters to adjust the quality of the synthetic total audience ratings output data 280. Additionally or alternatively, the output circuitry 140 may issue commands to SDKs to vary the census data collected by those SDKs to adjust the quality of the synthetic total audience ratings output data 280.

In some examples, the system 100 includes means for performing census to panel matching. For example, the means for performing census to panel matching may be implemented by the census to panel matcher circuitry 105. In some examples, the census to panel matcher circuitry 105 may be instantiated by processor circuitry such as the example processor circuitry 2012 of FIG. 20. For instance, the census to panel matcher circuitry 105 may be instantiated by the example microprocessor 2100 of FIG. 21 executing machine executable instructions such as those implemented by at least block 1905 of FIG. 19. In some examples, the census to panel matcher circuitry 105 may be instantiated by hardware logic circuitry, which may be implemented by an ASIC, XPU, or the FPGA circuitry 2200 of FIG. 22 structured to perform operations corresponding to the machine readable instructions. Additionally or alternatively, the census to panel matcher circuitry 105 may be instantiated by any other combination of hardware, software, and/or firmware. For example, the census to panel matcher circuitry 105 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the system 100 includes means for performing demographics estimation. For example, the means for performing demographics estimation may be implemented by the demographics estimation circuitry 110. In some examples, the demographics estimation circuitry 110 may be instantiated by processor circuitry such as the example processor circuitry 2012 of FIG. 20. For instance, the demographics estimation circuitry 110 may be instantiated by the example microprocessor 2100 of FIG. 21 executing machine executable instructions such as those implemented by at least block 1910 of FIG. 19. In some examples, the demographics estimation circuitry 110 may be instantiated by hardware logic circuitry, which may be implemented by an ASIC, XPU, or the FPGA circuitry 2200 of FIG. 22 structured to perform operations corresponding to the machine readable instructions. Additionally or alternatively, the demographics estimation circuitry 110 may be instantiated by any other combination of hardware, software, and/or firmware. For example, the demographics estimation circuitry 110 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the system 100 includes means for performing device allocation. For example, the means for performing device allocation may be implemented by the device allocation circuitry 115. In some examples, the device allocation circuitry 115 may be instantiated by processor circuitry such as the example processor circuitry 2012 of FIG. 20. For instance, the device allocation circuitry 115 may be instantiated by the example microprocessor 2100 of FIG. 21 executing machine executable instructions such as those implemented by at least block 1915 of FIG. 19. In some examples, the device allocation circuitry 115 may be instantiated by hardware logic circuitry, which may be implemented by an ASIC, XPU, or the FPGA circuitry 2200 of FIG. 22 structured to perform operations corresponding to the machine readable instructions. Additionally or alternatively, the device allocation circuitry 115 may be instantiated by any other combination of hardware, software, and/or firmware. For example, the device allocation circuitry 115 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the system 100 includes means for performing stream assigning. For example, the means for performing stream assigning may be implemented by the stream assigner circuitry 120. In some examples, the stream assigner circuitry 120 may be instantiated by processor circuitry such as the example processor circuitry 2012 of FIG. 20. For instance, the stream assigner circuitry 120 may be instantiated by the example microprocessor 2100 of FIG. 21 executing machine executable instructions such as those implemented by at least block 1920 of FIG. 19. In some examples, the stream assigner circuitry 120 may be instantiated by hardware logic circuitry, which may be implemented by an ASIC, XPU, or the FPGA circuitry 2200 of FIG. 22 structured to perform operations corresponding to the machine readable instructions. Additionally or alternatively, the stream assigner circuitry 120 may be instantiated by any other combination of hardware, software, and/or firmware. For example, the stream assigner circuitry 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the system 100 includes means for performing output processing. For example, the means for performing output processing may be implemented by the output circuitry 140. In some examples, the output circuitry 140 may be instantiated by processor circuitry such as the example processor circuitry 2012 of FIG. 20. For instance, the output circuitry 140 may be instantiated by the example microprocessor 2100 of FIG. 21 executing machine executable instructions such as those implemented by at least block 1925 of FIG. 19. In some examples, the output circuitry 140 may be instantiated by hardware logic circuitry, which may be implemented by an ASIC, XPU, or the FPGA circuitry 2200 of FIG. 22 structured to perform operations corresponding to the machine readable instructions. Additionally or alternatively, the output circuitry 140 may be instantiated by any other combination of hardware, software, and/or firmware. For example, the output circuitry 140 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the STAR system 100 is illustrated in FIGS. 1-18, one or more of the elements, processes, and/or devices illustrated in FIGS. 1-18 may be combined, divided, re-arranged, omitted, eliminated, and/or implemented in any other way. Further, the example census to panel matcher circuitry 105, the example demographics estimation circuitry 110, the example device allocation circuitry 115, the example stream assigner circuitry 120, the example output circuitry 140 and/or, more generally, the example STAR system 100 of FIG. 1 may be implemented by hardware alone or by hardware in combination with software and/or firmware. Thus, for example, any of the example census to panel matcher circuitry 105, the example demographics estimation circuitry 110, the example device allocation circuitry 115, the example stream assigner circuitry 120, the example output circuitry 140 and/or, more generally, the example STAR system 100 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example STAR system 100 may include one or more elements, processes, and/or devices in addition to, or instead of, those illustrated in FIGS. 1-18, and/or may include more than one of any or all of the illustrated elements, processes and devices.

Figure 19:
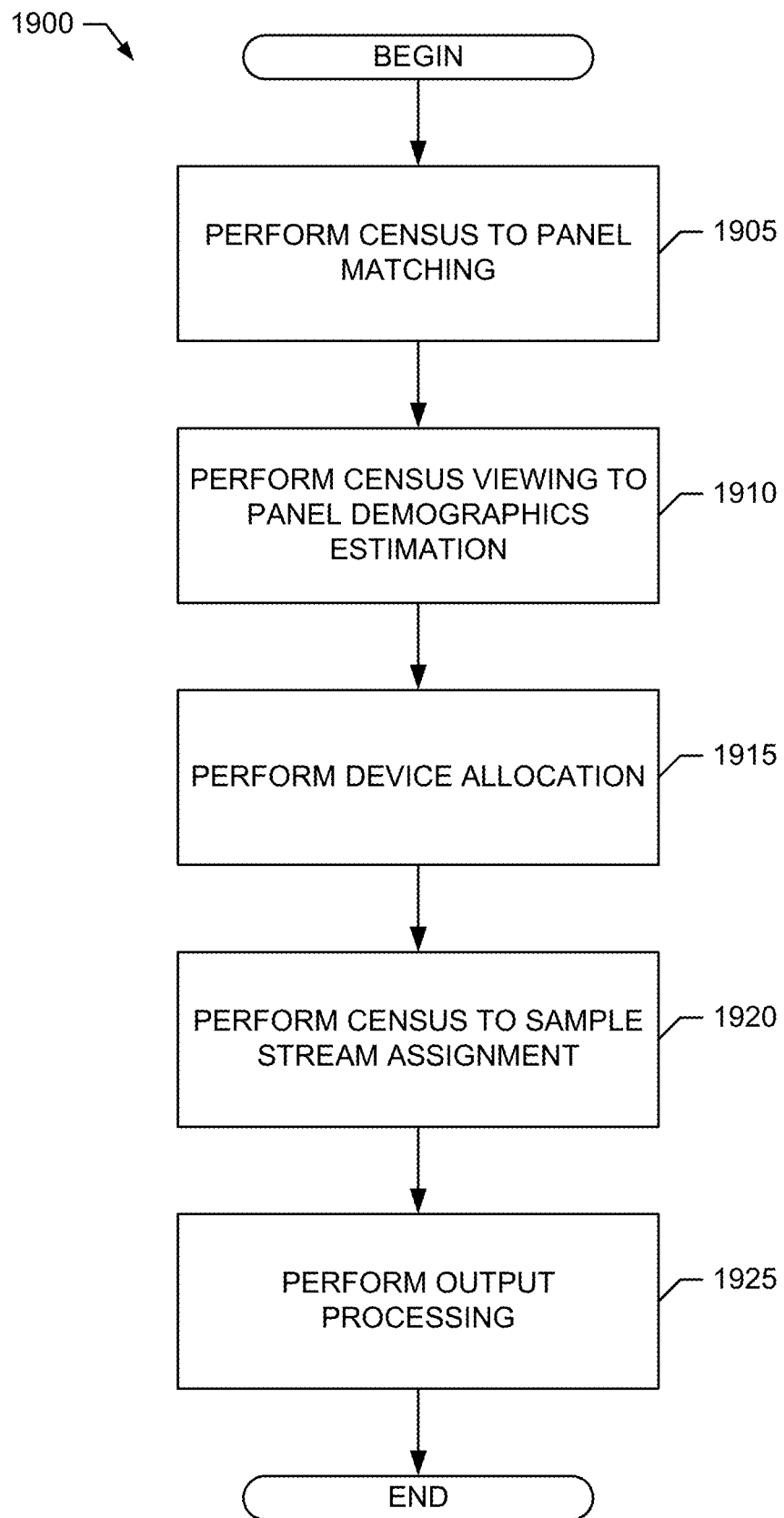
FIG. 19 is a flowchart representative of example machine readable instructions and/or example operations that may be executed by example processor circuitry to implement the example system of FIG. 1.

A flowchart representative of example machine readable instructions, which may be executed to configure processor circuitry to implement the example STAR system 100 of FIGS. 1-18 is shown in FIG. 19. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program(s) or portions thereof may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is(are) described with reference to the flowchart illustrated in FIG. 19, many other methods of implementing the example STAR system 100 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 19 is a flowchart representative of example machine readable instructions and/or example operations 1900 that may be executed and/or instantiated by processor circuitry to implement the example STAR system 100 of FIGS. 1-18. With reference to the preceding figures and associated written descriptions, the machine readable instructions and/or the operations 1900 of FIG. 19 begin at block 1905, at which the example census to panel matcher circuitry 105 of the system 100 implements the example panel and census match process 205 to process the input panel data 210, the input census data 215 and the input media content metadata 220 for the example STAR process flow 200, as described above. At block 1910, the example demographics estimation circuitry 110 of the system 100 implements the example data harmonization process 225, the example content clustering process 230, the example mechanical fingerprinting process 235 and the example behavioral features selection process 240 of the example STAR process flow 200, as described above. At block 1915, the example device allocation circuitry 115 of the system 100 implements the example SDK active device universe computation process 245, the example device aggregation process 250, the example panel devices activation process 255, the example demographic attribution process 260 and the example device allocation process 265 of the example STAR process flow 200, as described above. At block 1920, the stream assigner circuitry 120 implements the example streams attribution process 270 of the example STAR process flow 200 to produce the example synthetic total audience ratings output data 280, as described above. At block 1925, the example output circuitry 140 of the system 100 combines the synthetic total audience ratings output data 280 and the input panel data 210 to determine the final total audience ratings data 145, as described above. The machine readable instructions and/or the operations 1900 of FIG. 19 then end.

Figure 20:
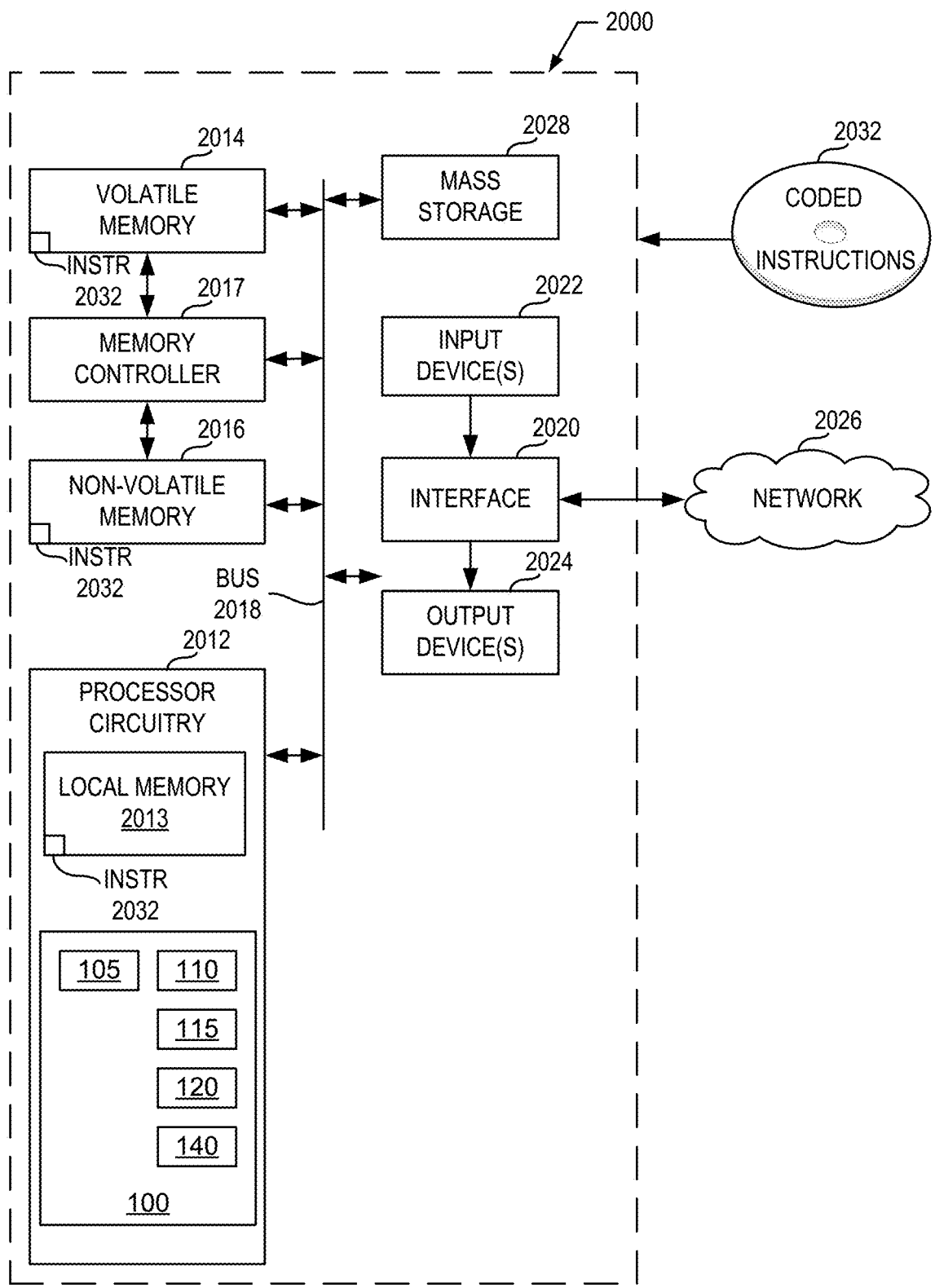
FIG. 20 is a block diagram of an example processing platform including processor circuitry structured to execute the example machine readable instructions and/or the example operations of FIG. 19 to implement the example system of FIG. 1.

FIG. 20 is a block diagram of an example processor platform 2000 structured to execute and/or instantiate the machine readable instructions and/or the operations of FIG. 19 to implement the example STAR system 100 of FIGS. 1-18. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry 2012 may be implemented by one or more semiconductor based (e.g., silicon based) devices. In this example, the processor circuitry 412 implements the example census to panel matcher circuitry 105, the example demographics estimation circuitry 110, the example device allocation circuitry 115, the example stream assigner circuitry 120, and/or the example output circuitry 140.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 by a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2022 are connected to the interface circuitry 2020. The input device(s) 2022 permit(s) a user to enter data and/or commands into the processor circuitry 2012. The input device(s)

2022 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 2022 are arranged or otherwise configured to allow the user to control the processor platform 2000 and provide data to the processor platform 2000 using physical gestures, such as, but not limited to, hand or body movements, facial expressions, face recognition, etc.

One or more output devices 2024 are also connected to the interface circuitry 2020 of the illustrated example. The output device(s) 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2020 of the illustrated example, thus, typically includes a graphics driver card, a graphics driver chip, and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 2032, which may be implemented by the machine readable instructions of FIG. 19, may be stored in the mass storage device 2028, in the volatile memory 2014, in the non-volatile memory 2016, and/or on a removable non-transitory computer readable storage medium such as a CD or DVD.

Figure 21:
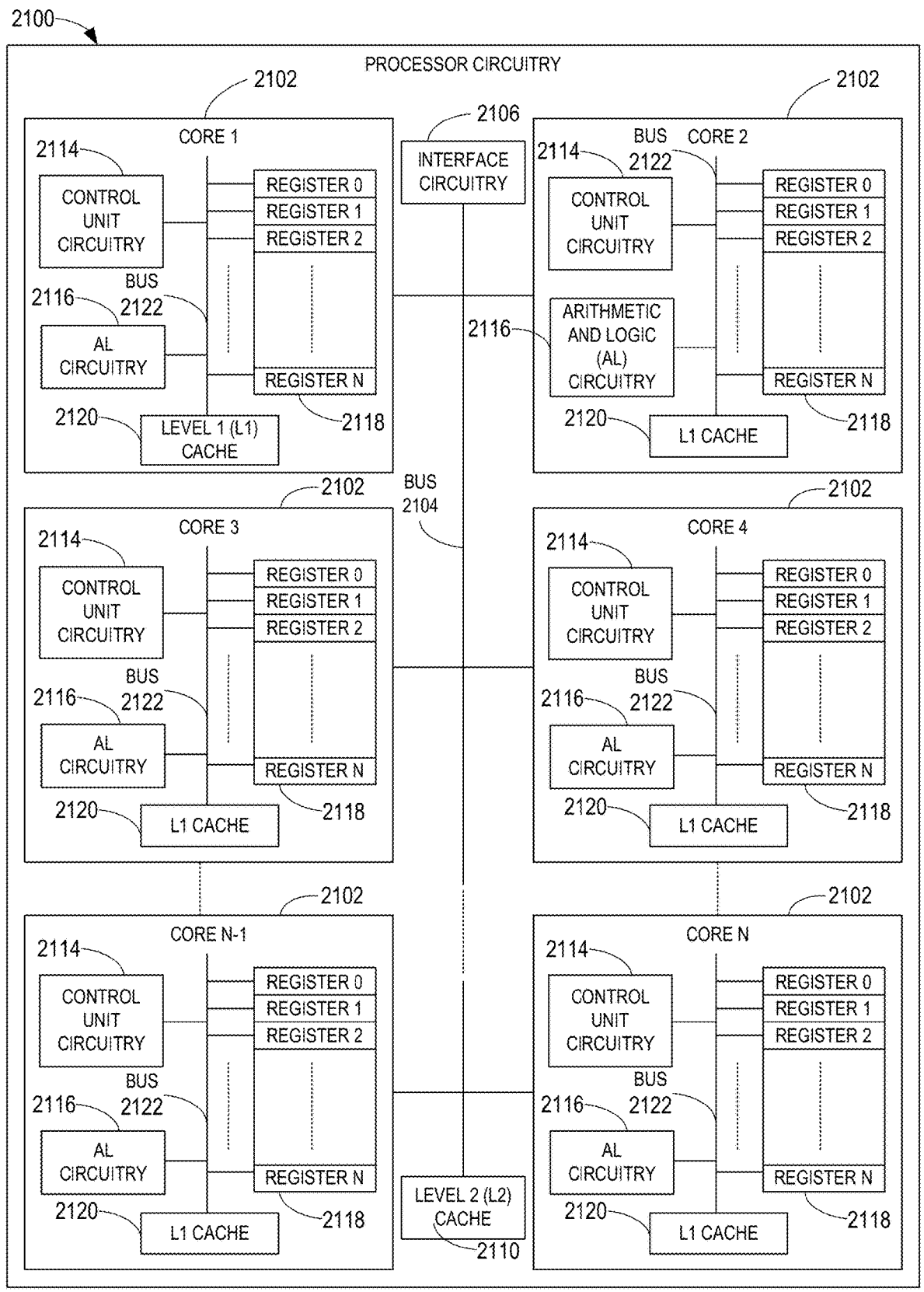
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a microprocessor 2100. For example, the microprocessor 2100 may be a general purpose microprocessor (e.g., general purpose microprocessor circuitry). The microprocessor 2100 executes some or all of the machine readable instructions of the flowchart of FIG. 19 to effectively instantiate the circuitry of FIG. 1 as logic circuits to perform the operations corresponding to those machine readable instructions. In some such examples, the circuitry of FIG. 1 is instantiated by the hardware circuits of the microprocessor 2100 in combination with the instructions. For example, the microprocessor 2100 may be implemented by multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowchart of FIG. 19.

The cores 2102 may communicate by a first example bus 2104. In some examples, the first bus 2104 may be implemented by a communication bus to effectuate communication associated with one(s) of the cores 2102. For example, the first bus 2104 may be implemented by at least one of an Inter-Integrated Circuit (I2C) bus, a Serial Peripheral Interface (SPI) bus, a PCI bus, or a PCIe bus. Additionally or alternatively, the first bus 2104 may be implemented by any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2 cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the local memory 2120, and a second example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The second bus 2122 may be implemented by at least one of an I2C bus, a SPI bus, a PCI bus, or a PCIe bus.

Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
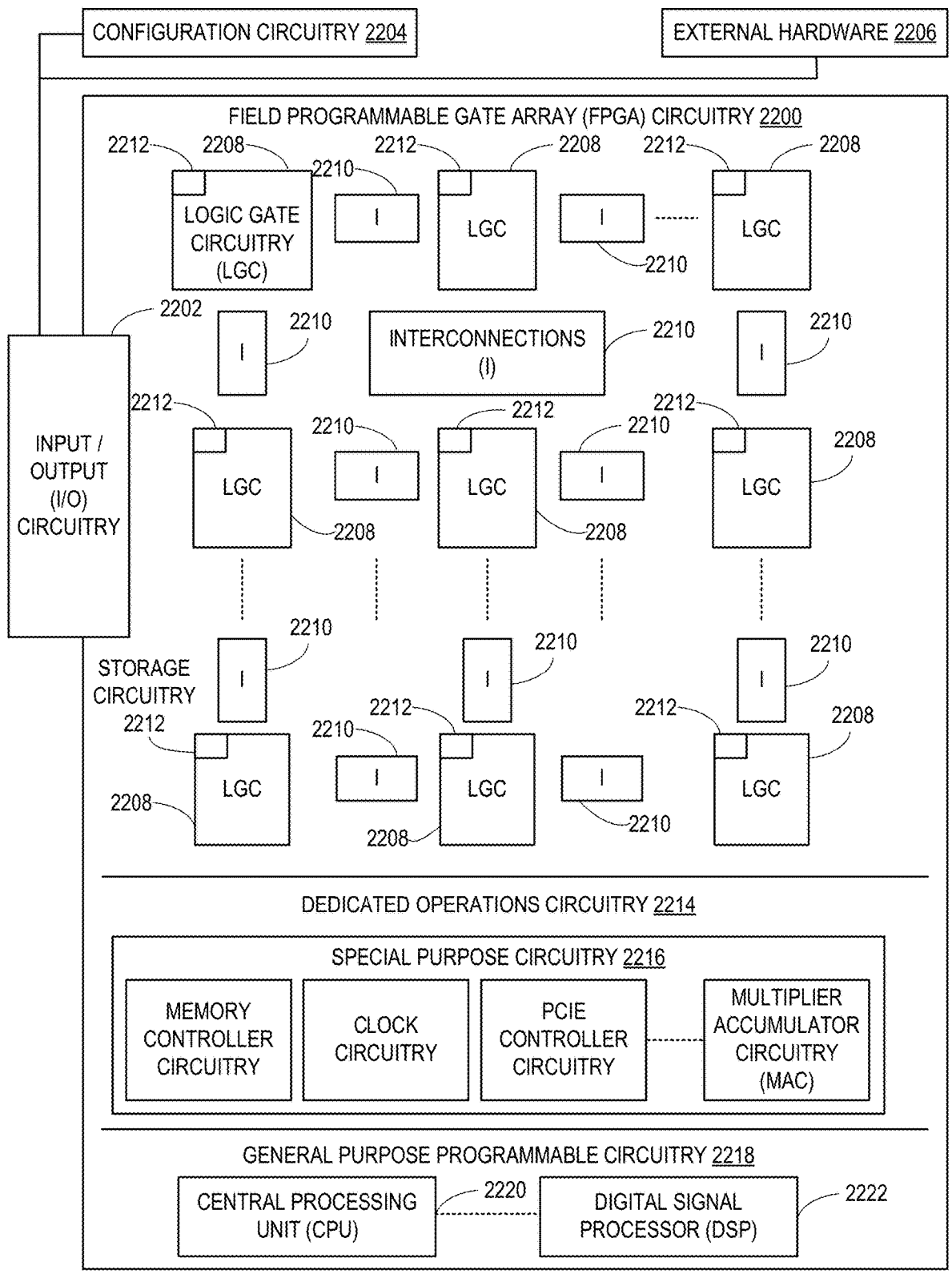
FIG. 22 is a block diagram of another example implementation of the processor circuitry of FIG. 20.

FIG. 22 is a block diagram of another example implementation of the processor circuitry 2012 of FIG. 20. In this example, the processor circuitry 2012 is implemented by FPGA circuitry 2200. For example, the FPGA circuitry 2200 may be implemented by an FPGA. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowchart of FIG. 19 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowchart of FIG. 19. In particular, the FPGA circuitry 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowchart of FIG. 19. As such, the FPGA circuitry 2200 may be structured to effectively instantiate some or all of the machine readable instructions of the flowchart of FIG. 19 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIG. 19 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22 includes example input/output (I/O) circuitry 2202 to obtain and/or output data to/from example configuration circuitry 2204 and/or external hardware 2206. For example, the configuration circuitry 2204 may be implemented by interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may be implemented by external hardware circuitry. For example, the external hardware 2206 may be implemented by the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and the configurable interconnections 2210 are configurable to instantiate one or more operations that may correspond to at least some of the machine readable instructions of FIG. 19 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The configurable interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 6. In some such hybrid examples, a first portion of the machine readable instructions represented by the flowchart of FIG. 19 may be executed by one or more of the cores 2102 of FIG. 21, a second portion of the machine readable instructions represented by the flowchart of FIG. 19 may be executed by the FPGA circuitry 2200 of FIG. 22, and/or a third portion of the machine readable instructions represented by the flowchart of FIG. 19 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 2012 of FIG. 20 may be in one or more packages. For example, the microprocessor 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

Figure 23:
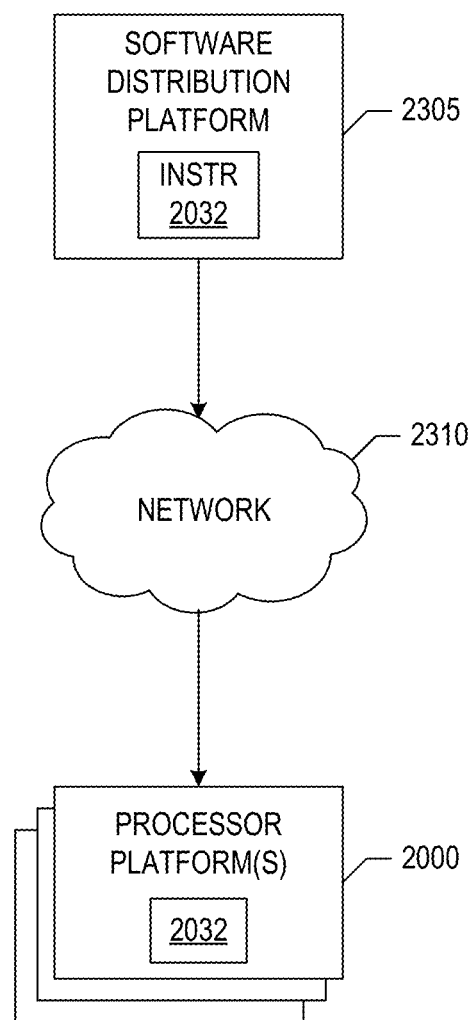
FIG. 23 is a block diagram of an example software distribution platform (e.g., one or more servers) to distribute software (e.g., software corresponding to the example machine readable instructions of FIG. 19) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2305 to distribute software such as the example machine readable instructions 2032 of FIG. 20 to hardware devices owned and/or operated by third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform 2305. For example, the entity that owns and/or operates the software distribution platform 2305 may be a developer, a seller, and/or a licensor of software such as the example machine readable instructions 2032 of FIG. 20. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the machine readable instructions 2032, which may correspond to the example machine readable instructions 1900 of FIG. 19, as described above. The one or more servers of the example software distribution platform 1905 are in communication with an example network 1910, which may correspond to any one or more of the Internet and/or the example network 2026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2032 from the software distribution platform 2305. For example, the software, which may correspond to the example machine readable instructions 1900 of FIG. 19, may be downloaded to the example processor platform 2000, which is to execute the machine readable instructions 2032 to implement the example STAR system 100. In some examples, one or more servers of the software distribution platform 2305 periodically offer, transmit, and/or force updates to the software (e.g., the example machine readable instructions 2032 of FIG. 20) to ensure improvements, patches, updates, etc., are distributed and applied to the software at the end user devices.

From the foregoing, it will be appreciated that example systems, methods, apparatus, and articles of manufacture have been disclosed that determine synthetic total audience ratings data. Disclosed systems, methods, apparatus, and articles of manufacture improve the efficiency of using a computing device by allocating census devices to panel devices, dividing panelist weights into split weights, assigning the census viewing statements to the panelist splits, and outputting synthetic total audience ratings data based on the assignment of the census viewing statements to the panelist splits. The resulting synthetic total audience ratings data imputes demographics data to the census devices while preserving one or more content reach targets. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine synthetic total audience ratings data are disclosed herein. Further examples and combinations thereof include the following.

Example 1 includes an apparatus to determine audience ratings, the apparatus comprising at least one memory, machine readable instructions, and processor circuitry to at least one of instantiate or execute the machine readable instructions to access census data including census viewing statements associated with media content presented by a plurality of census devices, access panel data including panelist viewing statements associated with media content presented by a plurality of panel devices, the panel data including weights to represent numbers of individuals in a population to be represented by corresponding panelists represented in the panel data, assign the census devices to the panel devices based on the weights, divide the weights for respective ones of the panelists into respective sets of split weights, and assign the census viewing statements to at least subsets of the sets of split weights to determine the audience ratings for the population, the assignment of the census viewing statements to the at least subsets of the sets of split weights based on the assignment of the census devices to the panel devices.

Example 2 includes the apparatus of example 1, wherein the processor circuitry is to assign the census devices, divide the weights and assign the census viewing statements based on critical cells, respective ones of the critical cells corresponding to different combinations of device type, operating system type and usage type.

Example 3 includes the apparatus of example 1 or example 2, wherein the processor circuitry is to cluster the media content represented in the census data into clusters, respective ones of the clusters corresponding to different combinations of content genre, content type, content length and content year.

Example 4 includes the apparatus of any one of examples 1 to 3, wherein the processor circuitry is to aggregate at least some of the census devices into virtual devices based on centroids to cause a number of census devices represented in the census data after aggregation to correspond to an active device universe value.

Example 5 includes the apparatus of any one of examples 1 to 4, wherein to assign the census devices to the panel devices, the processor circuitry is to determine scores representing similarities between ones of first group of census devices determined to having matching panel devices in the panel data and ones of a second group of census devices determined to be unmatched in the panel data, and assign the census devices to the panel devices based on the scores and the weights.

Example 6 includes the apparatus of example 5, wherein the scores are based on a geometric algorithm that is to process features obtained from the census data and the panel data.

Example 7 includes the apparatus of example 5 or example 6, wherein respective numbers of census devices assigned to corresponding ones of the panel devices is to equal the weights of the corresponding ones of the panel devices.

Example 8 includes the apparatus of any one of examples 1 to 7, wherein the assignment of the census viewing statements to the at least subsets of the sets of split weights is further based on at least a reach constraint.

Example 9 includes the apparatus of any one of examples 1 to 8, wherein the sets of split weights are based on powers of two.

Example 10 includes the apparatus of any one of examples 1 to 9, wherein respective ones of the sets of split weights include a number of split weights equal to twenty-four.

Example 11 includes at least one non-transitory computer readable medium comprising computer readable instructions that, when executed, cause processor circuitry to at least access census data including census viewing statements associated with media content presented by a plurality of census devices, access panel data including panelist viewing statements associated with media content presented by a plurality of panel devices, the panel data including weights to represent numbers of individuals in a population to be represented by corresponding panelists represented in the panel data, assign the census devices to the panel devices based on the weights, divide the weights for respective ones of the panelists into respective sets of split weights, and assign the census viewing statements to at least subsets of the sets of split weights to determine audience ratings for the population, the assignment of the census viewing statements to the at least subsets of the sets of split weights based on the assignment of the census devices to the panel devices.

Example 12 includes the at least one non-transitory computer readable medium of example 11, wherein the instructions cause the at least one processor to assign the census devices, divide the weights and assign the census viewing statements based on critical cells, respective ones of the critical cells corresponding to different combinations of device type, operating system type and usage type.

Example 13 includes the at least one non-transitory computer readable medium of example 11 or example 12, wherein the instructions cause the at least one processor to cluster the media content represented in the census data into clusters, respective ones of the clusters corresponding to different combinations of content genre, content type, content length and content year.

Example 14 includes the at least one non-transitory computer readable medium of any one of examples 11 to 13, wherein the instructions cause the at least one processor to aggregate at least some of the census devices into virtual devices based on centroids to cause a number of census devices represented in the census data after aggregation to correspond to an active device universe value.

Example 15 includes the at least one non-transitory computer readable medium of any one of examples 11 to 14, wherein to assign the census devices to the panel devices, the instructions cause the at least one processor to determine scores representing similarities between ones of first group of census devices determined to having matching panel devices in the panel data and ones of a second group of census devices determined to be unmatched in the panel data, and assign the census devices to the panel devices based on the scores and the weights.

Example 16 includes the at least one non-transitory computer readable medium of example 15, wherein the scores are based on a geometric algorithm that is to process features obtained from the census data and the panel data.

Example 17 includes the at least one non-transitory computer readable medium of example 15 or example 16, wherein respective numbers of census devices assigned to corresponding ones of the panel devices is to equal the weights of the corresponding ones of the panel devices.

Example 18 includes the at least one non-transitory computer readable medium of any one of examples 11 to 17, wherein the assignment of the census viewing statements to the at least subsets of the sets of split weights is further based on at least a reach constraint.

Example 19 includes the at least one non-transitory computer readable medium of any one of examples 11 to 18, wherein the sets of split weights are based on powers of two.

Example 20 includes the at least one non-transitory computer readable medium of any one of examples 11 to 19, wherein respective ones of the sets of split weights include a number of split weights equal to twenty-four.

Example 21 includes a method to determine audience ratings, the method comprising accessing census data including census viewing statements associated with media content presented by a plurality of census devices, accessing panel data including panelist viewing statements associated with media content presented by a plurality of panel devices, the panel data including weights to represent numbers of individuals in a population to be represented by corresponding panelists represented in the panel data, assigning, by executing an instruction with at least one processor, the census devices to the panel devices based on the weights, dividing, by executing an instruction with the at least one processor, the weights for respective ones of the panelists into respective sets of split weights, and assigning, by executing an instruction with the at least one processor, the census viewing statements to at least subsets of the sets of split weights to determine the audience ratings for the population, the assignment of the census viewing statements to the at least subsets of the sets of split weights based on the assignment of the census devices to the panel devices.

Example 22 includes the method of example 21, wherein the assigning of the census devices, the dividing of the weights and the assigning of the census viewing statements based on critical cells, respective ones of the critical cells corresponding to different combinations of device type, operating system type and usage type.

Example 23 includes the method of example 21 or example 22, further including clustering the media content represented in the census data into clusters, respective ones of the clusters corresponding to different combinations of content genre, content type, content length and content year.

Example 24 includes the method of any one of examples 21 to 23, further including aggregating at least some of the census devices into virtual devices based on centroids to cause a number of census devices represented in the census data after aggregation to correspond to an active device universe value.

Example 25 includes the method of any one of examples 21 to 24, wherein the assigning of the census devices to the panel devices includes determining scores representing similarities between ones of first group of census devices determined to having matching panel devices in the panel data and ones of a second group of census devices determined to be unmatched in the panel data, and assigning the census devices to the panel devices based on the scores and the weights.

Example 26 includes the method of example 25, wherein the scores are based on a geometric algorithm that is to process features obtained from the census data and the panel data.

Example 27 includes the method of example 25 or example 26, wherein respective numbers of census devices assigned to corresponding ones of the panel devices is to equal the weights of the corresponding ones of the panel devices.

Example 28 includes the method of any one of examples 21 to 27, wherein the assignment of the census viewing statements to the at least subsets of the sets of split weights is further based on at least a reach constraint.

Example 29 includes the method of any one of examples 21 to 28, wherein the sets of split weights are based on powers of two.

Example 30 includes the method of any one of examples 21 to 29, wherein respective ones of the sets of split weights include a number of split weights equal to twenty-four.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine audience ratings, the apparatus comprising:
    at least one memory;
    machine readable instructions; and
    processor circuitry to at least one of instantiate or execute the machine readable instructions to:
        access census data including census viewing statements associated with media content presented by a plurality of census devices;
        access panel data including panelist viewing statements associated with media content presented by a plurality of panel devices, the panel data including weights to represent numbers of individuals in a population to be represented by corresponding panelists represented in the panel data;
        divide the weights for respective ones of the panelists into respective sets of split weights; and
        assign the census viewing statements to at least subsets of the sets of split weights to determine the audience ratings for the population, the assignment of the census viewing statements to the at least subsets of the sets of split weights based on a reach constraint.

2. The apparatus of claim 1, wherein the processor circuitry is to cluster the media content represented in the census data into clusters, respective ones of the clusters corresponding to different combinations of content genre, content type, content length and content year.

3. The apparatus of claim 1, wherein the processor circuitry is to aggregate at least some of the census devices into virtual devices based on centroids to cause a number of census devices represented in the census data after aggregation to correspond to an active device universe value.

4. The apparatus of claim 1, wherein the processor circuitry is to:
    determine scores representing similarities between ones of a first group of census devices determined to having matching panel devices in the panel data and ones of a second group of census devices determined to be unmatched in the panel data; and
    assign the census devices to the panel devices based on the scores and the weights, wherein the assignment of the census viewing statements to the at least subsets of the sets of split weights is based on the reach constraint and the assignment of the census devices to the panel devices.

5. The apparatus of claim 4, wherein the scores are based on a geometric algorithm that is to process features obtained from the census data and the panel data.

6. The apparatus of claim 4, wherein respective numbers of census devices assigned to corresponding ones of the panel devices is to equal the weights of the corresponding ones of the panel devices.

7. The apparatus of claim 4, wherein the processor circuitry is to assign the census devices, divide the weights and assign the census viewing statements based on critical cells, respective ones of the critical cells corresponding to different combinations of device type, operating system type and usage type.

8. The apparatus of claim 1, wherein the sets of split weights are based on powers of two.

9. The apparatus of claim 1, wherein respective ones of the sets of split weights include a number of split weights equal to twenty-four.

10. At least one non-transitory computer readable medium comprising computer readable instructions that, when executed, cause processor circuitry to at least:
    access census data including census viewing statements associated with media content presented by a plurality of census devices;
    access panel data including panelist viewing statements associated with media content presented by a plurality of panel devices, the panel data including weights to represent numbers of individuals in a population to be represented by corresponding panelists represented in the panel data;

divide the weights for respective ones of the panelists into respective sets of split weights; and assign the census viewing statements to at least subsets of the sets of split weights to determine audience ratings for the population, the assignment of the census viewing statements to the at least subsets of the sets of split weights based on a reach constraint.

11. The at least one non-transitory computer readable medium of claim 10, wherein the instructions cause the at least one processor to aggregate at least some of the census devices into virtual devices based on centroids to cause a number of census devices represented in the census data after aggregation to correspond to an active device universe value.

12. The at least one non-transitory computer readable medium of claim 10, wherein the instructions cause the at least one processor to:

determine scores representing similarities between ones of a first group of census devices determined to having matching panel devices in the panel data and ones of a second group of census devices determined to be unmatched in the panel data; and assign the census devices to the panel devices based on the scores and the weights, wherein the assignment of the census viewing statements to the at least subsets of the sets of split weights is based on the reach constraint and the assignment of the census devices to the panel devices.

13. The at least one non-transitory computer readable medium of claim 12, wherein the scores are based on a geometric algorithm that is to process features obtained from the census data and the panel data.

14. The at least one non-transitory computer readable medium of claim 12, wherein respective numbers of census devices assigned to corresponding ones of the panel devices is to equal the weights of the corresponding ones of the panel devices.

15. The at least one non-transitory computer readable medium of claim 12, wherein the instructions cause the at least one processor to assign the census devices, divide the weights and assign the census viewing statements based on critical cells, respective ones of the critical cells corresponding to different combinations of device type, operating system type and usage type.

16. A method to determine audience ratings, the method comprising:

accessing census data including census viewing statements associated with media content presented by a plurality of census devices;

accessing panel data including panelist viewing statements associated with media content presented by a plurality of panel devices, the panel data including weights to represent numbers of individuals in a population to be represented by corresponding panelists represented in the panel data;

dividing, by at least one processor, the weights for respective ones of the panelists into respective sets of split weights; and assigning, by the at least one processor, the census viewing statements to at least subsets of the sets of split weights to determine the audience ratings for the population, the assignment of the census viewing statements to the at least subsets of the sets of split weights based on a reach constraint.

17. The method of claim 16, further including aggregating at least some of the census devices into virtual devices based on centroids to cause a number of census devices represented in the census data after aggregation to correspond to an active device universe value.

18. The method of claim 16, further including:

determining scores representing similarities between ones of a first group of census devices determined to having matching panel devices in the panel data and ones of a second group of census devices determined to be unmatched in the panel data; and assigning the census devices to the panel devices based on the scores and the weights, wherein the assignment of the census viewing statements to the at least subsets of the sets of split weights is based on the reach constraint and the assignment of the census devices to the panel devices.

19. The method of claim 18, wherein the scores are based on a geometric algorithm that is to process features obtained from the census data and the panel data.

20. The method of claim 18, wherein respective numbers of census devices assigned to corresponding ones of the panel devices is to equal the weights of the corresponding ones of the panel devices.

* * * * *